US012762192B2

(12) United States Patent
Jade et al.

(10) Patent No.: US 12,762,192 B2
(45) Date of Patent: Oct. 13, 2026

(54) SYSTEM AND METHOD FOR COMBINING LANGUAGE MODELS WITH NATURAL LANGUAGE PROCESSING FOR SUMMARIZATION

(71) Applicant: SAS Institute Inc., Cary, NC (US)

(72) Inventors: Teresa S. Jade, Cary, NC (US); Thomas William Sabo, Falls Church, VA (US); Meilan Ji, Beijing (CN); Fruzsina Veress, Needham, MA (US); Wei-Shan Chiang, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 19/202,283

(22) Filed: May 8, 2025

(65) Prior Publication Data

US 2026/0010556 A1 Jan. 8, 2026

Related U.S. Application Data

(60) Provisional application No. 63/697,677, filed on Sep. 23, 2024, provisional application No. 63/696,449,
(Continued)

(51) Int. Cl.
*G06F 16/34* (2025.01)
*G06F 40/284* (2020.01)
*G06F 40/289* (2020.01)

(52) U.S. Cl.
CPC .......... *G06F 16/345* (2019.01); *G06F 40/284* (2020.01); *G06F 40/289* (2020.01)

(58) Field of Classification Search
None
See application file for complete search history.

(56) References Cited

U.S. PATENT DOCUMENTS 8,296,309 B2 10/2012 Brassil et al.
10,467,344 B1 11/2019 Jade et al.
(Continued)

FOREIGN PATENT DOCUMENTS

WO 2023144629 A1 8/2023

OTHER PUBLICATIONS

Chuang, Yu-Neng, Tianwei Xing, Chia-Yuan Chang, Zirui Liu, Xun Chen, and Xia Hu. "Learning to compress prompt in natural language formats." arXiv preprint arXiv:2402.18700 (2024). (Year: 2024).*
(Continued)

*Primary Examiner* — Frank D Mills
(74) *Attorney, Agent, or Firm* — Padowithz Alce; Quintin Scheitlin; Alce PLLC

(57) ABSTRACT

A data processing system and method include receiving a set of documents to summarize a trend across the set of documents, inputting the set of documents into an information extraction model, executing the information extraction model to extract a first plurality of text segments, determining a second plurality of text segments based on the first plurality of text segments, determining a third plurality of text segments from the second plurality of text segments, generating a compressed representation of the set of documents from the third plurality of text segments to include in a prompt for a language model, inputting the prompt into the language model, and executing the language model to generate the summary based on the prompt for the set of documents.

32 Claims, 27 Drawing Sheets

Related U.S. Application Data filed on Sep. 19, 2024, provisional application No. 63/678,191, filed on Aug. 1, 2024, provisional application No. 63/673,873, filed on Jul. 22, 2024, provisional application No. 63/669,341, filed on Jul. 10, 2024, provisional application No. 63/667,303, filed on Jul. 3, 2024.

(56) References Cited

U.S. PATENT DOCUMENTS

| | | | | |
|---|---|---|---|---|
| 10,699,081 | B2 | 6/2020 | Jade et al. | |
| 11,049,502 | B1 | 6/2021 | Cheng et al. | |
| 11,138,979 | B1 | 10/2021 | Cheng et al. | |
| 11,145,309 | B1 | 10/2021 | Yang | |
| 11,335,350 | B2 | 5/2022 | Li et al. | |
| 11,373,655 | B2 | 6/2022 | Li et al. | |
| 11,404,053 | B1 | 8/2022 | Cheng et al. | |
| 11,423,680 | B1 | 8/2022 | Jade et al. | |
| 11,497,988 | B2 | 11/2022 | Shukla | |
| 11,501,547 | B1 | 11/2022 | Jade et al. | |
| 11,538,481 | B2 | 12/2022 | Li et al. | |
| 11,776,545 | B2 | 10/2023 | Li et al. | |
| 11,797,610 | B1 | 10/2023 | Ferrucci et al. | |
| 11,797,781 | B2 | 10/2023 | Wang et al. | |
| 11,810,572 | B2 | 11/2023 | Cheng et al. | |
| 11,816,428 | B2 | 11/2023 | Begun et al. | |
| 11,907,678 | B2 | 2/2024 | Wang et al. | |
| 11,947,916 | B1 | 4/2024 | Agarwal | |
| 12,254,015 | B1 * | 3/2025 | Kumar | G06F 16/243 |
| 12,412,000 | B2 | 9/2025 | Sinha et al. | |
| 12,417,352 | B1 | 9/2025 | Murthy et al. | |
| 2004/0098385 | A1 * | 5/2004 | Mayfield | G06F 16/313 707/E17.084 |
| 2009/0306962 | A1 | 12/2009 | Harlow et al. | |
| 2010/0114561 | A1 | 5/2010 | Yasin | |
| 2016/0247068 | A1 | 8/2016 | Lin | |
| 2020/0111023 | A1 | 4/2020 | Pondicherry et al. | |
| 2021/0042767 | A1 | 2/2021 | Guan et al. | |
| 2021/0056170 | A1 | 2/2021 | Bohannon et al. | |
| 2022/0092265 | A1 | 3/2022 | Bhattacharya et al. | |
| 2022/0180865 | A1 | 6/2022 | Kwatra et al. | |
| 2022/0198136 | A1 | 6/2022 | Peleg et al. | |
| 2023/0043457 | A1 | 2/2023 | Khan | |
| 2023/0237277 | A1 | 7/2023 | Reza et al. | |
| 2023/0259711 | A1 | 8/2023 | Goto et al. | |
| 2023/0325601 | A1 | 10/2023 | Sabharwal et al. | |
| 2024/0104055 | A1 | 3/2024 | McAnallen | |
| 2024/0160651 | A1 | 5/2024 | Bhattacharjee et al. | |
| 2024/0160653 | A1 * | 5/2024 | Chowdhury | G06F 16/313 |
| 2024/0281487 | A1 * | 8/2024 | Bathwal | G06F 16/24575 |
| 2024/0282298 | A1 | 8/2024 | Koneru et al. | |
| 2024/0289560 | A1 | 8/2024 | Kelly | |
| 2024/0362197 | A1 | 10/2024 | Thompson | |
| 2024/0394479 | A1 | 11/2024 | Pathak et al. | |
| 2025/0023779 | A1 | 1/2025 | Sumedrea et al. | |
| 2025/0053748 | A1 * | 2/2025 | Fayyaz | G06F 40/35 |
| 2025/0068667 | A1 | 2/2025 | Blum | |
| 2025/0094538 | A1 | 3/2025 | Wan | |
| 2025/0094711 | A1 | 3/2025 | Mishra | |
| 2025/0112878 | A1 | 4/2025 | Bayless | |
| 2025/0119625 | A1 * | 4/2025 | Bhattacharyya | G06F 40/30 |
| 2025/0148276 | A1 * | 5/2025 | Csaki | G06N 3/08 |
| 2025/0156465 | A1 * | 5/2025 | Nair | G06F 16/345 |
| 2025/0200100 | A1 * | 6/2025 | Hintz | G06F 40/40 |
| 2025/0200299 | A1 * | 6/2025 | Yuan | G06F 40/40 |
| 2025/0200301 | A1 * | 6/2025 | Chuang | G06N 3/043 |
| 2025/0259009 | A1 | 8/2025 | Mukherjee | |
| 2025/0278607 | A1 | 9/2025 | Doshi et al. | |
| 2025/0342182 | A1 * | 11/2025 | Nabel | G06F 16/3322 |
| 2026/0004135 | A1 | 1/2026 | Ailem | |
| 2026/0010722 | A1 | 1/2026 | Jade et al. | |

OTHER PUBLICATIONS

Jung, Hoyoun, and Kyung-Joong Kim. "Discrete prompt compression with reinforcement learning." IEEE Access 12 (2024): 72578-72587. (Year: 2024).*

Non-Final Office Action in U.S. Appl. No. 19/027,199 dated Apr. 9, 2025, 19 pages.

Non-Final Office Action in U.S. Appl. No. 19/028,561 dated Apr. 14, 2025, 25 pages.

Non-Final Office Action in U.S. Appl. No. 19/027,469 dated Apr. 25, 2025, 25 pages.

Grootendorst, Maarten, "BERTopic: Neural topic modeling with a class-based TF-IDF procedure," 2022, 10 pages.

Azher, et al., "LimTopic: LLM-based Topic Modeling and Text Summarization for Analyzing Scientific Articles limitations," Proceedings of the 24th ACM/IEEE Joint Conference on Digital Libraries. Association for Computing Machine, 2025, 12 pages.

Koloski, et al., "AHAM: Adapt, Help, Ask, Model Harvesting LLMs for Literature Mining," 2024, 13 pages.

Sia, et al., "Tired of Topic Models? Clusters of Pretrained Word Embeddings Make for Fast and Good Topics too!" Proceedings of the 2020 Conference on Empirical Methods in Natural Language Processing (EMNLP), 2020, pp. 1728-1736.

Wang, Han, et al. "Prompting large language models for topic modeling." 2023 IEEE International Conference on Big Data (BigData). IEEE, 2023, 6 pages.

Rijcken, et al, "Towards Interpreting Topic Models with ChatGPT," Paper presented at The 20th World Congress of the International Fuzzy Systems Association, Daegu, Korea, Republic of, 2023, 8 pages.

"Extracting Information by Machine Learning", Geeksforgeeks, Aug. 2, 2024, Retrieved from Internet URL: https://www.geeksforgeeks.org/machine-learning/extracting-information-by-machine-learning/, Retrieved on Jul. 9, 2025, 7 pages.

Bird et al., "Little words'—not really: function and content words in normal and aphasic speech", Journal of Neurolinguistics, vol. 15, Issues 3-5, May-Sep. 2002, pp. 209-237.

Carlson et al., "Coupled semi-supervised learning for information extraction", WSDM '10: Proceedings of the third ACM international conference on Web search and data mining, Feb. 4-6, 2010, 10 pages.

Mirza et al., "CATENA: CAusal and TEmporal relation extraction from Natural language texts", Proceedings of COLING 2016, the 26th International Conference on Computational Linguistics: Technical Papers, Dec. 11-17, 2016, pp. 64-75.

"Information Extraction in NLP", Geeksforgeeks, Jun. 18, 2024, Retrieved from internet URL: https://www.geeksforgeeks.org/nlp/information-extraction-in-nlp/, Retrieved on Jul. 9, 2025, 12 pages.

"Domain Knowledge in Machine Learning", Geeksforgeeks, Apr. 5, 2024, Retrieved from internet URL: https://www.geeksforgeeks.org/machine-learning/domain-knowledge-in-machine-learning/, Retrieved on Jul. 9, 2025, 8 pages.

Appelt et al., "Introduction to information extraction", AI Communications, vol. 12, Issue 3, Aug. 1, 1999, 41 pages.

Sonit Singh, "Natural Language Processing for Information Extraction", Computation and Language, Jul. 6, 2018, 24 pages.

Yang et al., "A Survey of Information Extraction Based on Deep Learning", Applied Sciences, vol. 12, Issue 19, Sep. 27, 2022, 35 pages.

Shaun D'Souza, "Parser Extraction of Triples in Unstructured Text", Computation and Language, Nov. 6, 2018, 7 pages.

"Tokenization", Linguistic Features—spaCy Usage Documentation, Retrieved from internet URL: https://spacy.io/usage/linguistic-features#tokenization, Retrieved on Jul. 9, 2025, pp. 20-46.

"NLTK Tokenizer", Dataloop, Retrieved from internet URL: https://dataloop.ai/library/model/shirinyamani_nltk-tokenizer/, Retrieved on Jul. 9, 2025, 12 pages.

"NLTK: nltk.tokenize package", Retrieved from internet URL: https://www.nltk.org/api/nltk.tokenize.html, Retrieved on Jul. 9, 2025, pp. 1-15.

"Tagger", spaCy, Retrieved from internet URL: https://spacy.io/api/tagger, Retrieved on Jul. 9, 2025, pp. 1-20.

(56) References Cited

OTHER PUBLICATIONS

"Part of Speech Tagging with Stop words using NLTK in python", Geeksforgeeks, Apr. 11, 2022, Retrieved from internet URL: https://www.geeksforgeeks.org/python/part-speech-tagging-stop-words-using-nltk-python/, 7 pages.
Richard Nordquist, "Definition and Examples of Function Words in English", Retrieved from internet URL: https://www.thoughtco.com/function-word-grammar-1690876, Jul. 20, 2024, pp. 1-11.
"Content vs Function Words", the sound of english, Retrieved from internet URL: https://thesoundofenglish.org/content-function-words/, Retrieved on Jul. 10, 2025, 4 pages.
Brown et al., "Language Models are Few-Shot Learners", Computation and Language, Jul. 22, 2020, 75 pages.
Tang et al., "Information Extraction: Methodologies and Applications", Emerging Technologies of Text Mining: Techniques and Applications, Retrieved from Internet URL: https://www.igi-global.com/gateway/chapter/10174#pnlRecommendationForm, 2008, 38 pages.
Small et al.,"Review of information extraction technologies and applications", Neural Computing and Applications, vol. 25, Dec. 1, 2013, 28 pages.
Teresa Jade, "Concept Rules for Information Extraction Models", SAS Text Analytics for Business Applications, Mar. 2019, 31 pages.
Mielke et al., "Between words and characters: A Brief History of Open-Vocabulary Modeling and Tokenization in NLP" Computation and Language, Dec. 20, 2021, 27 pages.
Khyani et al., "An Interpretation of Lemmatization and Stemming in Natural Language Processing", Journal of University of Shanghai for Science and Technology, vol. 22, Issue 10, Oct. 2020, pp. 350-357.
"Tokenization in NLP", Geeksforgeeks, Jun. 4, 2025, Retrieved from internet URL:Tokenization in NLP—GeeksforGeeks, Retrieved on Jul. 9, 2025, 13 pages.
Zhi-Hua Zhou, "A brief introduction to weakly supervised learning", National Science Review, vol. 5, Issue 1, Aug. 25, 2017, pp. 44-53.
Kiss et al., "Unsupervised Multilingual Sentence Boundary Detection", Computational Linguistics, vol. 32, No. 4, Dec. 1, 2006, pp. 485-525.
Banko et al., "Open Information Extraction from the Web", IJCAI'07: Proceedings of the 20th international joint conference on Artifical intelligence, Jan. 6, 2007, pp. 2670-2676.
Jurafsky et al., "Speech and Language Processing", An Introduction to Natural Language Processing, Computational Linguistics, and Speech Recognition with Language Models, Jan. 12, 2025, 599 pages.
"Tf-idf", Retrieved from internet URL: https://en.wikipedia.org/wiki/Tf%E2%80%93idf, Retrieved on Jul. 9, 2025, 6 pages.
Stephanie Buongiorno, "Grammatical Triples Extraction for the Distant Reading of Textual Corpora", Multidisciplinary Studies Theses and Dissertations, May 13, 2023, 254 pages.
Atapattu et al., "Acquisition of Triples of Knowledge from Lecture Notes: A Natural Language Processing Approach", Proceedings of the 7th International Conference on Educational Data Mining, Jul. 2014, pp. 193-196.
Frohmann et al., "Segment Any Text: A Universal Approach for Robust, Efficient and Adaptable Sentence Segmentation", Jun. 24, 2024, 33 pages.
Mohamed Bakrey Mahmoud, "A simple explanation for Sentence Segmentation and implementation", Medium, Feb. 21, 2023, Retrieved from internet URL:https://mohamedbakrey094.medium.com/a-simple-explanation-for-sentence-segmentation-and-implementation-72c66476e72f, Retrieved on Jul. 9, 2025, 12 pages.
"Tokenization in Natural Language Processing: Methods, Types, and Challenges", Solulab, Retrieved from internet URL:https://www.solulab.com/tokenization-nlp/#elementor-toc_heading-anchor-4, Retrived on Jul. 9, 2025, 25 pages.
"Understanding Tokenization in NLP: A Beginner's Guide to Text Processing", Grammarly, Dec. 2, 2024, Retrieved from internet URL: https://www.grammarly.com/blog/ai/what-is-tokenization/, Retrived on Jul. 9, 2025, 19 pages.
"Top 10 Tokenization Techniques for NLP", Eyer, Oct. 12, 2024, Retrieved from internet URL: https://www.eyer.ai/blog/top-10-tokenization-techniques-for-nlp/, Retrived on Jul. 11, 2025, 25 pages.
Webster et al., "Tokenization as the initial phase in NLP", COLING '92: Proceedings of the 14th conference on Computational linguistics, vol. 4, Aug. 23-28, 1992, pp. 1106-1110.
Murel et al., "What are stemming and lemmatization?", IBM, Dec. 10, 2023, Retrieved from internet URL: https://www.ibm.com/think/topics/stemming-lemmatization, Retrieved on Jul. 11, 2025, 6 pages.
Lemmatization vs. Stemming: A Deep Dive into NLP's Text Normalization Techniques, GeeksforGeeks, Jul. 1, 2024, Retrieved from internet URL: https://www.geeksforgeeks.org/nlp/lemmatization-vs-stemming-a-deep-dive-into-nlps-text-normalization-techniques/, Retrieved on Jul. 9, 2025, 12 pages.
Bryan Jurish, "A Hybrid Approach to Part-of-Speech Tagging", Dec. 2003, 26 pages.
Gildea et al., "Automatic Labeling of Semantic Roles", Computational Linguistics, vol. 28, Issue 3, Sep. 1, 2002, pp. 245-288.
Awwalu et al., "Parts of Speech Tagging: A Review of Techniques", FUDMA Journal of Sciences (FJS), vol. 4, Issue 2, Jun. 2020, pp. 712-721.
Derczynski et al., "Twitter Part-of-Speech Tagging for All: Overcoming Sparse and Noisy Data", Proceedings of Recent Advances in Natural Language Processing, Sep. 7-13, 2013, pp. 198-206.
Bao Pham, "Parts of Speech Tagging: Rule-Based", Computer and Information Sciences (CISC), Feb. 19, 2020, 7 pages.
Final Office Action in U.S. Appl. No. 19/028,561 dated Jun. 25, 2025, 29 pages.
Final Office Action in U.S. Appl. No. 19/027,469 dated Jun. 25, 2025, 27 pages.
Final Office Action in U.S. Appl. No. 19/027,199 dated Jun. 25, 2025, 24 pages.
Fang, et al., "Using Word Embedding to Evaluate the Coherence of Topics from Twitter Data," 2016, 4 pages, DOI: http://dx.doi.org/10.1145/2911451.2914729.
Calculating Gini coefficient in Python/numpy, Stack Overflow, 7 pages, retrieved May 14, 2025, https://stackoverflow.com/questions/39512260/calculating-gini-coefficient-in-python-numpy.
Pandey, et al., "Evaluation of crime topic models: topic coherence vs spatial crime concentration," IEEE, 2018, 3 pages.
Rudiger, et al., "Topic modeling revisited: New evidence on algorithm performance and quality metrics," PLOS One, Apr. 28, 2022, 25 pages, https://doi.org/10.1371/journal.pone.0266325.
Sonkusale, et al., "Evaluating Text Preprocessing Methods for Discovering Quality Topics to Improve the Information Retrieval Mechanism," Acta Scientific Computer Sciences, Sep. 2023, 7 pages, vol. 5, Issue 9.
Hussain, et al., Effect of Preprocessing and No of Topics on Automated Topic Classification Performance, Foundation University Journal of Engineering and Applied Sciences, 2022, 8 pages, vol. 3, Issue 1, https://doi.org/10.33897/fujeas.v3i1.571.
Zimmermann, et al., "Approaches to improve preprocessing for Latent Dirichlet Allocation topic modeling," Decision Support Systems, Oct. 2024, vol. 185, 10 pages, https://doi.org/10.1016/j.dss.2024.114310.
Eler, et al., "Analysis of Document Pre-Processing Effects in Text and Opinion Mining," Information, 2018, 13 pages, vol. 9, No. 100, doi:10.3390/info9040100.
Yan, et al., "A biterm topic model for short texts," WWW '13: Proceedings of the 22nd international conference on World Wide Web, May 13, 2013, pp. 1445-1456, https://doi.org/10.1145/2488388.2488514.
Nesca, et al., "A scoping review of preprocessing methods for unstructured text data to assess data quality," International Journal of Population Data Science, 2022, 15 pages, vol. 7, No. 1, https://doi.org/10.23889/ijpds.v7i1.1757.
Churchill, et al., "textPrep: A Text Preprocessing Toolkit for Topic Modeling on Social Media Data," Proceedings of the 10th International Conference on Data Science, Technology and Applications (DATA 2021), pp. 60-70, DOI: 10.5220/0010559000600070.

(56) References Cited

OTHER PUBLICATIONS

Pykes, Kurtis, "What is Topic Modeling? An Introduction With Examples," Datacamp, Oct. 19, 2023, 11 pages, retrieved May 14, 2025, https://www.datacamp.com/tutorial/what-is-topic-modeling.
Abdelrazek, et al., "Topic modeling algorithms and applications: A survey," Information Systems, Feb. 2023, 17 pages, vol. 112, https://doi.org/10.1016/j.is.2022.102131.
Mimno, et al., "Optimizing Semantic Coherence in Topic Models," Proceedings of the 2011 Conference on Empirical Methods in Natural Language Processing, Edinburgh, Scotland, UK, Jul. 27-31, 2011, pp. 262-272.
Prodigy, spaCy, Retrieved from internet URL: https://spacy.io/universe/project/prodigy, Retrieved on Jul. 9, 2025, 3 pages.
"Open Source Data Labeling Platform", Label Studio, Retrieved from internet URL: https://labelstud.io/, Retrieved on Jul. 9, 2025, 8 pages.
"Thematic relation", Wikipedia, Retrieved from internet URL: https://en.wikipedia.org/wiki/Thematic_relation, Retrieved on Jul. 9, 2025, 5 pages.
Semantic Roles in NLP, GeeksforGeeks, Retrieved from internet URL: https://www.geeksforgeeks.org/nlp/semantic-roles-in-nlp/, Aug. 1, 2024, Retrieved on Jul. 9, 2025, 9 pages.
"Ucirvine reuters21578 Datasets at Hugging Face", Retrieved from internet URL: https://huggingface.co/datasets/ucirvine/reuters21578, retrieved from internet on Mar. 18, 2025, pp. 1-13.
Mooney et al., "Mining knowledge from text using information extraction", ACM SIGKDD Explorations Newsletter, vol. 7, Issue 1, Jun. 1, 2005, pp. 3-10.
Chiche et al., "Part of speech tagging: a systematic review of deep learning and machine learning approaches", Journal of Big Data, vol. 9, article No. 10, Jan. 24, 2022, 25 pages.
"Transition guide—Bulk Data Storage System (BDSS)", Available online at https://data.uspto.gov/apis/transition-guide/bdss, Retrieved on Jul. 14, 2025, 1 page.
Shylaja P., "A Review of Computational Biology Approaches in Agriculture", International Conference on Advance IT, Engineering and Management, Jun. 2023, 257 pages.
Verma et al., "Chapter 1: Introduction to Supervised Learning", Data Analytics in Bioinformatics: A Machine Learning Perspective, Jan. 18, 2021, 34 pages.
Punuru et al., "Extraction of Non-hierarchical Relations from Domain Texts", 2007 IEEE Symposium on Computational Intelligence and Data Mining, Jun. 4, 2007, pp. 444-449.
Deshmukh et al., "Deep Learning Techniques for Part of Speech Tagging by Natural Language Processing", 2020 2nd International Conference on Innovative Mechanisms for Industry Applications (ICIMIA), Mar. 5-7, 2020, pp. 76-81.
Shekhar et al., "Towards optimizing the costs of LLM usage", Retrieved from the Internet URL <https://arxiv.org/html/2402.01742v>, Jan. 29, 2024, 12 pages.
Ryu et al., "Key-Element-Informed sLLM Tuning for Document Summarization", Retrieved from the Internet URL <https://arxiv.org/pdf/2406.04625>, 2024, 5 pages.
Jiang et al., "TriSum: Learning Summarization Ability from Large Language Models with Structured Rationale", Retrieved from the Internet URL < https://arxiv.org/pdf/2403.10351>, Mar. 15, 2024, 17 pages.
"Historical Timeline of Vaping & Electronic Cigarettes", CASAA Harm Reduction Saves Lives, Retrieved from internet https://casaa.org/education/vaping/historical-timeline-of-electronic-cigarettes/, Retrieved on Mar. 21, 2025, 81 pages.
Ali et al., "E-cigarette Unit Sales, by Product and Flavor Type—United States 2014-2020", Morbidity and Mortality Weekly Report (MMWR), Volumne 69, Issue 37, Sep. 18, 2020, pp. 1313-1318.
Liu et al., "Abstractive Summarization of Large Document Collections Using GPT", Retrieved from the Internet URL <https://arxiv.org/pdf/2310.05690>, Oct. 9, 2023, 18 pages.
Lu et al., "Hybrid Long Document Summarization Using C2F-FAR and ChatGPT: A Practical Study", Retrieved from the Internet URL < https://arxiv.org/pdf/2306.01169>, Jun. 1, 2023, 14 pages.
Liang et al., "An Efficient Coarse-to-Fine Facet-Aware Unsupervised Summarization Framework based on Semantic Blocks", Proceedings of the 29th International Conference on Computational Linguistics, Oct. 12-17, 2022, pp. 6415-6425.
Yuan et al., "Preserve Context Information for Extract-Generate Long-Input Summarization Framework", The Thirty-Seventh AAAI Conference on Artificial Intelligence (AAAI-23), 2023, pp. 13932-13939.
"Welcome to PyMuPDF", Retrieved from the Internet URL < https://pymupdf.readthedocs.io/en/latest/index.html>, Retrieved on Mar. 19, 2025, 10 pages.
"XML.etree.ElementTree—The ElementTree XML API", Retrieved from the Internet URL <https://docs.python.org/3/library/xml.etree.elementtree.html>, Retrieved on Mar. 20, 2025, 23 pages.
Jiang et al., "LongLLMLingua: Accelerating and Enhancing LLMs in Long Context Scenarios via Prompt Compression", Proceedings of the 62nd Annual Meeting of the Association for Computational Linguistics (vol. 1: Long Papers), Aug. 11-16, 2024, pp. 1658-1677.
Federica Citterio, "5 Steps to improve information Extraction using Trustworthy Generative AI", The SAS Data Science Blog, mailed on May 1, 2024, 6 pages.
Xin Li et al., "Dataset: Reuters Dataset" Available at https://doi.org/10.57702/y8x8zr20, Dec. 16, 2024, 3 pages.
Greg Kamradt, "Needle in a Haystack (GPT-4 128K)", Available online at you tube at https://www.youtube.com/watch?v=KwRRuiCCdmc, Retrieved from internet on Apr. 1, 2025, 18 pages.
Greg Kamradt, "Pressure Testing GPT-4-128K With Long Context Recall", X Post, Nov. 9, 2023, 2 pages.
Tang et al.,"Information Extraction: Methodologies and Applications", Department of Computer Science, Tsinghua University, Jan. 2007 , 40 pages.
Small et al.,"Review of Information Extraction Technologies and Applications", Neural Computing and Applications, Dec. 1, 2013, 29 pages.
Mooney et al.,"Mining Knowledge from Text Using Information Extraction", ACM SIGKDD Explorations Newsletter, vol. 7, Issue 1, Jun. 1, 2005, 8 pages.
Blei et al., "Latent Dirichlet Allocation", Journal of Machine Learning Research 3, 2003, pp. 993-1022.
Deerwester et al.,"Indexing by Latent Semantic Analysis", Journal of the American Society for Information Science, vol. 41, Issue 6, 1990, pp. 391-407.
"6B. LLM & Generative AI", Retrieved from the Internet URL https://maartengr.github.io/BERTopic/getting_started/representation/llm.html, Retrieved on Mar. 18, 2025, 14 pages.
"TextRank and LexRank", Retrieved from the Internet URL <https://en.wikipedia.org/wiki/Automatic_summarization#TextRank_and_LexRank>, Retrieved date Mar. 21, 2025, 15 pages.
Maarten Grootendorst, "BERTopic: Neural topic modeling with a class-based TF-IDF procedure", Retrieved from the Internet URL < arXiv:2203.05794v1>, Mar. 11, 2022, 10 pages.
Scheepers et al., "Towards Interpreting Topic Models with ChatGPT", In the 20th World Congress of the International Fuzzy Systems Association , Jan. 1, 2023, 8 pages.
Wan et al., "Automatic Labeling of Topic Models Using Text Summaries", Proceedings of the 54th Annual Meeting of the Association for Computational Linguistics, Aug. 7-12, 2016, pp. 2297-2305.
Mei et al., "Automatic labeling of Multinomial Topic Models", Proceedings of the 13th ACM SIGKDD international conference on Knowledge discovery and data mining. ACM, Aug. 12-15, 2007, 10 pages.
Lau et al., "Automatic Labelling of Topic Models", Proceedings of the 49th Annual Meeting of the Association for Computational Linguistics, Jun. 19-24, 2011, pp. 1536-1545.
Mao et al., "Automatic Labeling Hierarchical Topics", In Proceedings of the 21st ACM international conference on Information and knowledge management, Oct. 29-Nov. 2, 2012, pp. 2383-2386.
Kou et al., "Automatic Labelling of Topic Models Using Word Vectors and Letter Trigram Vectors", Information Retrieval Technology. Springer International Publishing, Dec. 2, 2015, 12 pages.

(56) References Cited

OTHER PUBLICATIONS

Hulpus et al. “Unsupervised Graph-Based Topic Labelling Using DBpedia”, Proceedings of the sixth ACM international conference on Web search and data mining, Feb. 4, 2013, 10 pages.
Aletras et al., “Representing Topics Using Images”, Proceedings of NAACL-HLT, Jun. 9-14, 2013, pp. 158-167.
Aletras et al., “Evaluating Topic Representations for Exploring Document Collections”, Journal of the Association for Information Science and Technology, vol. 68, Issue No. 1, Jul. 28, 2015, 18 pages.
Griffiths et al., “Finding Scientific Topics”, Proceedings of the National Academy of Sciences, vol. 101, Suppl 1, Apr. 6, 2004, pp. 5228-5235.
Brown et al., “Language Models are Few-Shot Learners”, 34th Conference on Neural Information Processing Systems, 2020, 25 pages.
“Bulk Data Storage System (BDSS)”, Patent Application Full Text Data/XML Version 4.6 Ice (Jan. 2023-Dec. 2023), Retrieved from the Internet URL <20. https://bulkdata.uspto.gov/data/patent/application/redbook/fulltext/2023/> Retrieved on Mar. 18, 2025, 3 pages.
“Datasets at Hugging Face”, Retrieved from the Internet URL <https://huggingface.co/datasets/ucirvine/reuters21578>, Retrieved on Mar. 18, 2025, 13 pages.
Jiang et al., “LongLLMLingua: Accelerating and Enhancing LLMs in Long Context Scenarios via Prompt Compression”, Proceedings of the 62nd Annual Meeting of the Association for Computational Linguistics, vol. 1, Aug. 11-16, 2024, pp. 1658-1677.
Shi et al., “Detecting Pretraining Data from Large Language Models”, Published as a conference paper at ICLR, Mar. 9, 2024, 23 pages.
Liu et al., “Lost in the Middle: How Language Models Use Long Contexts”, Transactions of the Association for Computational Linguistics, Volumne 12, Feb. 23, 2024, pp. 157-173.
Greg Kamradt, “LLMTest_NeedleInAHaystack”, Retrieved from the Internet URL <https://github.com/gkamradt/LLMTest_NeedleInAHaystack>, Retrieved on Mar. 19, 2025, 6 pages.
Fu et al., “LazyLLM: Dynamic Token Pruning for Efficient Long Context LLM Inference”, Retrieved from the Internet URL <https://arxiv.org/abs/2407.14057>, Jul. 19, 2024, 12 pages.
Gim et al., “Prompt Cache: Modular Attention Reuse For Low-Latency Inference”, Proceedings of the 5th MLSys Conference, Apr. 25, 2024, 14 pages.
Liu et al., “Lost in the Middle: How Language Models Use Long Contexts”, Retrieved from the Internet URL <https://export.arxiv.org/pdf/2307.03172>, Nov. 20, 2023, 18 pages.
Li et al., “LongICLBench: Long-context LLMs Struggle with Long In-context Learning”, Retrieved from the Internet URL <https://arxiv.org/abs/2404.02060>, Jun. 12, 2024, 19 pages.
Bijit Ghosh, “Prompt Optimization, Reduce LLM Costs and Latency”, Retrieved from the Internet URL <https://medium.com/@bijit211987/prompt-optimization-reduce-llm-costs-and-latency-a4c4ad52fb59>, Jun. 3, 2024, 14 pages.
“LLM has a performance problem inherent to its architecture: Latency”, Retrieved from the Internet URL <https://www.proxet.com/blog/llm-has-a-performance-problem-inherent-to-its-architecture-latency>, Aug. 1, 2023, 9 pages.
Veraj Paruthi, “How input token count impacts the latency of AI chat tools”, Retrieved from the Internet URL <https://glean.com/blog/glean-input-token-llm-latency>, Dec. 3, 2024, 5 pages.
Cheng et al., “Interpretable Text Classification Using CNN and Max-pooling”, Oct. 14, 2019, 8 pages.
Jade et al., “SAS Text Analytics for Business Applications: Concept Rules for Information Extraction Models”, Cary, NC: SAS Institute Inc., 2019, 31 pages.
Tom Sabo, “Streamlining government regulatory responses with natural language processing, GenAI and text analytics” SAS , Apr. 4, 2024, 5 pages.
Pan et al., “LLMLingua-2: Data Distillation for Efficient and Faithful Task-Agnostic Prompt Compression” Retrieved from the Internet URL < https://arxiv.org/pdf/2403.12968>, Aug. 12, 2024, 19 pages.
Joshua Schrier, “Three LLM Summarization Strategies”, Retrieved from the Internet URL < https://community.wolfram.com/groups/-/m/t/3027301, May 2023, 8 pages.
Isaac Tham, “Summarize Podcast Transcripts and Long Texts Better with NLP and AI”,Retrieved from the Internet URL <https://towardsdatascience.com/summarize-podcast-transcripts-and-long-texts-better-with-nlp-and-ai-e04c89d3b2cb, May 3, 2023, 18 pages.
Gheorghe et al., “vlad-ds/gptrim” Retrieved from the Internet URL <https://github.com/vlad-ds/gptrim>, Retrieved date Mar. 19, 2025, 2 pages.
“LLMLingua”, Retrieved from the Internet URL <https://www.microsoft.com/en-us/research/project/llmlingua/llmlingua/>, Retrieved on Mar. 19, 2025, 2 pages.
“LLMLingua-2”, Retrieved from the Internet URL < https://www.microsoft.com/en-us/research/project/llmlingua/llmlingua-2/>, Retrieved on Mar. 19, 2025, 2 pages.
“Keyword extraction”, WikipediaThe Free Encyclopedia, Retrieved from the Internet URL < https://en.wikipedia.org/wiki/Keyword_extraction>, Retrieved on Mar. 19, 2025, 2 pages.
“Automatic summarization—Keyphrase Extraction”, WikipediaThe Free Encyclopedia, Retrieved from the Internet URL < https://en.wikipedia.org/wiki/Automatic_summarization#Keyphrase_extraction>, Retrieved on Mar. 19, 2025, 16 pages.
“Automatic summarization”, WikipediaThe Free Encyclopedia, Retrieved from the Internet URL < https://en.wikipedia.org/wiki/Automatic_summarization#TextRank>, Retrieved on Mar. 19, 2025, 16 pages.
“bert-score 0.3.1”, Retrieved from the Internet URL < https://pypi.org/project/bert-score/0.3.1/>, Mar. 6, 2020, 10 pages.
“Azure OpenAI Service pricing”, Retrieved from the Internet URL < https://azure.microsoft.com/en-us/pricing/details/cognitive-services/openai-service/>, Retrieved on Mar. 19, 2025, 23 pages.
“5 steps to improve information extraction using trustworthy generative AI”, Retrieved from the Internet URL <https://blogs.sas.com/content/subconsciousmusings/2024/05/01/five-steps-to-improve-information-extraction-using-trustworthy-generative-ai/>, May 1, 2024, 6 pages.
Kurisinkel et al., “LLM Based Multi-Document Summarization Exploiting Main-Event Biased Monotone Submodular Content Extraction”, Association for the Advancement of Artificial Intelligence, Oct. 5, 2023, 7 pages.

* cited by examiner

300

400

2200

Time-Reversal Provides Unsupervised Feedback to LLMs

Varun Yerram * ‡ §
Google DeepMind

Rahul Madhavan * ‡ §
Indian Institute of Science

Savant Addepalli * ‡ §
Google DeepMind

Arun Suggala ‡
Google DeepMind

Karthikeyan Shanmugam ‡ §
Google DeepMind

Prateek Jain ‡
Google DeepMind

Abstract

Large Language Models (LLM) are typically trained to predict in the forward direction of time. However, recent works have shown that prompting these models to look back and critique their own generations can produce useful feedback. Motivated by this, we explore the question of whether LLMs can be empowered to think (predict and score) backwards to provide unsupervised feedback that complements forward LLMs. Towards this, we introduce Time Reversed Language Models (TRLMs), which can score and generate queries when conditioned on responses, effectively functioning in the reverse direction of time. Further, to effectively infer in the response to query direction, we pre-train and fine-tune a language model (TRLM-Ba) in the reverse token order from scratch. We show empirically (and theoretically in a stylized setting) that time-reversed models can indeed complement forward model predictions when used to score the query given response for re-ranking multiple forward generations. We obtain up to 5% improvement on the widely used A1pacaEval Leaderboard over the competent base line of best-of-N re-ranking using self log-perplexity scores. We further show the TRLM scoring outperforms conventional forward scoring of response given query, resulting in significant gain in applications such as citation generation and passage retrieval. We next leverage the generative ability of TRLM to augment or provide unsupervised feedback to input safety filters of LLMs, demonstrating a drastic reduction in false negative rate with negligible impact on false positive rates against several attacks published on the popular JailbreakBench leaderboard.

1 Introduction

Large Language Models (LLMs) trained on a large corpora of text are able to accomplish a wide variety of downstream tasks such as summarization, open-ended/ context-based question answering, document retrieval, and citation generation [Brown et al., 2020, Zhao et al., 2023a]. While the generations from pre-trained and instruction-tuned models already show significant promise, alignment techniques such as Reinforcement Learning via Human Feedback (RLHF) [Anil et al., 2023a, Ouyang et al., 2022 are widely used to improve the quality of their generations further. However, these methods rely heavily on additional supervision to construct preference data, which can be expensive to acquire, or noisy for training. This brings up a natural question-Can we generate useful feedback on LLM generations without additional supervised data?

*Equal Contribution.
‡Work done as part of Google Research
‡Work done as a Student Researcher at Google Research
§Correspondence to: vyerram@google.com, sravantia@google.com, karthikeyanvs@google.com 38th Conference on Neural Information Processing Systems (NeurIPS 2024).

FIG. 22A

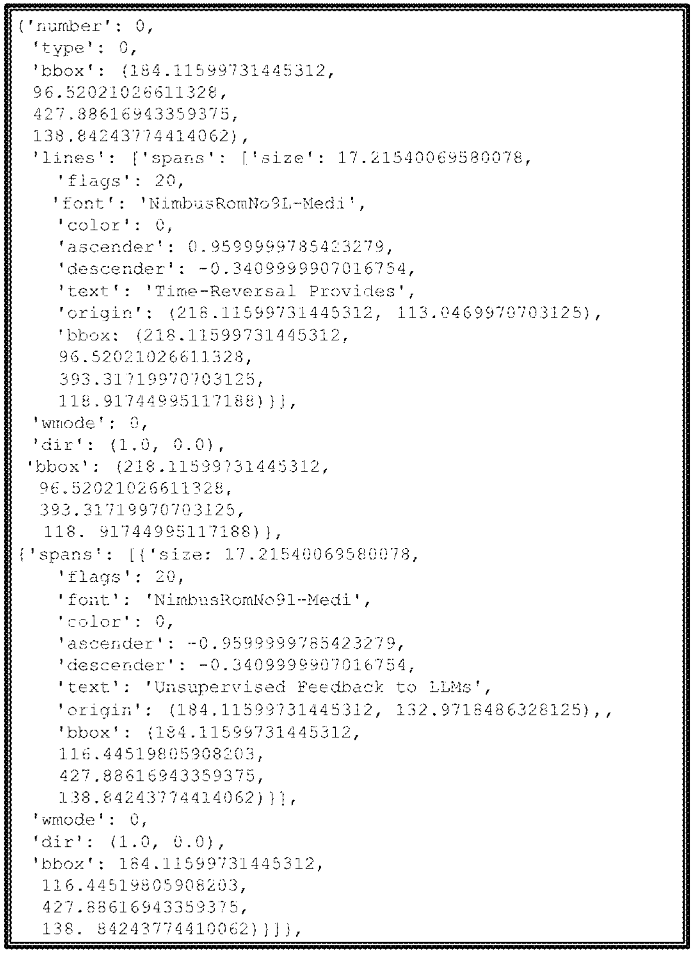

```
{'number': 0,
 'type': 0,
 'bbox': (184.11599731445312,
 96.52021026611328,
 427.88616943359375,
 138.84243774414062),
 'lines': [{'spans': [{'size': 17.21540069580078,
   'flags': 20,
   'font': 'NimbusRomNo9L-Medi',
   'color': 0,
   'ascender': 0.9599999785423279,
   'descender': -0.3409999907016754,
   'text': 'Time-Reversal Provides',
   'origin': (218.11599731445312, 113.0469970703125),
   'bbox: (218.11599731445312,
   96.52021026611328,
   393.3171997070312 5,
   118.91744995117188)}],
 'wmode': 0,
 'dir': (1.0, 0.0),
 'bbox': (218.11599731445312,
  96.52021026611328,
  393.3171997070312 5,
  118. 91744995117188)},
{'spans': [{'size: 17.21540069580078,
   'flags': 20,
   'font': 'NimbusRomNo91-Medi',
   'color': 0,
   'ascender': -0.9599999785423279,
   'descender': -0.3409999907016754,
   'text': 'Unsupervised Feedback to LLMs',
   'origin': (184.11599731445312, 132.9718486328125),,
   'bbox': (184.11599731445312,
   116.44519805908203,
   427.88616943359375,
   138.84243774414062)}],
 'wmode': 0,
 'dir': (1.0, 0.0),
 'bbox': 184.11599731445312,
  116.44519805908203,
  427.88616943359375,
  138. 84243774410062)}]},
```

FIG. 22B

```
<w:p>
 <w:pPr>
  <w:spacing w:after="0"/>
  <w:sectPr>
   <w:type W:val="continuous"/>
   <w:pgSz w:w-"12240" w:h-"15840"/>
   <w:pgMar w:top="1580" w:bottom-"280" w:left-"1720" w:right="1720"/>
  </w:sectPr>
 </w:pPr>
</w:p>
<w:p>
 </w:pPr>
  <w:spacing w:line-"240" w:lineRule-"exact" w:before="88"/>
  <w:ind w:left-"944" w:right="0" w:firstLine="0"/>
  </w:jc w:val-'left"/>
  </w:rPr>
   <w: rFonts w:ascii-"Cambria" w:hAnsi-"Cambria"/>
   <W:sz W:val="14"/>
  </w:rPr>
</w:pPr>
<w:r>
 </w:rPr>
   <w:b>
   <w:sz w:val-"20"/>
 <W:rPr>
 <w:t>Varun</w:t>
</w:r>
<w:r>
 </w:rPr>
   <w:b>
   <w:spacing w:val="-9">
   <w:sz w:val-"20"/>
 </w:rPr>
 <w:t> </w:t>
</w:r>
<w:r>
   </w:rPr>
   <w:b>
   <w:sz w:val-"20"/>
 </w:rPr>
 <w:t>Yerram</w:t>
</w:r>
<w:r>
 </w:rPr>
   <w:b>
   <w:spacing w:val="-9">
   <w:sz w:val-"20"/>
 </w:rPr>
 </w:t> </w:t>
</w:r>
```

FIG. 22C

SYSTEM AND METHOD FOR COMBINING LANGUAGE MODELS WITH NATURAL LANGUAGE PROCESSING FOR SUMMARIZATION

CROSS-REFERENCE TO RELATED APPLICATIONS

This application is a non-provisional of U.S. Provisional Application No. 63/667,303, filed on Jul. 3, 2024, U.S. Provisional Application No. 63/669,341, filed on Jul. 10, 2024, U.S. Provisional Application No. 63/673,873, filed on Jul. 22, 2024, U.S. Provisional Application No. 63/696,449, filed on Sep. 19, 2024, U.S. Provisional Application No. 63/678,191, filed on Aug. 1, 2024, and U.S. Provisional Application No. 63/697,677, filed on Sep. 23, 2024, the entireties of which are incorporated by reference herein.

BACKGROUND

Summarization is a technique to condense large amounts of text into shorter, more manageable content that retains key information and main ideas. Summarization may be extractive or abstractive. Extractive summarization may include selecting important portions of text directly from the original text and combining the selected portions into a summary. Abstractive summarization may include generating new information to convey the main ideas of the original text. Summarization may be used in a wide range of applications. For example, summarization may be used to review, analyze, and/or research a set of documents. Summarization may be particularly helpful in analyzing a large volume of textual information, identifying trends or interesting research subjects, generating answers to queries, etc. Summarization provides a tool for facilitating meaningful inferences from large volumes of unstructured data. However, current summarization techniques have limitations.

SUMMARY

In accordance with at least some aspects of the present disclosure, a non-transitory computer-readable medium having computer-readable instructions stored thereon is disclosed. The computer-readable instructions when executed by a processor cause the processor to receive a set of documents to generate a summary summarizing a trend across the set of documents; input the set of documents into at least one information extraction model; execute each of the at least one information extraction model to extract a first plurality of text segments from the set of documents, wherein the first plurality of text segments reduces a number of tokens from a total number of tokens in each document of the set of documents to a first token count, and wherein the first plurality of text segments are representative of the trend; determine a second plurality of text segments based on the first plurality of text segments, wherein the second plurality of text segments correspond to documents selected from the set of documents based on one or more of at least one keyword, metadata, or a topic of interest, and wherein a number of the second plurality of text segments is less than or equal to a number of the first plurality of text segments; determine a third plurality of text segments from the second plurality of text segments based on at least one of a frequency of occurrence, a priority score, or a location of a text segment in a document of the set of documents, wherein a number of the third plurality of text segments is less than or equal to the number of the second plurality of text segments, and wherein the third plurality of text segments reduces the number of tokens to a second token count that is less than the first token count; generate a compressed representation of the set of documents from the third plurality of text segments to include in a prompt for a language model, wherein the prompt comprises the second token count; input the prompt into the language model; and execute the language model to generate the summary based on the prompt for the set of documents.

In accordance with at least some other aspects of the present disclosure, a system is disclosed. The system includes a memory having computer-readable instructions stored thereon and a processor that executes the computer-readable instructions to receive a set of documents to generate a summary summarizing a trend across the set of documents; input the set of documents into at least one information extraction model; execute each of the at least one information extraction model to extract a first plurality of text segments from the set of documents, wherein the first plurality of text segments reduces a number of tokens from a total number of tokens in each document of the set of documents to a first token count, and wherein the first plurality of text segments are representative of the trend; determine a second plurality of text segments based on the first plurality of text segments, wherein the second plurality of text segments correspond to documents selected from the set of documents based on one or more of at least one keyword, metadata, or a topic of interest, and wherein a number of the second plurality of text segments is less than or equal to a number of the first plurality of text segments; determine a third plurality of text segments from the second plurality of text segments based on at least one of a frequency of occurrence, a priority score, or a location of a text segment in a document of the set of documents, wherein a number of the third plurality of text segments is less than or equal to the number of the second plurality of text segments, and wherein the third plurality of text segments reduces the number of tokens to a second token count that is less than the first token count; generate a compressed representation of the set of documents from the third plurality of text segments to include in a prompt for a language model, wherein the prompt comprises the second token count; input the prompt into the language model; and execute the language model to generate the summary based on the prompt for the set of documents In accordance with at least some other aspects of the present disclosure, a method is disclosed. The method includes receiving, by a processor executing computer-readable instructions stored on a memory, a set of documents to generate a summary summarizing a trend across the set of documents; inputting, by the processor, the set of documents into at least one information extraction model; executing, by the processor, each of the at least one information extraction model to extract a first plurality of text segments from the set of documents, wherein the first plurality of text segments reduces a number of tokens from a total number of tokens in each document of the set of documents to a first token count, and wherein the first plurality of text segments are representative of the trend; determining, by the processor, a second plurality of text segments based on the first plurality of text segments, wherein the second plurality of text segments correspond to documents selected from the set of documents based on one or more of at least one keyword, metadata, or a topic of interest, and wherein a number of the second plurality of text segments is less than or equal to a number of the first plurality of text segments; determining, by the processor, a third plurality of text segments from the second plurality of text segments based on at least one of a frequency of occurrence, a priority score, or a location of a text segment in a document of the set of documents, wherein a number of the third plurality of text segments is less than or equal to the number of the second plurality of text segments, and wherein the third plurality of text segments reduces the number of tokens to a second token count that is less than the first token count; generating, by the processor, a compressed representation of the set of documents from the third plurality of text segments to include in a prompt for a language model, wherein the prompt comprises the second token count; inputting, by the processor, the prompt into the language model; and executing, by the processor, the language model to generate the summary based on the prompt for the set of documents.

The foregoing summary is illustrative only and is not intended to be limiting in any way. In addition to the illustrative aspects, embodiments, and features described above, further aspects, embodiments, and features will become apparent by reference to the following drawings and the detailed description.

BRIEF DESCRIPTION OF THE DRAWINGS

FIGS. 22A-22C illustrate another example of an experiment conducted on the processes of FIGS. 15 and 16, according to embodiments of the present technology.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skills in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
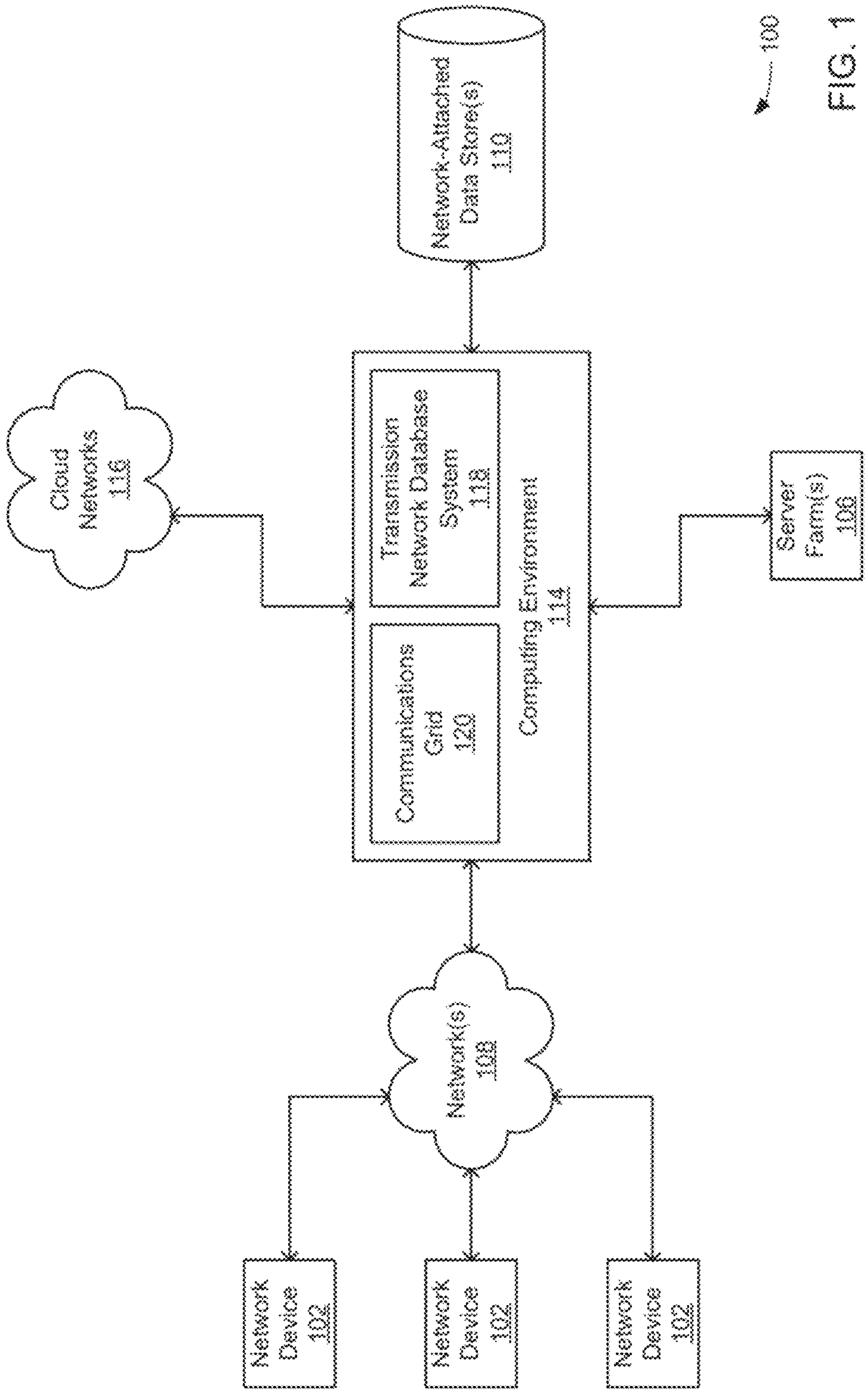
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
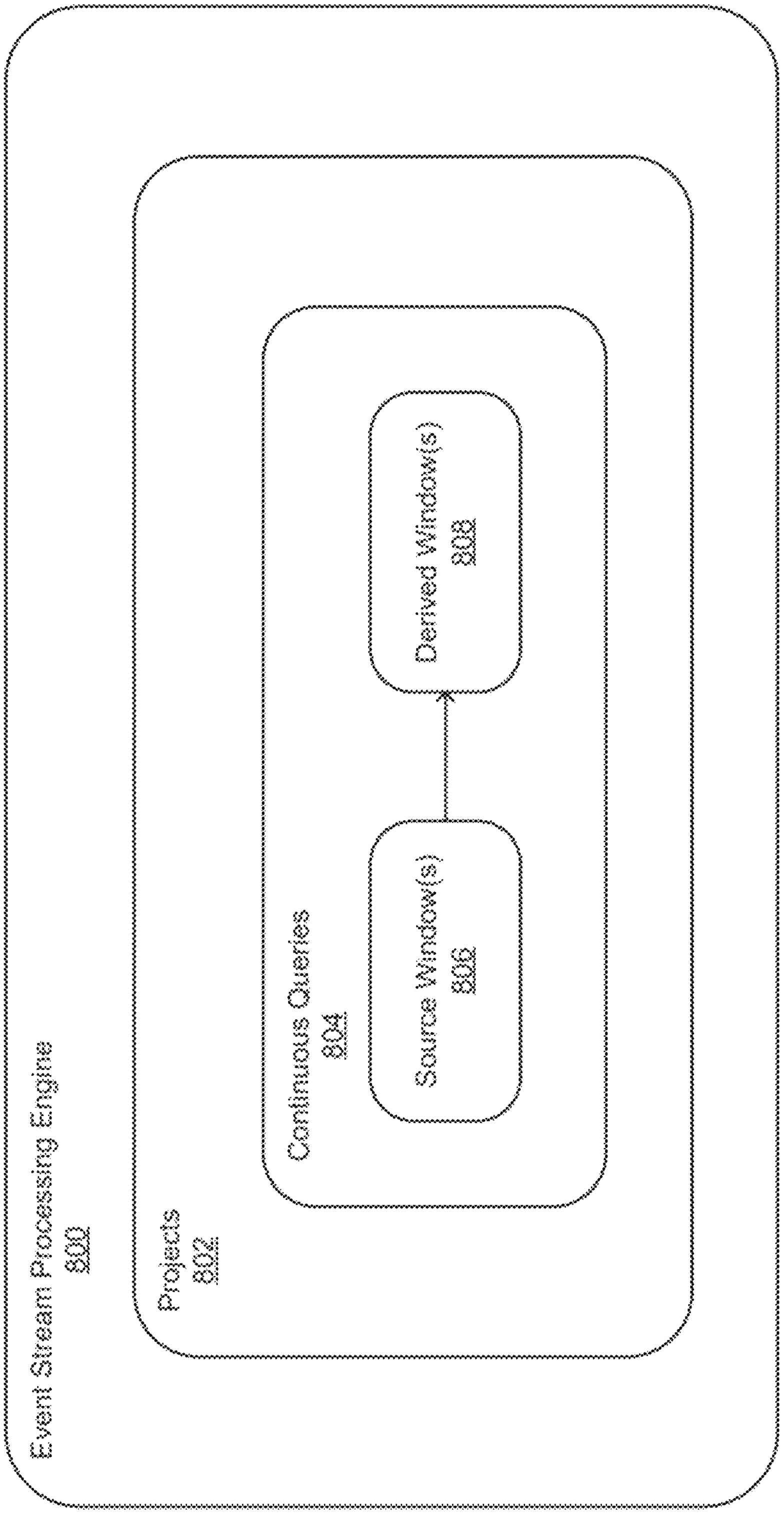
FIG. 8 illustrates a block diagram including components of an Event Stream Processing Engine (ESPE), according to embodiments of the present technology.
Figure 9:
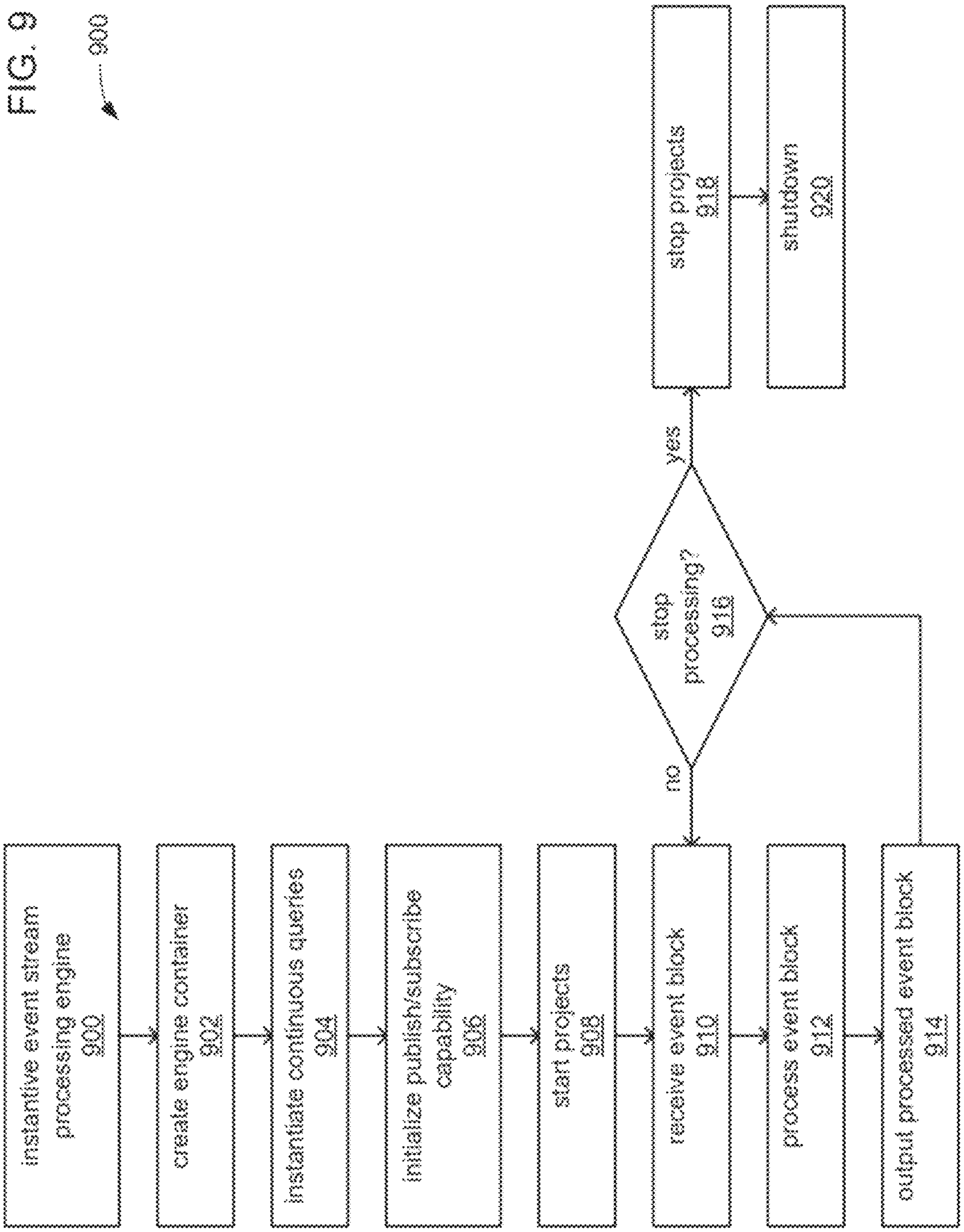
FIG. 9 illustrates a flow chart showing an example process including operations performed by an event stream processing engine, according to some embodiments of the present technology.
Figure 10:
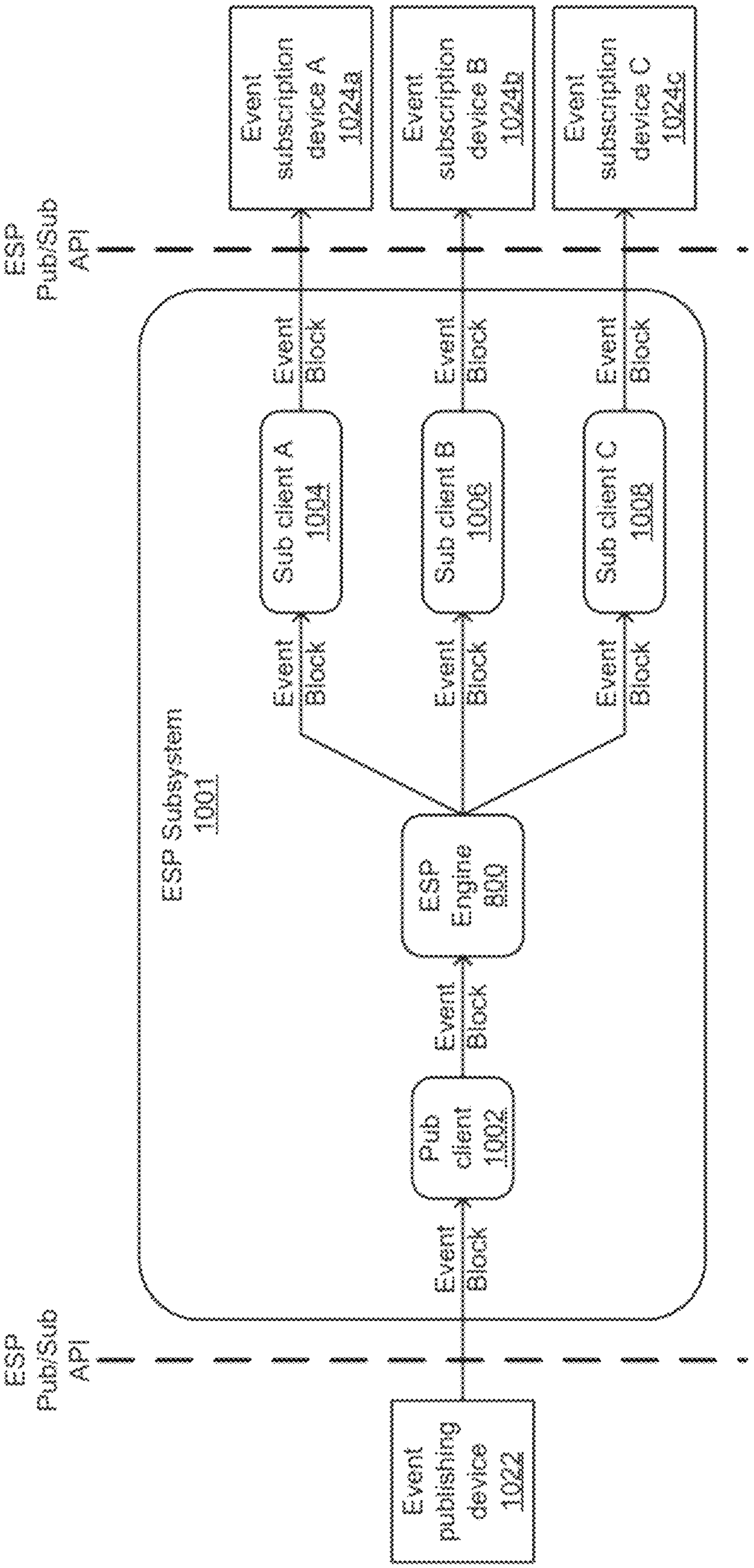
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
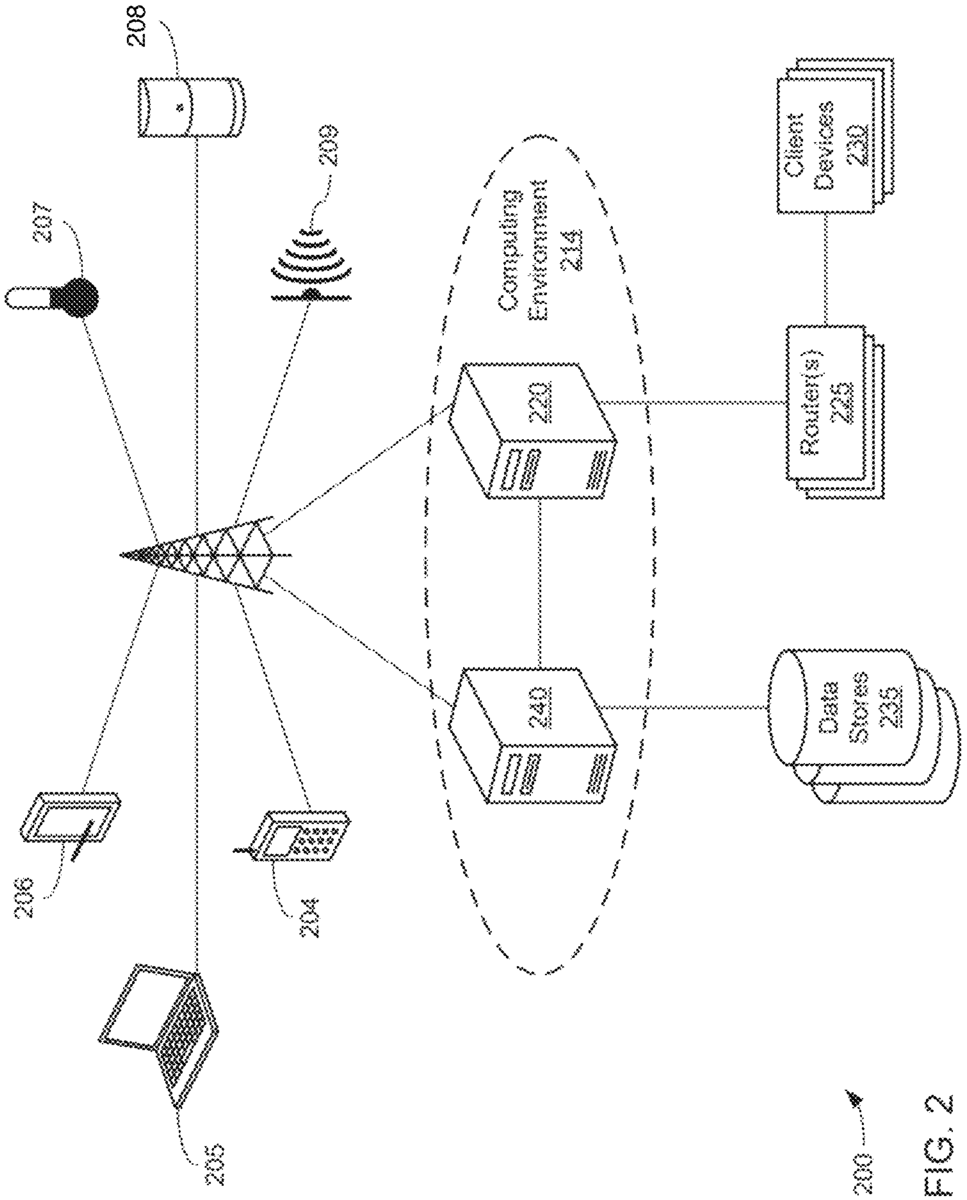
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
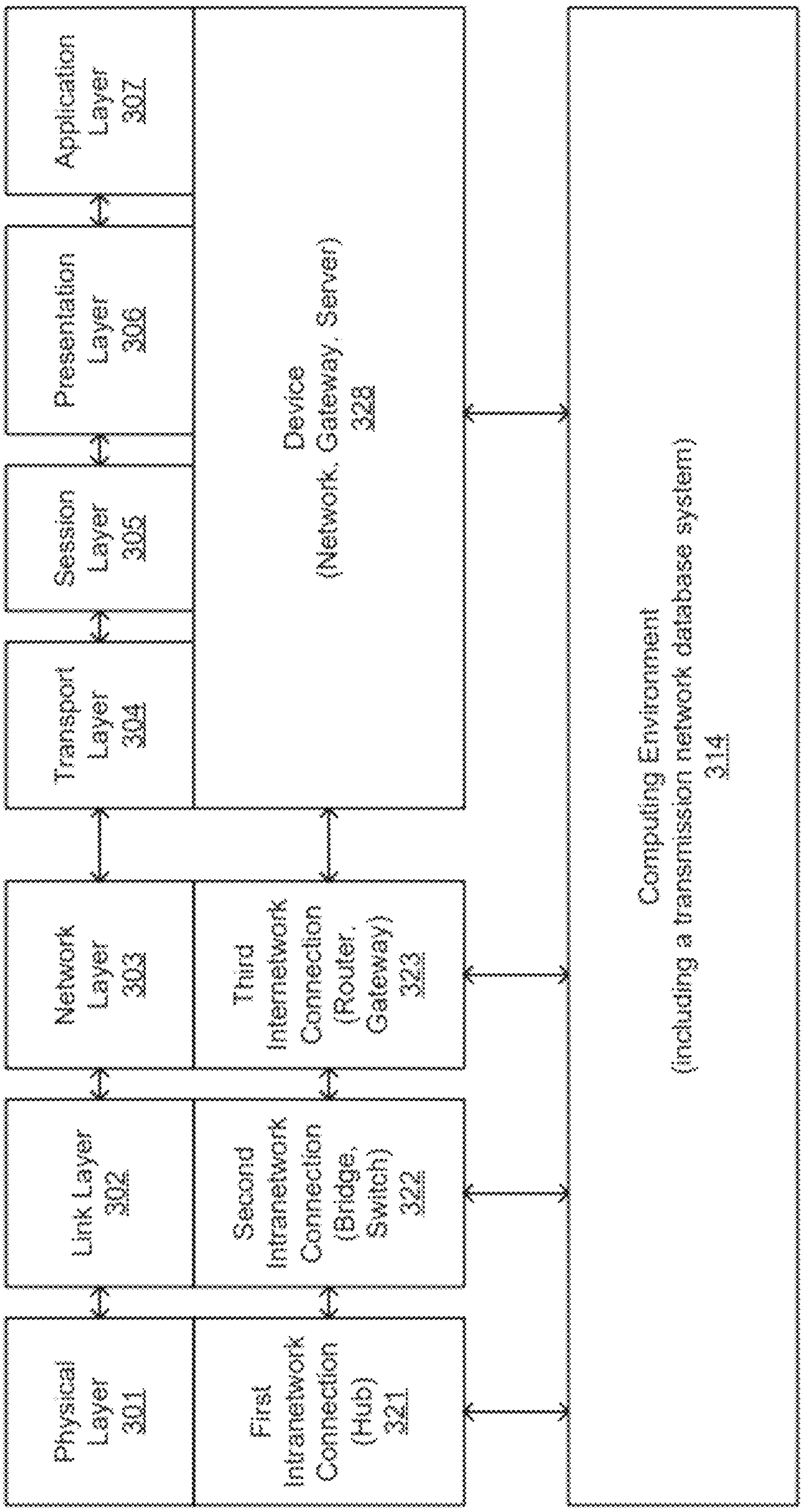
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
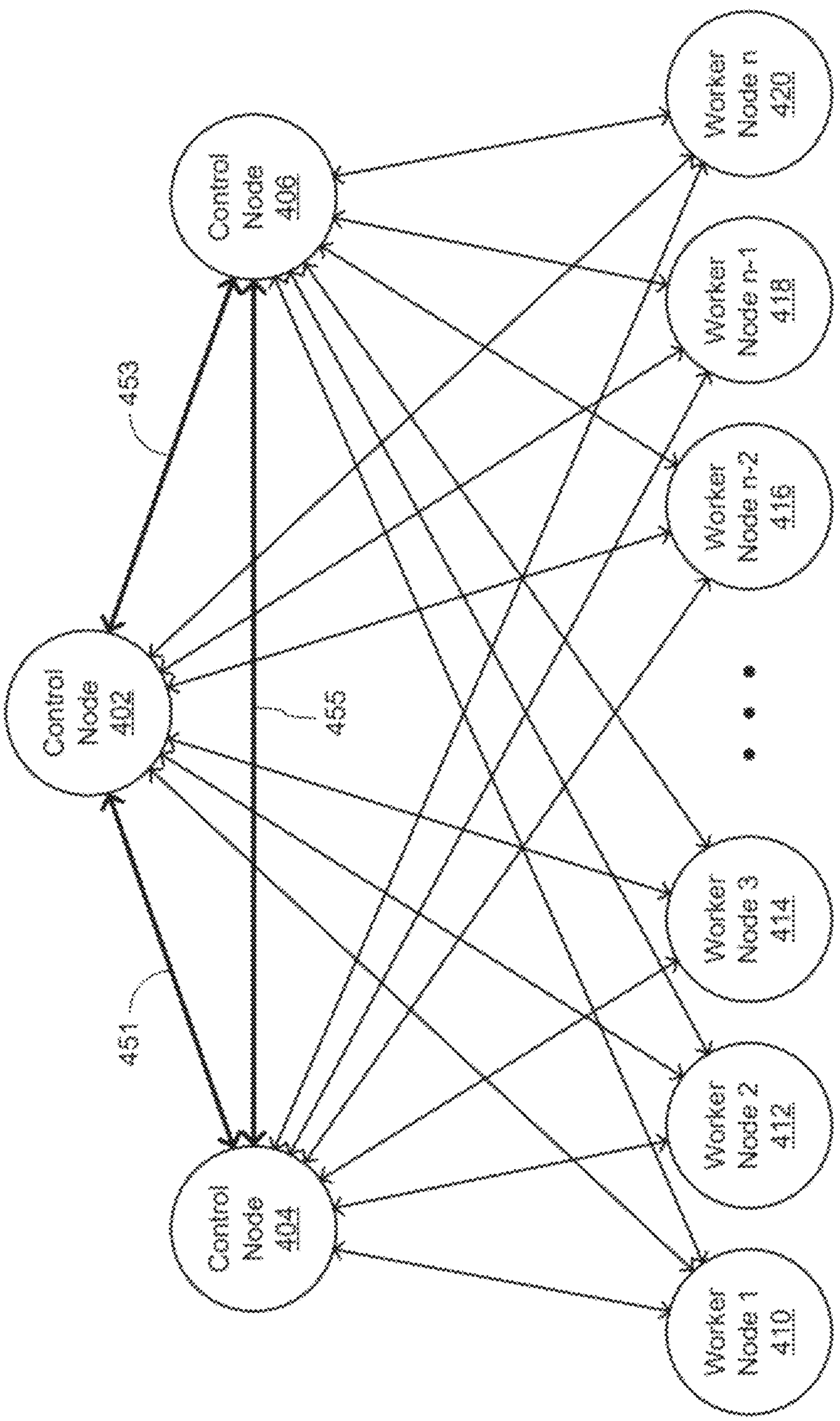
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and restart the project from that checkpoint to minimize lost progress on the project being executed.

Figure 5:
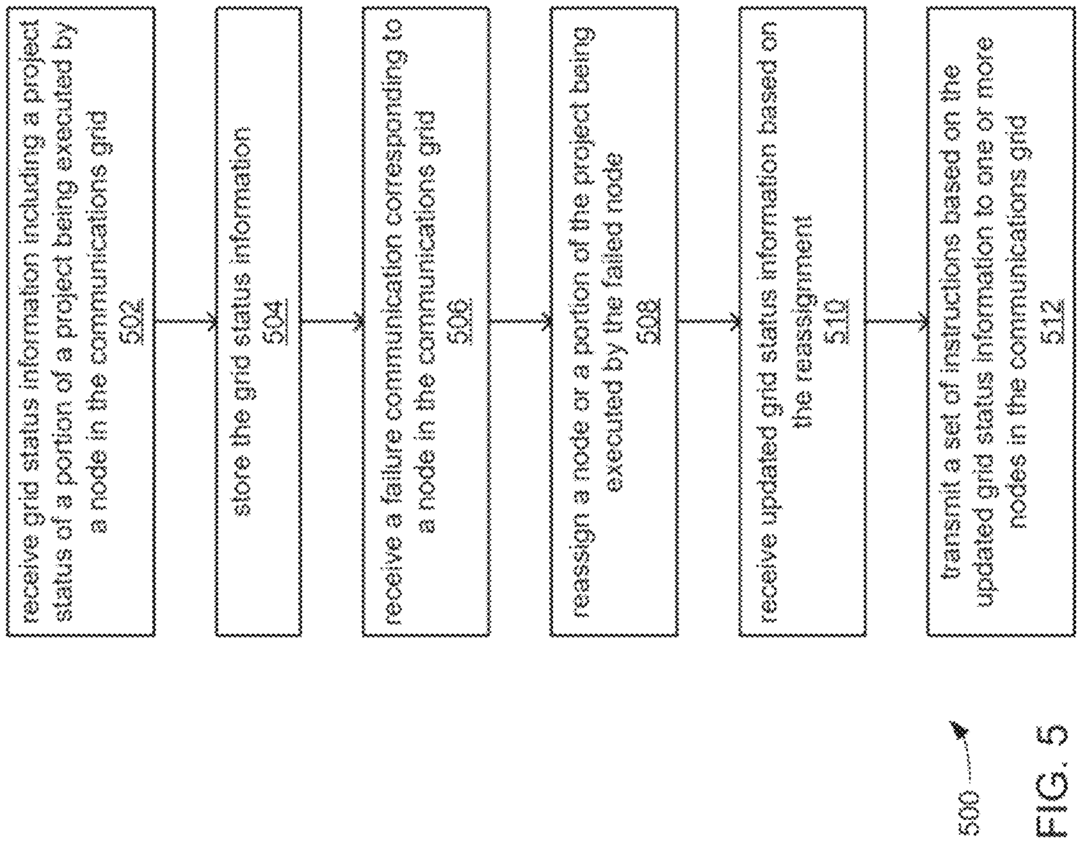
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
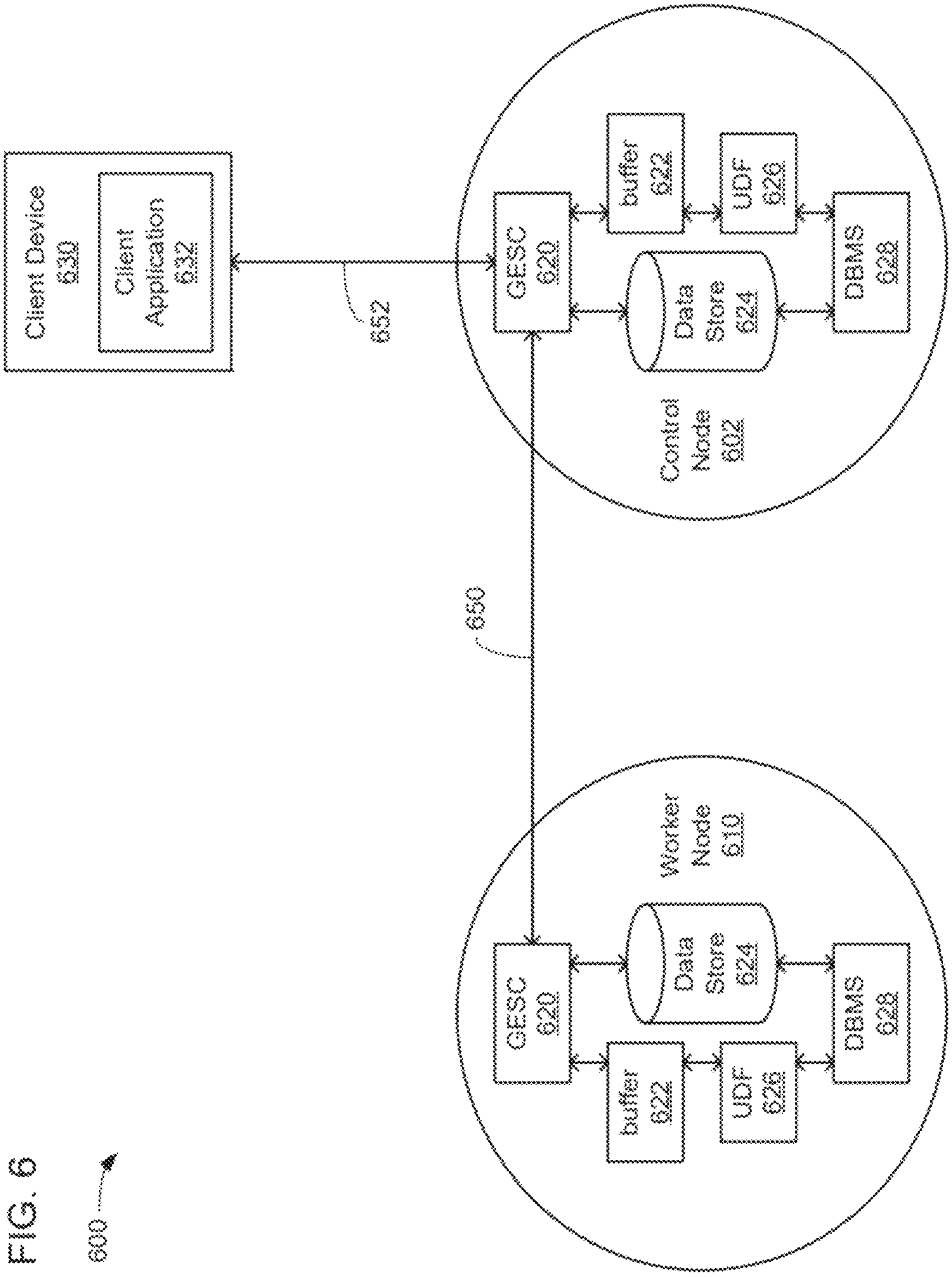
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBM S. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a node 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
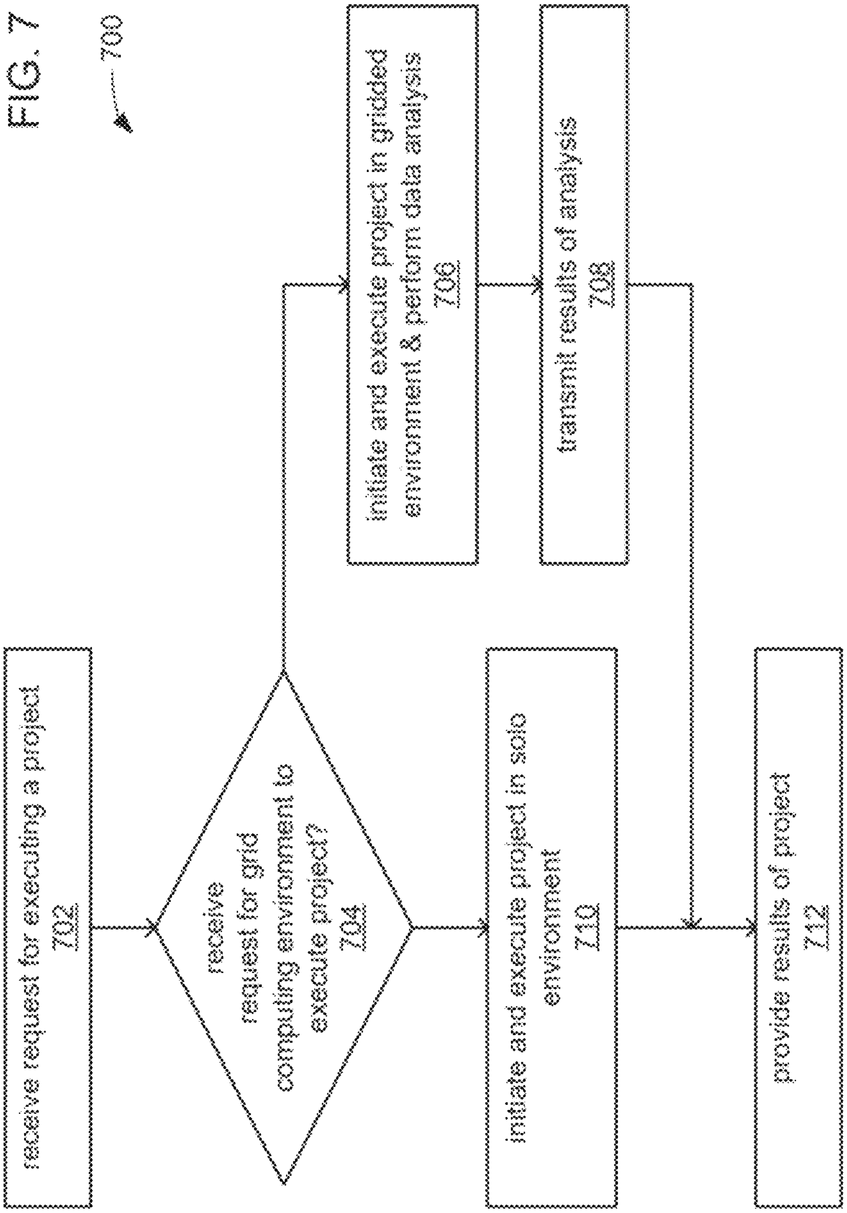
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe A Pls may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
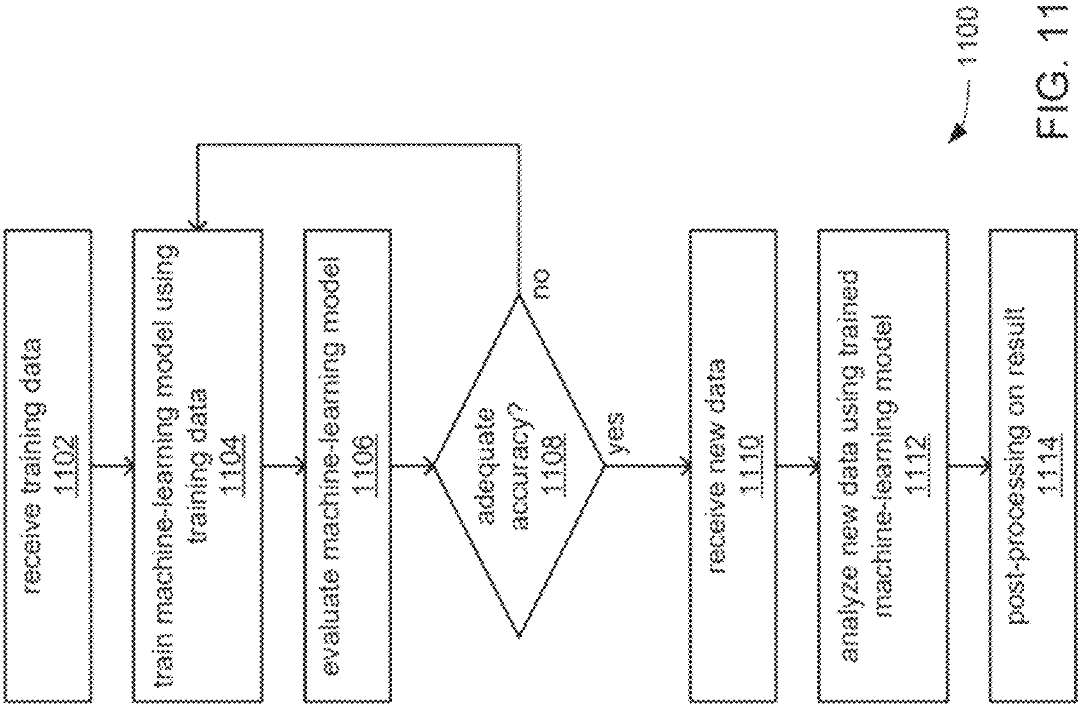
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bidirectional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Other networks may include transformers, large language models (LLMs), and agents for LLMs.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
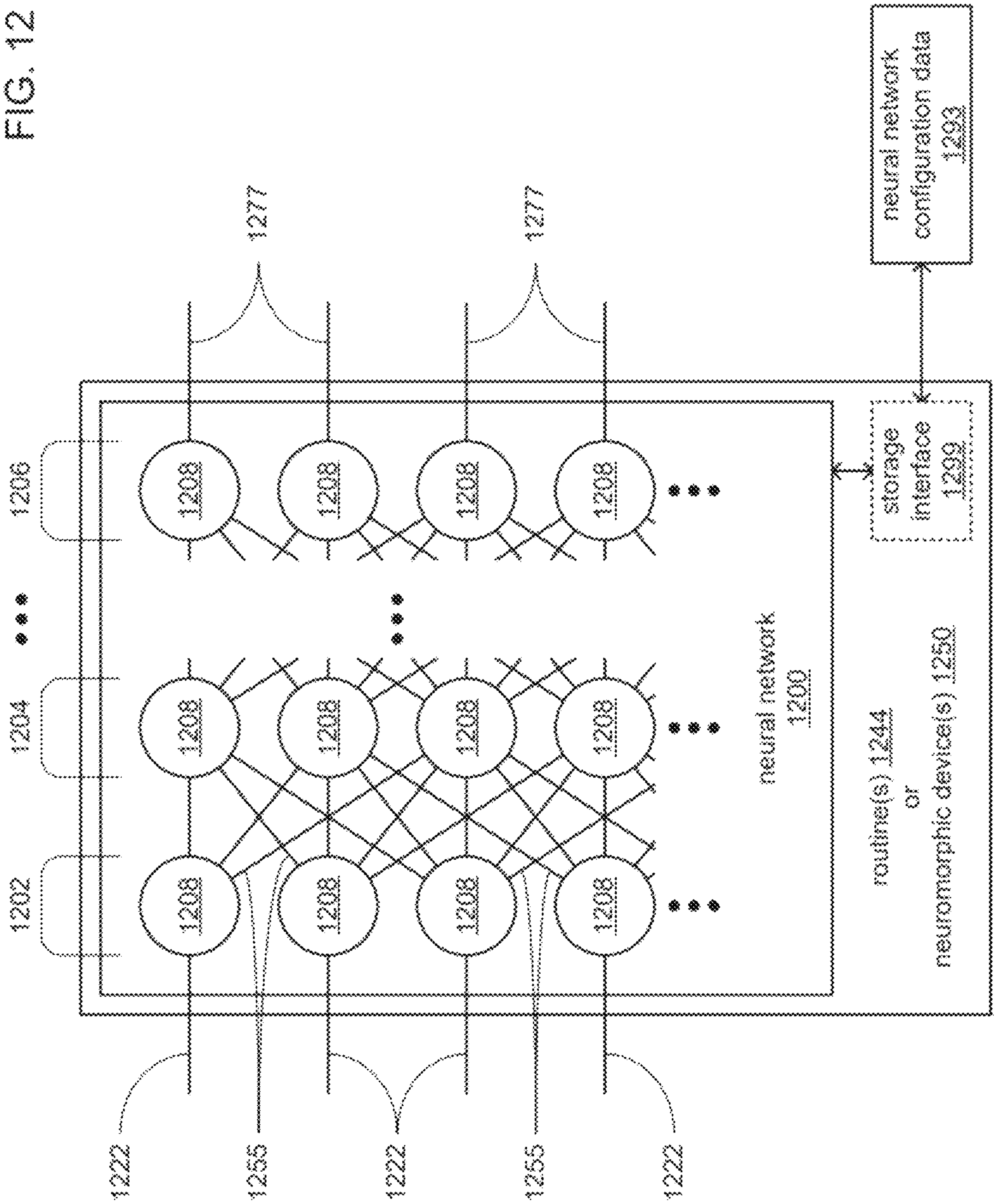
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a “forward” direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a “backward” direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation y=max(x, 0) where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide energy savings when compared to generic CPUs. For example, some of these processors can include a graphical processing unit (GPU), an application-specific integrated circuit (A SIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
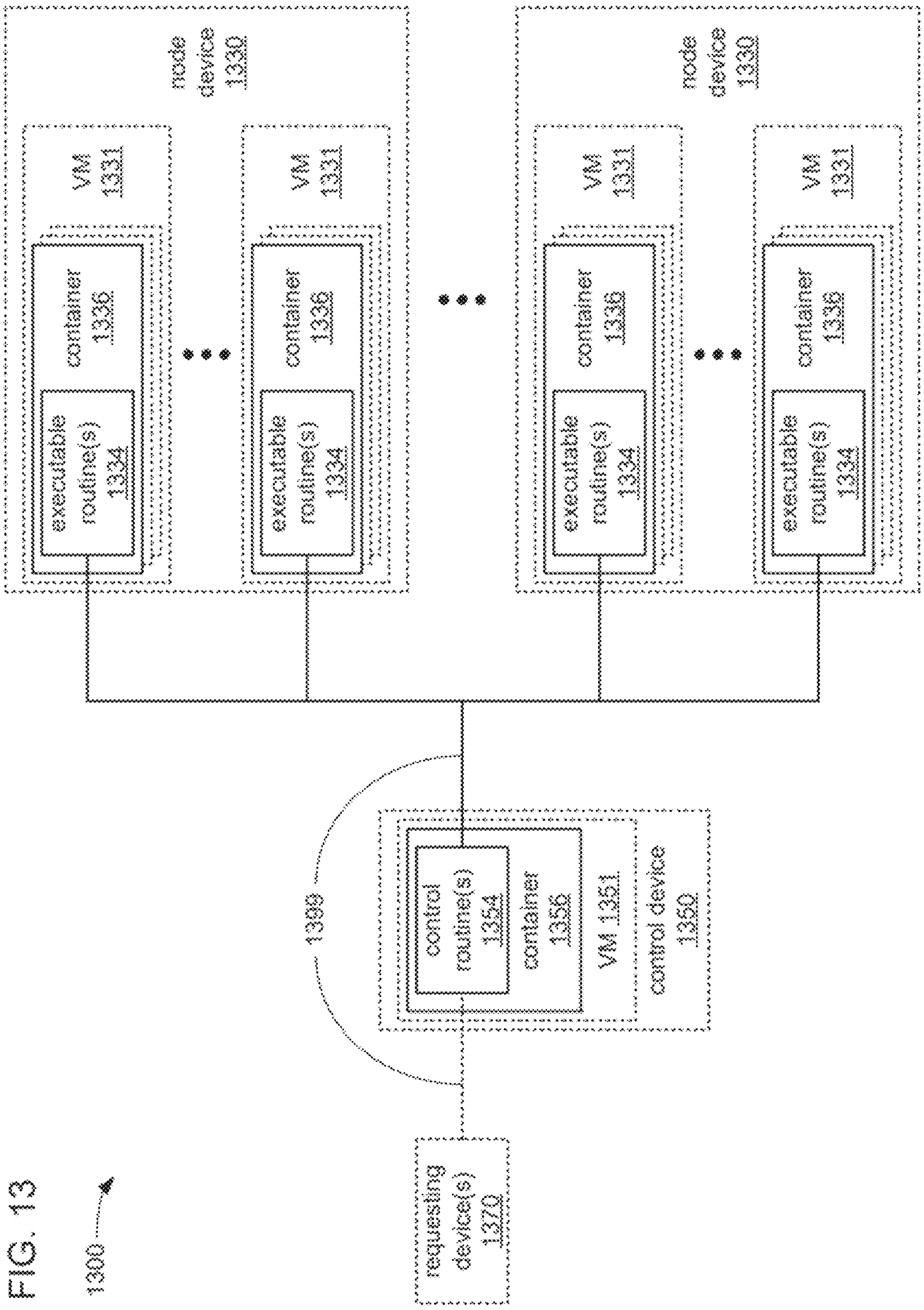
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "A CID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Cloud Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

The present disclosure is directed to summarization, and particularly to using language models such as Large Language Models (LLMs) to generate summaries for large volume of texts. LLMs are useful tools to generate text. To generate text using LLMs, a prompt is input into the LLM. The prompt provides instructions to the LLM on how and what data to generate. LLMs suffer from many limitations when generating text. For example, LLMs are prone to hallucinations (e.g., capability to make up information or create erroneous responses). LLMs are also restricted to a certain number of tokens in the prompt and the generated response. A token may be considered a basic unit of information that the LLM may process. Tokenization involves breaking down an input text into a plurality of tokens. LLMs have a maximum number of tokens that that may process in a single request. Likewise, LLMS have a maximum number of tokens that they may generate as an output in response to the single request. The number of tokens that are input into the LLM or output from the LLM may be represented in terms of a context window. In other words, a context window may refer to a number of tokens that the LLM may process in a single request. M any medium-to-large documents do not fit into this context window. Thus, the ability of LLMs to process medium-to-large documents that typically exceed the context window is severely limited.

In particular, when documents are short, there may be no need to use an LLM to create a summary (e.g., because a summary may be manually generated). However, for medium-to-longer documents, including reports, patents, transcripts, books, research articles, manuscripts, thesis documents, longer email threads, multi-phase or multi-year customer interactions, multi-year data, long chat threads, etc., a summary may be desirable to effectively digest and analyze the information. A "summary" of a document may be a condensed version of that document. A summary may be a set of facts from the document, a list of key sentences/relationships, a human-like summary of the content, or whatever format the user specified in the prompt to the LLM. For example, a summary may provide the main themes, main points, and/or essential details from a document. Thus, a summary may be a concise distillation of the key ideas of a document. The summary of a document may be significantly shorter in length than the document itself.

Summaries may have wide applications. For example, a summary may be used to provide an overview of a document, aid in decision making, offer insights, identify trends, answer queries, search the content of a document, etc. Thus, a summary may be used as a stand-in for a document. Summaries may also be presented to users as a better alternative to a title or section in search results. A summary of an email thread may be a good way to avoid re-reading a long thread before planning a response or deciding whether reading the thread is a good use of time. A summary may have other or additional applications. There are two types of summary creation methods: extractive and abstractive. Extractive summarization methods identify sentences from a document that are considered important and concatenate those sentences together in order to generate a summary. Abstractive summarization methods try to create new text from the provided document to summarize the content of the document. LLMs are currently the only method available to create a high-quality abstractive summary.

However, using LLMs for generating abstractive summaries has several technical problems in addition to the hallucinations and limited context window mentioned above. For example, there are hardware challenges associated with existing LLMs. In particular, there are three main challenges when LLMs are used in long context scenarios for generating abstractive summaries: (1) higher computational costs, encompassing both financial and latency expenses; (2) longer prompts introducing irrelevant and redundant information, which may weaken LLMs' performance; and (3) LLMs exhibiting position bias, also known as the "lost in the middle" issue where placement of key information within the prompt may affect LLMs' performance.

More particularly, there exists a dependency between prompt size and response rate for LLMs. For example, longer prompts may lead to memory limitations and latency issues. A longer prompt may require a longer time for the LLM to process and generate an output. Longer prompts may also require more operations to generate tokens. Thus, the longer the prompt, the longer the time needed to generate the output. In some cases, the computational costs may increase quadratically with the number of tokens in the prompt. Additionally, longer prompts may require more memory to store. Longer prompts may also mean more tokens, which again may need more memory to store, leading to memory issues and bottlenecks. Latency may be related to both memory access latency and computational bottlenecks. When more information is stored in a memory, retrieving that information from the memory may add to overall latency (e.g., due to larger cache sizes that may be needed and longer access times due to large prompts). Additionally, the increased computational requirements for processing long prompts may lead to bottlenecks in the inference pipeline. In some cases, the number of tokens in the prompt may directly impact the computational resources required by the LLM, which in turn may affect costs and latency. In general, more tokens equate to higher processing demands, resulting in increased expenses and longer response times. Therefore, longer prompts may lead to requiring extra computational costs. Further, LLMs may suffer from position bias in which the model may prioritize information based on its position within the prompt. This may lead to unexpected model failures and may negatively impact performance, robustness, and reliability of the LLM.

Thus, there are technical challenges in using LLMs for generating summaries that limit the scope and usability of LLMs. The present disclosure provides technical solutions to address these technical problems. In particular, the present disclosure provides approaches that overcome the challenges of token counts (e.g., context window) through prompt compression. Prompt compression involves strategically selecting a relevant subset of text from a set of documents to represent the set of documents in a prompt to an LLM. In particular, the proposed approach intelligently decides which text from the initial set of documents to keep (as opposed to deciding which text to eliminate) for prompt compression. In some embodiments, the text that is intelligently decided to be kept for prompt compression may include text segments such as snippets. In some embodiments, each snippet may include more than a word and less than a sentence. Thus, the proposed approach does not simply use a list of words or the full or truncated content of the documents themselves. Rather, the proposed approach leverages linguistic rules and Boolean logic to select relevant subsets of text (e.g., snippets) from the sets of documents. In some embodiments, the proposed approach may use an information extraction model to extract the relevant subsets of text (e.g., snippets).

By compressing the prompt, the present disclosure provides technical solutions that allow medium-to-long documents to be processed by LLMs without violating the context window, thereby allowing medium-to-long documents to be summarized more concisely, clearly, and accurately. In addition to these software improvements, compressed prompts provide hardware improvements as well. For example, by reducing the size of the prompt and by having more relevant information in the prompt, the present disclosure reduces the computational cost burden associated with existing technologies. A shorter prompt may be processed faster by the LLM. A shorter prompt may also not need as much memory to store, thereby at least alleviating or even removing memory bottlenecks, improving memory access times, reducing the number of computations to be performed (e.g., shorter prompts leading to fewer tokens that need processing), and overall increasing the performance of the LLM. The proposed approach also alleviates position bias problems in the LLM because prompts are shorter and all the information in the prompt is relevant information, thereby reducing the risk of having irrelevant information (and therefore inaccurate or unclear outputs).

The present disclosure is also directed to abstractive summarization methods. Specifically, the present disclosure is directed to generating summaries from long documents where current LLMs run into context window. To avoid exceeding the context window (e.g., by compressing prompts) and to improve the quality of the summary, the present disclosure extracts important information from the document first, then uses that extracted information in the prompt to the LLM to generate a summary. Thus, the present disclosure provides an intelligent, natural language processing (NLP) based form of prompt compression. To extract the important information from a document, the present disclosure provides using an information extraction model to create chunks of information, referred to as text segments, from the document.

The abstractive summarization methods disclosed herein provide several advantages when summarizing medium-to-long documents: (1) reducing prompts to LLMs through identifying which tokens to keep; (2) creating high quality and accurate document summaries from text segments of meaningful text from the original documents; (3) using an information extraction model to select the text segments; (4) recognizing part-to-speech and grammatical relationships when deciding what tokens to keep; (5) tuning the information extraction model to be domain aware; (6) recognizing domain relevant key words and phrases when using domain aware models; (7) leveraging models that focus on factual elements such as who, when, where through use of predefined concepts (information extraction models) and leveraging sentence or clause-based text segments when data reflects primarily facts as opposed to thematic content; (8) not needing training data to build the information extraction model; (9) compressing the text of the original documents significantly and still generating good summaries based on comparisons using the full text. As an example, to summarize a 300 page book manually (e.g., using human mind or pen and paper), the book would need to be read carefully, basic plot and themes identified, and the remembered information used to write a book report. Humans do not go through the steps proposed herein to create summaries, such as examining grammatical relationships, identifying key relevant information, creating a set of text segments from the grammatical and relevancy observations, using those text segments to understand what was in the longer text, and generating a summary. Accordingly, any summary that may be generated using the human mind or pen and paper would is unlikely to be accurate, concise, or clear. Further, the time taken to summarize a book using the human mind or pen and paper would be enormous (e.g., a few months at least). In contrast, using the proposed approach, the book may be summarized in a matter of seconds and the generated summary may be a clear, concise, and accurate summary.

In addition to providing mechanisms for summarizing medium-to-long documents, the present disclosure provides mechanisms for summarizing trends across a large volume of documents. A "trend" may be a pattern or tendency of change, process, output, or condition observed across the large volume of documents. Identifying trends across a large volume of documents (e.g., over thousands of documents) is difficult. For example, identifying trends from research papers spanning the past 30 years regarding how the number of transistors used per square inch of a chip has increased may be manually impossible and largely undesirable. Further, tools such as unsupervised topic identification or categorization that have been used for trend summarization are inadequate and often inaccurate. The main value of unsupervised topic identification or summarization may be in grouping related documents together. Methods like information extraction often require a human to know what types of information are important before working with the documents, while search and information retrieval rely on finding answers within a single document.

What is sometimes needed is a type of summary across a set of documents to better understand the shared information and/or trends. LLMs may not always be able to efficiently take in the full content of a set of documents for a variety of reasons. For example, the token count may be huge, expanding beyond the context window allowed by the LLM, slowing the LLM down significantly, and/or incurring excessive costs for token-count charges. Using LLMs for summarizing trends across a set of documents suffers from the same technical problems discussed above.

The present disclosure provides a mechanism for summarizing trends across a set of documents. In particular, the set of documents may be represented by sets of strings pulled from the documents. These strings may be referred to as text segments (e.g., snippets). Snippets may be composed of key words and key phrases and may also include some context around the key words or key phrases. A snippet may be as long as a sentence or in some applications, multiple adjacent sentences. Snippets may be identified in a variety of ways, including through use of an information extraction (IE) model, use of heuristics like the first "n" tokens, the first sentence of each paragraph, the topmost frequent nouns and/or verbs, etc., and use of other methods for identifying key sentences or phrases such as LexRank or extractive summaries. Tools available for structural analysis of documents may also be used to detect the key information from the layout and formatting, such as a set of headings. The method that is used for selecting the snippets may be based on the document types and characteristics. For example, the use of key sentences may be useful for shorter documents or if the set of documents is smaller (e.g., around 1000 documents). Use of snippets may be more useful for longer documents or a set of documents with repeated themes or points. Forms or highly formatted documents may benefit from a structural analysis approach.

To identify and summarize the trends across a set of documents, the present disclosure identifies a plurality of text segments from each document in the set of documents. In some embodiments, the text segments may be saved with each document for future analyses or document level text segments may be used to create document-level summaries and one or both representations of each document may be saved. In some embodiments, the set of documents may be subdivided by metadata into subsets of documents and the following operations may be applied to each subset of documents. In some embodiments, the information across the set (or subset) of documents may be synthesized, identifying the most common or most important set of text segments (e.g., snippets). The text segments may be passed as a prompt to the LLM. In some example embodiments, GPT-4 may be used for the LLM. The prompt may be used to generate a trend summary across the set (or subset) of documents. The prompt may also be used to answer a query related to the trend.

The present disclosure provides several advantages. For example, the present disclosure provides using various techniques to represent a set of documents with fewer tokens, including these methods or any combination of them. For example, information extraction models may be used to produce representative snippets or other machine learning methods or structural analysis tools may be used to produce representative snippets or identify key sentences. Multiple methods for combining snippets across sets of documents may be used to represent that set of documents in a prompt to LLMs, including but not limited to use of top-n most frequent snippets across a set of documents, use of top-n most frequent snippets reranked by importance in the set, use of snippets with top-n most frequent or important keywords or key phrases, use of snippets based on position and relationships indicated by formatting, use of the first n snippets found in the document or the first n and last m snippets, and use of all snippets per document. Further, by using the representative snippets in a prompt to an LLM to produce a summary across documents or answer certain types of questions, the present disclosure prevents too many tokens from going through the LLM, thereby saving cost, processing and response time, as well as eliminating some types of hallucinations.

The present disclosure cannot be practically performed in the human mind. In particular, neither summarizing trends across documents nor summarizing individual documents can be performed in the human mind. Nor can the summarizing of the trends across documents or summarizing documents be practically performed using pen and paper. Real-world applications may have thousands or millions of documents. A human mind is incapable of practically analyzing the large volume (e.g., 500 or greater) of textual data to generate a clear, concise, and accurate summary in a reasonable amount of time (e.g., a few seconds). For example, to practically analyze 500 documents to generate a clear, concise, and accurate summary, it may take a human being several months, if they are able to do it all. The concepts of the present disclosure are not directed to any observations, evaluations, judgments, or opinions that a human mind can practically perform. Given that a natural language processing based machine learning model is needed to identify the relevant subsets of text and an LLM is needed to generate a summary, a computing unit is needed to perform the operations herein. Further, the present disclosure does not recite a mathematical concept but is rather based on or involves mathematical concepts. In other words, the present disclosure is not directed to mathematical relationships, any specific mathematical formulas or equations, or any particular mathematical calculations. Rather, the present disclosure is directed to systems and methods that use a novel summarization technique in a non-conventional manner for generating a summary for a set of documents.

Figure 14:
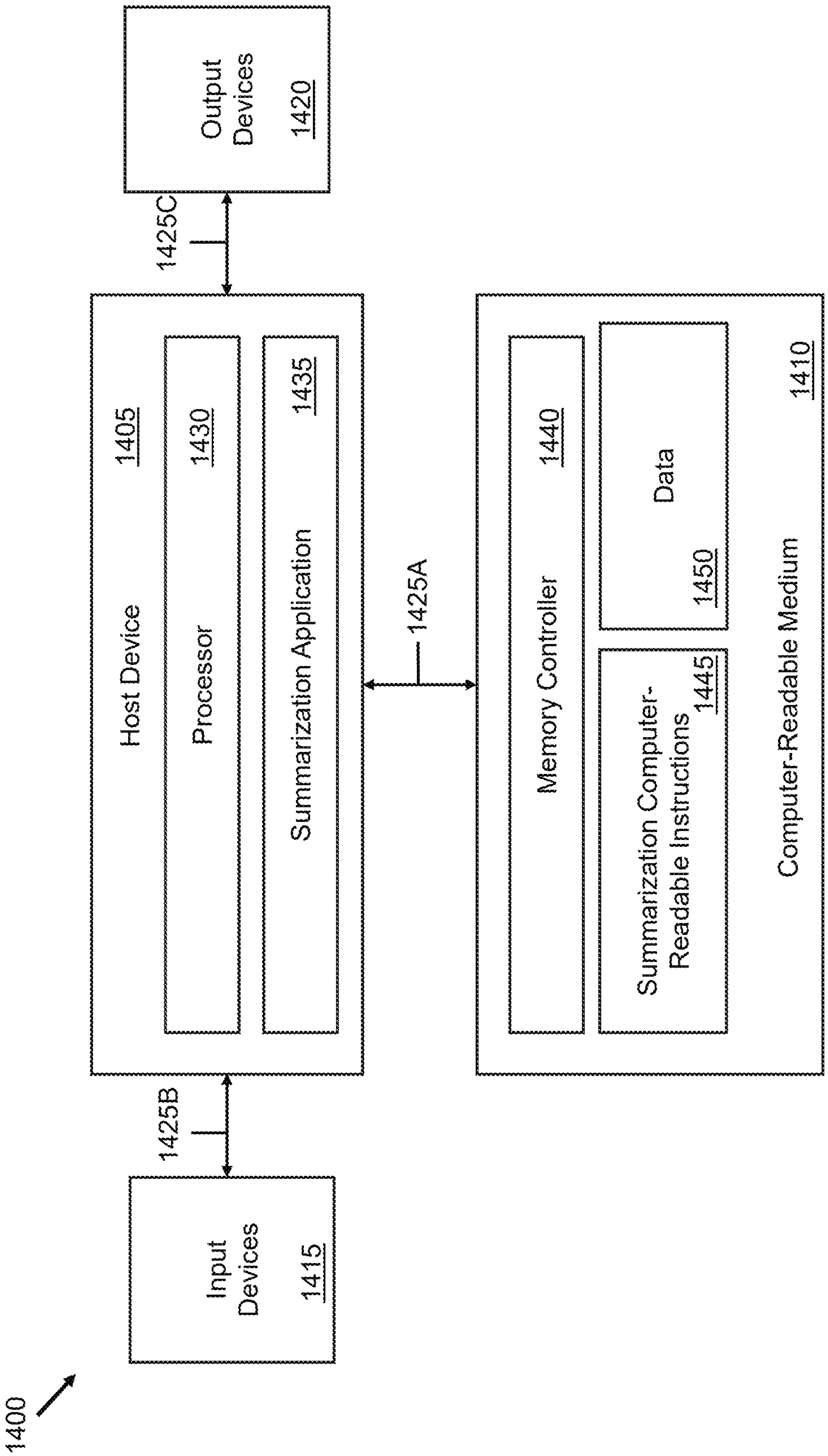
FIG. 14 illustrates a block diagram of an example summarization system, according to embodiments of the present technology.

Turning now to FIG. 14, a block diagram of an example summarization system 1400 is shown, in accordance with some embodiments of the present disclosure. The summarization system 1400 may be part of, or otherwise associated with, the computing environment 114. The summarization system 1400 includes a host device 1405 associated with a computer-readable medium 1410. The host device 1405 may be configured to receive input from one or more input devices 1415 and provide output to one or more output devices 1420. The host device 1405 may be configured to communicate with the computer-readable medium 1410, the input devices 1415, and the output devices 1420 via appropriate communication interfaces, buses, or channels 1425A, 1425B, and 1425C, respectively. The summarization system 1400 may be implemented in a variety of computing devices such as computers (e.g., desktop, laptop, etc.), servers, tablets, personal digital assistants, mobile devices, wearable computing devices such as smart watches, other handheld or portable devices, or any other computing units suitable for performing operations described herein using the host device 1405.

Further, some or all of the features described in the present disclosure may be implemented on a client device, an on-premise server device, a cloud/distributed computing environment, or a combination thereof. Additionally, unless otherwise indicated, functions described herein as being performed by a computing device (e.g., the summarization system 1400) may be implemented by multiple computing devices in a distributed environment, and vice versa.

The input devices 1415 may include any of a variety of input technologies such as a keyboard, stylus, touch screen, mouse, track ball, keypad, microphone, voice recognition, motion recognition, remote controllers, input ports, one or more buttons, dials, joysticks, point of sale/service devices, card readers, chip readers, and any other input peripheral that is associated with the host device 1405 and that allows an external source, such as a user, to enter information (e.g., data) into the host device and send instructions to the host device 1405. Similarly, the output devices 1420 may include a variety of output technologies such as external memories, printers, speakers, displays, microphones, light emitting diodes, headphones, plotters, speech generating devices, video devices, and any other output peripherals that are configured to receive information (e.g., data) from the host device 1405. The "data" that is either input into the host device 1405 and/or output from the host device may include any of a variety of textual data, numerical data, alphanumerical data, graphical data, video data, sound data, position data, combinations thereof, or other types of analog and/or digital data that is suitable for processing using the Summarization system 1400.

The host device 1405 may include a processor 1430 that may be configured to execute instructions for running one or more applications associated with the host device 1405. In some embodiments, the instructions and data needed to run the one or more applications may be stored within the computer-readable medium 1410. The host device 1405 may also be configured to store the results of running the one or more applications within the computer-readable medium 1410. One such application on the host device 1405 may be a summarization application 1435. The summarization application 1435 may be used to generate one or more summaries from a set of documents. For example, in some embodiments, the summarization application 1435 may be configured to generate one summary per document. In some embodiments, the summarization application 1435 may be configured to generate one summary across a set of documents.

The summarization application 1435 may be executed by the processor 1430. The instructions to execute the summarization application 1435 may be stored within the computer-readable medium 1410. To facilitate communication between the host device 1405 and the computer-readable medium 1410, the computer-readable medium may include or be associated with a memory controller 1440. Although the memory controller 1440 is shown as being part of the computer-readable medium 1410, in some embodiments, the memory controller may instead be part of the host device 1405 or another element of the summarization system 1400 and operatively associated with the computer-readable medium 1410. The memory controller 1440 may be configured as a logical block or circuitry that receives instructions from the host device 1405 and performs operations in accordance with those instructions. For example, to execute the summarization application 1435, the host device 1405 may send a request to the memory controller 1440. The memory controller 1440 may read the instructions associated with the summarization application 1435. For example, the memory controller 1440 may read summarization instructions 1445 stored within the computer-readable medium 1410 and send those instructions back to the host device 1405. In some embodiments, those instructions may be temporarily stored within a memory on the host device 1405. The processor 1430 may then execute those instructions by performing one or more operations called for by those instructions.

The computer-readable medium 1410 may include one or more memory circuits. The memory circuits may be any of a variety of memory types, including a variety of volatile memories, non-volatile memories, or a combination thereof. For example, in some embodiments, one or more of the memory circuits or portions thereof may include NAND flash memory cores. In other embodiments, one or more of the memory circuits or portions thereof may include NOR flash memory cores, Static Random Access Memory (SRAM) cores, Dynamic Random Access Memory (DRA M) cores, Magnetoresistive Random Access Memory (M RAM) cores, Phase Change Memory (PCM) cores, Resistive Random Access Memory (ReRAM) cores, 3D X Point memory cores, ferroelectric random-access memory (Fe-RAM) cores, and other types of memory cores that are suitable for use within the computer-readable medium 1410. In some embodiments, one or more of the memory circuits or portions thereof may be configured as other types of storage class memory ("SCM"). Generally speaking, the memory circuits may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

The computer-readable medium 1410 may also be configured to store data 1450. The data 1450 may include an input set of documents. The data 1450 may also include one or more summaries generated from the input set of documents. The data 1450 may also include model descriptions and other information needed to implement and execute one or more machine learning models. The data 1450 may further include any other data or information that is needed by the summarization application 1435 to perform operations described herein.

It is to be understood that only some components of the summarization system 1400 are shown and described in FIG. 14. However, the summarization system 1400 may include other components such as various batteries and power sources, networking interfaces, routers, switches, external memory systems, controllers, etc. Generally speaking, the summarization system 1400 may include any of a variety of hardware, software, and/or firmware components that are needed or considered desirable in performing the functions described herein. Similarly, the host device 1405, the input devices 1415, the output devices 1420, and the computer-readable medium 1410, including the memory controller 1440, may include hardware, software, and/or firmware components that are considered necessary or desirable in performing the functions described herein.

Figure 15:
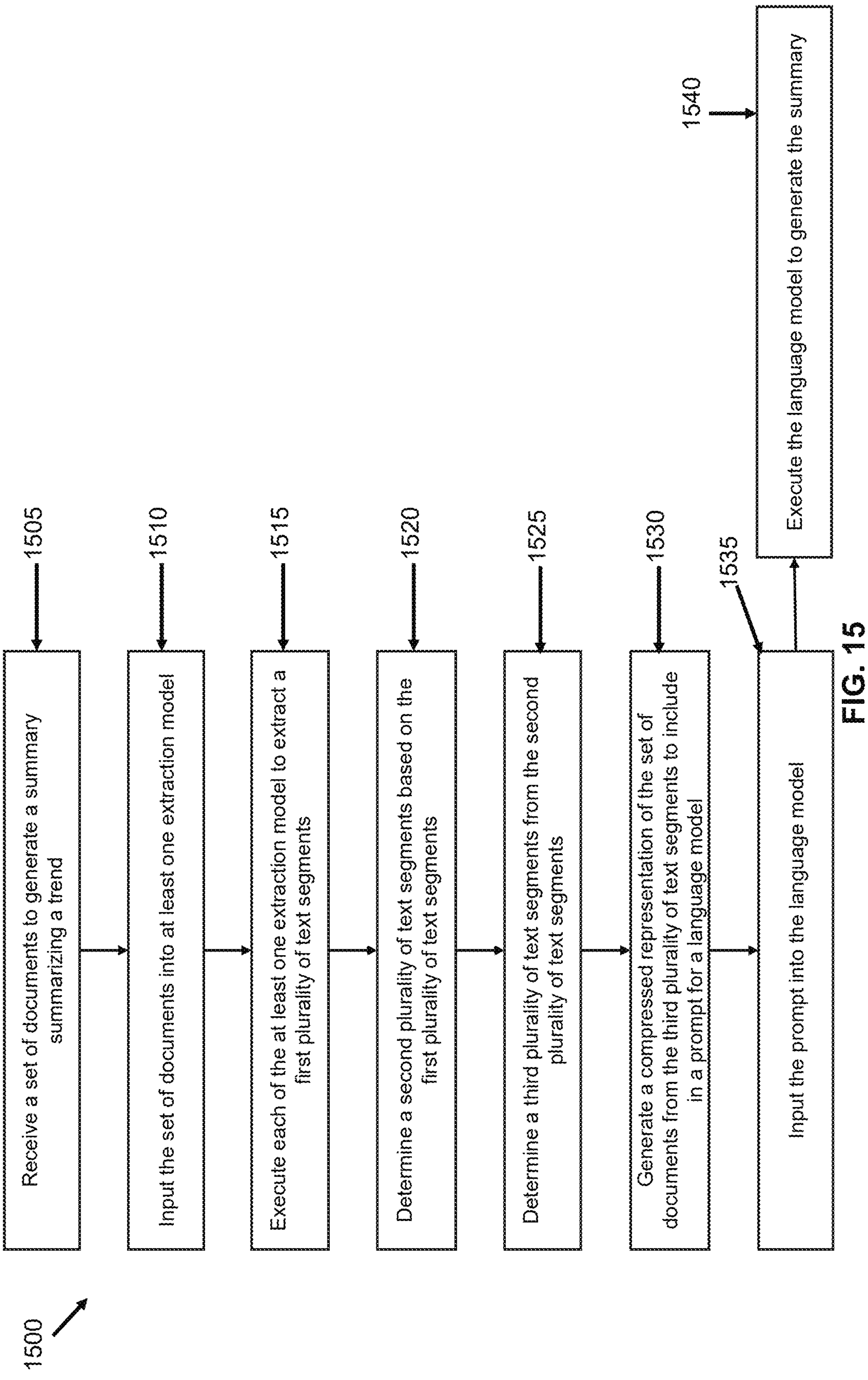
FIG. 15 illustrates a flowchart outlining first example operations for summarizing a trend across a set of documents using the summarization system of FIG. 14, according to embodiments of the present technology.

Referring now to FIG. 15, an example flowchart outlining operations of a process 1500 is shown, in accordance with some embodiments of the present disclosure. The process 1500 may be executed by one or more processors (e.g., the processor 1430) executing computer-readable instructions (e.g., the summarization instructions 1445) associated with the summarization application 1435. The process 1500 may be used for generating a summary across a set of documents. In particular, the process 1500 may be used to generate a single summary summarizing the set of documents. In some embodiments, the single summary may summarize a trend across the set of documents. In some embodiments, the summary may be an answer to a query posed by a user for the set of documents. The process 1500 may include other or additional operations in other embodiments.

At operation 1505, the processor receives a set of documents from which to generate a summary. In some embodiments, the set of documents may include one or more articles such as research papers, dissertations, newspapers, magazines, news, etc., customer reviews, social media posts, emails, legal documents such as contracts, patents, court filings, etc., healthcare records, books, novels, or other literary works, transcripts, reports, survey responses, cash register receipts, transcribed data, and/or any type of written record or collection of data from which a summary may be desired and which may be converted into textual data. In some embodiments, data other than written records may be used. When non-textual data is to be used, the non-textual data may be converted into textual form. For example, in some embodiments, video data, audio data, image data, scanned data, etc. that is readily not technically textual data, may be converted into textual data for generating summaries therefrom. In some embodiments, image processing tools may be used to convert non-textual information into textual information. For example, in some embodiments, image processing tools may be used to detect patterns, formatting, locations, etc. of certain types of information (e.g., headings, first couple of sentences in each paragraph, beginning and ending of a document, etc.) and extract the detected information into a new document. The new document may be added to the set of documents. In some embodiments, the image processing tools may be implemented as information extraction models. In other embodiments, the image processing tools may be other suitable tools.

The number of documents in the set of documents may vary as well. In some embodiments, the number of documents in the set of documents may be dependent on the type of models that are being used to generate summaries. In some embodiments, language models may have a maximum number of tokens that they may receive as inputs (and generate as outputs). The number of tokens may limit the number of documents that may be input into those language models. In some embodiments, the number of documents in the set of documents may be equal to or greater than 500 documents. In other embodiments, the number of documents in the set of documents may vary as desired. Further, in some embodiments, the set of documents may include full documents, portions of documents, summaries of documents, and/or a combination thereof.

In some embodiments, the processor may receive the set of documents via one or more selections made through a user interface (e.g., a display associated with the output devices 1420). For example, in some embodiments, a user may provide, via a user interface, one or more selections indicating the location (e.g., file path) where the set of documents are stored. In response to the selection, the processor may retrieve the set of documents from that location. In some embodiments, the set of documents may be provided as streaming data. Using streaming data may be advantageous when the data includes sensitive or transient information. In such situations, the relevant information may be extracted from the streaming data without needing to store the entire data, thereby preserving and safeguarding the sensitive or transient nature of the data. In some embodiments, using streaming log data may be used where only certain aspects of information from the log data are relevant. In such situations, the relevant portions of data may be extracted from the log data without needing to save the entire log data. In some embodiments, streaming data may be used where data is generated in real-time, for example, in social media context. In such cases, relevant comments may be extracted as those comments are generated, without needing to save entire conversations or data from social media. In some embodiments, the streaming data may be used in the context of ESP described above. In some embodiments, the set of documents may be provided as non-streaming data. In some embodiments, the set of documents may be directly uploaded.

At operation 1510, the processor inputs the set of documents into at least one information extraction (IE) model. An IE model is configured to automatically extract structured information from unstructured text. Thus, in some embodiments, the IE model may be configured to extract information from the set of documents received at the operation 1505. In some embodiments, the set of documents may be input into the IE model. In some embodiments, the processor may indicate the location of where the set of documents are stored to the IE model and the IE model may retrieve the set of documents from that location. The IE model may be trained to extract certain information from the set of documents. For example, in some embodiments, the IE model may be trained to extract a text segment highlighting key information about the document. In some embodiments, the IE model may be trained to extract other or additional information such as identifying any key entities (e.g., people, organizations, dates, etc.), relationships between entities, etc. from the set of documents. Thus, in some embodiments, the IE model may be trained to extract one or more text segments from the set of documents.

In some embodiments, the IE model may be a rule-based model. A rule-based IE model may rely on predefined patterns and rules to extract the relevant information (e.g., text segments). Unlike machine learning models, which learn from data, rule-based models use predefined rules to identify and extract information from the set of documents. For example, in some embodiments, a rule-based IE model may use pattern matching rules to identify specific sequences of text that match predetermined patterns pre-defined in the pattern matching rules. In some embodiments, a rule-based IE model may use linguistic rules that apply grammatical and syntactic rules to understand structure of text and identify text based on those rules. In some embodiments, a rule-based IE model may use domain-specific rules that include rules relevant to a specific domain or application (e.g., medical, legal, finance, etc.). In some embodiments, a rule-based IE model may use a combination of one or more of the pattern matching rules, linguistic rules, and domain-specific rules. In other embodiments, a rule-based IE model may use other, different, or additional types of rules. Examples of rule-based models that may be used herein may include General Architecture for Text Engineering (GATE) model, Stanford TokensRegex model, Apache Unstructured Information Management Architecture (UIMA) model, SpaCy's Matcher model, SAS Visual Text Analytics concepts model, etc.

In some embodiments, the IE model may be a machine learning (ML) model. An ML model may be configured to automatically learn patterns and features from the data itself to extract structured information from unstructured text. Unlike rule-based models, which rely on predefined rules to extract relevant information, M L models learn autonomously from the data (e.g., the set of documents) to extract the relevant information. In some embodiments, examples of M L models that may be used herein may include supervised learning models such as Named Entity Recognition (NER) model for identifying and classifying entities in text, Relation Extraction models like Support Vector Machines for identifying relationships between entities, Event Extraction models such as Recurrent Neural Networks (RNNs) and Transformers to identify events and associated participants, etc. In some embodiments, examples of M L models that may be used herein may also include semi-supervised learning models that may use a combination of labeled and unlabeled data to improve extraction performance, deep learning models like Bidirectional Encoder Representations from Transformers (BERT), Generative Pre-Trained Transformers (GPT), or other transformers to identify complex textual patterns, Sequence-to-Sequence models such as RNNs or transformer models for tasks like summarization and translation, etc. In some embodiments, examples of M L models that may be used herein may also include extractive summarization models that may be configured to generate summaries of text. In other embodiments, examples of ML models that may be used herein may include other, additional, or different models.

In some embodiments, a combination of one or more rule-based models may be used for the IE model. In some embodiments, a combination of one or more ML models may be used for the IE model. In some embodiments, a combination of one or more rule-based models and one or more ML models may be used. Additional details of rule-based models and ML models may be found in Tang, J., Hong, M., Zhang, D. L. and Li, J., "Information Extraction: Methodologies and Applications", Emerging Technologies of Text Mining: Techniques and Applications (pp. 1-33) (2008), IGI Global, https://doi.org/10.4018/978-1-59904-373-9.ch001; Small S G, Medsker L, "Review of information extraction technologies and applications" (2013) Neural Computing and Applications, 25:33-548; Mooney R J, Bunescu R, "Mining Knowledge from Text Using Information Extraction," ACM SIGKDD Explorations Newsletter, Volume 7, Issue 1 (pp 3-10) (2005), https://doi.org/10.1145/1089815.10898; Jade, Teresa, Biljana Belamaric Wilsey, and Michael Wallis, "SAS® Text Analytics for Business Applications: Concept Rules for Information Extraction Models" (2019) Cary, NC: SAS Institute Inc., the entireties of which are incorporated by reference herein.

Thus, at the operation 1510, the processor inputs the set of documents into an IE model to extract relevant information (e.g., text segments) from the set of documents. In some embodiments, each text segment that is extracted may be a snippet. A snippet may be a brief portion of text extracted from a document. For example, in some embodiments, a snippet may be les than one sentence long. In some embodiments, a snippet may be greater than one word (e.g., a couple of words up to a phrase or clause in length). Thus, in some embodiments, a snippet may be greater than one word and less than one sentence. In some embodiments, a snippet may be a few sentences or a paragraph. A snippet may be different from a summary. For example, in some embodiments, a summary may be longer than a snippet. A summary may provide a more comprehensive overview of the main points or themes or key details of the entire document, while a snippet may provide a brief excerpt of or highlight from the document. A summary may provide an understanding of the entire text of a document without having to read the entire text, while a snippet may provide a headline or teaser of the context. In other words, a summary may use words different from those used in the document to provide a concise summation of the document. In contrast, a snippet may extract verbatim a portion of text from the document. For example, a summary of an article may include the primary focus of the article, important arguments, findings, conclusion of the article, and any essential facts, data, or examples to support the arguments and findings, etc. A snippet of the same article may include the headline of the article and/or a sentence or two (or perhaps a paragraph) from the article to give a quick idea of what the article is about. Thus, the length, content, and purpose of a summary may be different from the length, content, and purpose of a snippet.

At operation 1515, the processor executes each of at least one IE model to extract a first plurality of text segments (e.g., a first plurality of snippets) from the set of documents. Each text segment of the first plurality of text segments may include a chunk of text extracted by the IE model from the set of documents. In some embodiments, each text segment of the first plurality of text segments may include a plurality of key words from the set of documents. In some embodiments, each text segment of the first plurality of text segments may include a plurality of key phrases from the set of documents. In some embodiments, each text segment of the first plurality of text segments may include a combination of key words and key phrases from the set of documents. Further, in some embodiments, each text segment of the first plurality of text segments may further include context around at least one of one or more of the key words or one or more of the key phrases. In some embodiments, context may involve determining a predetermined number of tokens on either side of a key word or phrase, defining one or more rules that identify potential useful neighboring concepts (e.g., allowing for inclusion of a neighboring verb and intervening text that is within x tokens from the key word or phrase), or looking for boundaries defined by the structure of the language (e.g., sentences, clauses, phrases, etc.). In other embodiments, the processor may identify context in other ways.

In some embodiments, the IE model may be trained to generate a predefined number of text segments from each document of the set of documents. In some embodiments, a text segment may be associated with multiple documents. In some embodiments, the IE model may be configured to identify synonyms and associate text segments when synonyms are used. For example, if document 1 uses terminology related to virtual computing but document 2 uses terminology related to cloud computing, the IE model may determine that virtual computing and cloud computing are generally synonymous. Thus, the processor may indicate that a text segment related to differences between cloud computing and on-premise computing is also associated with document 1, while a text segment related to differences between virtual computing and on-premise computing is also associated with document 2. Thus, the processor may identify one or more text segments from each document in the set of documents. The text segment of the first plurality of text segments may be representative of the trend.

Further, the first plurality of text segments may reduce a number of tokens from a total number of tokens in each document of the set of documents to a first token count. Each document of the set of documents that is input into the IE model may include a plurality of tokens. In some embodiments, each token of the plurality of tokens may be considered a unit of information (e.g., text). Each token may include one or more characters. For example, in some embodiments, a token may include a word. In some embodiments, a token may include a sub-word (e.g., half a word). In some embodiments, a token may include spaces or special characters, images, etc. In some embodiments, the IE model may be configured to accept a maximum number of tokens in each document. If a document has more tokens than the maximum number of documents, in some embodiments, that document may be split up into multiple documents, with each document having no more than the maximum number of tokens. Thus, the total number of tokens in each document of the set of documents may not be more than the maximum number of tokens allowed.

Like the input to the IE model, the output (e.g., the first plurality of text segments) from the IE model may include tokens. Because each text segment of the first plurality of text segments includes only a small portion of the underlying document, each text segment has fewer tokens than the underlying document from which that text segment is generated. Therefore, the total number of tokens, or the first token count, in the first plurality of text segments is less than the total number of tokens across the set of documents. In other words, the sum of tokens in each text segment of the first plurality of text segments is less than the sum of tokens in each document of the set of documents.

In some embodiments, for each text segment of the first plurality of text segments, the processor may identify which documents from the set of documents the text segment belongs to. The processor may store the text segment together with the identified documents in a database. For example, in some embodiments, the processor may create a data structure such as a table (e.g., a look-up table) that stores the text segment and all the identified documents for that text segment. In other embodiments, the processor may use other or additional data structures. In some embodiments, the database may be a vector database. For example, in some embodiments, the database may be stored on a Retrieval-Augmented Generation (RAG) server. In other embodiments, the database may be stored on other types of storage medium.

Further, in some embodiments, multiple text segments are extracted from each document of the set of documents to extract the first plurality of text segments. In other embodiments, a single text segment may be extracted from each document of the set of documents to extract the first plurality of text segments.

At operation 1520, the processor determines a second plurality of text segments from the first plurality of text segments based on one or more of at least one keyword, metadata, or a topic of interest. Further, a number of the second plurality of text segments is less than or equal to a number of the first plurality of text segments. In some embodiments, to determine the second plurality of text segments, the processor may receive at least one of one or more keywords, metadata, or topic of interest as a user input (e.g., via a user interface). In some embodiments and responsive to receiving the one or more keywords, metadata, or topic of interest as the user input, the processor may identify a subset of the set of documents that include the one or more of the at least one keyword, the metadata, or the topic of interest to obtain a set of relevant documents.

In some embodiments, not each document may include text that may be relevant. By selecting a subset of the set of documents, the proposed approach identifies the documents that may be more relevant to the trend. Thus, in some embodiments, the processor may identify all those documents from the set of documents that have text corresponding to the trend. For example, in some embodiments, the processor may identify each document from the set of documents that matches the at least one keyword, the metadata, or the topic of interest. The processor may then determine a subset of the first plurality of text segments that belong to the set of relevant documents to obtain the second plurality of text segments. In other words, the processor may identify which of the first plurality of text segments are disclosed in the set of relevant documents. These identified documents may form the second plurality of text segments.

In some embodiments, to determine the second plurality of text segments, the processor may subdivide the set of documents based on a user defined parameter to obtain a plurality of documents (e.g., the set of relevant documents). The user defined parameter may include one or more of the keywords, metadata, topic of interest, query, document type, or any other user input. The processor may then identify the subset of the set of documents from the plurality of documents.

In some embodiments, each document in the set of documents may be associated with metadata. The metadata may provide information about the document. For example, in some embodiments, the metadata may include a title, author, and main keywords of the document. In some embodiments, the metadata may indicate how the document is organized (e.g., how pages are ordered, number of pages, how chapters are structured, etc.). In some embodiments, the metadata may provide administrative information such as when the document was created, how the document was created, file type, access permissions, etc. In other embodiments, the metadata may include other, additional, or different information. In some embodiments, the processor may receive the type of metadata as the user input and identify the second plurality of text segments based on the user input.

Further, because the second plurality of text segments is selected from the first plurality of text segments, a number of the second plurality of text segments is less than or equal to the number of the first plurality of text segments. Moreover, in some embodiments, the number of tokens in the second plurality of text segments may be less than or equal to the number of tokens in the first plurality of text segments.

At operation 1525, the processor determines a third plurality of text segments from the second plurality of text segments. In some embodiments, the processor determines the third plurality of text segments from the second plurality of text segments based on at least one of a frequency of occurrence, a priority score, or a location of a text segment in a document of the set of documents. Further, in some embodiments, a number of the third plurality of text segments is less than or equal to the number of the second plurality of text segments. Additionally, the third plurality of text segments reduces the number of tokens to a second token count that is less than the first token count. In other words, the number of tokens in the third plurality of text segments is less than the number of tokens in the first plurality of text segments.

In some embodiments, the processor may determine the third plurality of text segments based on the location of the text segment. In some embodiments, the location of the text segment may include the location of the document in the set of documents in which the text segment is found. For example, in some embodiments, if there are 1000 documents in the set of documents and if the text segment is found within the first 500 documents, that text segment may be given a higher preference. In some embodiments, the location of the text segment may include the location of the text segment within a single document regardless of the location of the document itself within the set of documents. For example, in some embodiments, if the text segment is found within the first predetermined number of paragraphs or sentences (or another defined portion) of a document, then that text segment may be given a higher preference. In some embodiments, the location of the text segment may include both the location of the document in the set of documents and the location of the text segment within a single document. For example, if there are 1000 documents in the set of documents and if a text segment occurs within the first predetermined number of paragraphs or sentences (or other defined portion) of a document and that document is within the first 500 documents, that text segment may be given a higher preference. The location of the text segment may reflect the importance of the text segment. By identifying the third plurality of text segments, more important text segments may be extracted.

In some embodiments, the processor may determine the third plurality of text segments based on the frequency of occurrence. In some embodiments, the processor ranks the second plurality of text segments based on a frequency of occurrence of each text segment of the second plurality of text segments. In some embodiments, the higher the frequency of occurrence, the higher the rank of the text segment. The processor may also select a predetermined number of highest ranked text segments of the second plurality of text segments to obtain the third plurality of text segments.

In particular, to further reduce the number of tokens being input into a language model, the proposed approach identifies the most relevant text segments from the second plurality of text segments. In some embodiments, the processor may be configured to identify those text segments that most frequently occur across the set of documents. The text segments that occur most frequently across the set of documents may be indicative of the importance of those text segments. In other embodiments, the processor may rank the second plurality of text segments using another metric. For example, in some embodiments, the processor may select the text segments with the top-n most frequent or important keywords ort key phrases. In some embodiments, the processor may identify the third plurality of text segments based on position and relationships indicated by formatting in the set of documents. In some embodiments, the processor may use the first n text segments found in a document or the first n and last m text segments. In some embodiments, the processor may use all text segments in a particular document as the third plurality of text segments.

In some embodiments, the processor may determine the third plurality of text segments based on a priority score. The priority score may be used to determine the relative importance of each text segment in the second plurality of text segments. Based on the determined relative importance of the text segments in the second plurality of text segments, the third plurality of text segments may be determined. Thus, to extract the third plurality of text segments from the second plurality of text segments based on the priority score, the processor may compute the priority score for each of the second plurality of text segments and select at least a subset of the text segments from the second plurality of text segments whose priority score is greater than a predetermined threshold as the third plurality of text segments. In some embodiments, the priority score may be computed using the following equation (Equation 1):

$$\text{Priority Score} = \text{Frequency} \times \text{Term Frequency} - \text{Inverse Document Frequency Score}$$

In Equation 1 above, Priority Score is the computed priority score for a text segment of the second plurality of text segments and may be used to evaluate the relevance of a term within a document set and Frequency is a number of times a text segment occurs across the second plurality of text segments. A higher frequency may indicate that the term occurs more prominently in the second plurality of text segments. In Equation 1 above, the Term Frequency-Inverse Document Frequency Score is a score indicating a relevance of the text segment in the set of documents. In particular, Term Frequency in the Term Frequency-Inverse Document Frequency Score measures how frequently a term appears in a document relative to the total number of terms in that document. The Inverse Document Frequency Score in the Term Frequency-Inverse Document Frequency Score measures how important a term is by considering how common or rare that term is across all documents in the second plurality of text segments. Terms that appear in fewer documents have higher IDF scores. Equation 1 may be used to identify those text segments of the second plurality of text segments that include important terms. The Term Frequency-Inverse Document Frequency Score may be indicative of how important a particular term in a text segment is in distinguishing one set of documents from another set.

As an example, if a text segment of the second plurality of text segments includes a term "machine learning," the priority score may be computed using Equation 1 above. If the Frequency is 10 (meaning the term "machine learning" appears 10 times in the text segment) and the Term Frequency-Inverse Document Frequency Score is 0.5, then the priority score is 10*0.5=5. The priority score may have identify those terms that are both frequent and important, making them more relevant for tasks like summarization or keyword extraction.

In some embodiments, the priority score may be computed using the following equation (Equation 2):

$$\text{Priority Score} = \text{Frequency} \times \text{Domain} - \text{Specific Term Count}$$

In equation 2 above, Priority Score is the computed priority score for the text segment, Frequency is a number of times the text segment occurs across the second plurality of text segments, and Domain-Specific term Count is a number of domain-specific terms in the text segment.

At operation 1530, the processor generates a compressed representation of the set of documents from the third plurality of text segments to include in a prompt for a language model. Thus, each prompt may be representative of the set of documents. The prompt may be the input into the language model. In particular, the prompt may include relevant instructions to the language model on how to convert the input into an output. In some embodiments, the prompt may include the second token count. In some embodiments, to generate the compressed representation of the set of documents from the third plurality of text segments, the processor may concatenate the third plurality of text segments to generate a string. In some embodiments, the third plurality of text segments may be concatenated in a specific order. In other embodiments, the third plurality of text segments may be concatenated in a random order, alphabetical order, or in any other desired order. The concatenated string provides a compressed representation of the set of documents.

Further, the prompt that is generated based on the compressed representation of the set of documents may include the concatenated string, an output definition defining a format for the summary, and one or more constraints. The constraints may include a system role and a user role to provide a framework for how to generate the summary. In some embodiments, the constraints may also include a description of what to include in the summary. In some embodiments, the format for the summary may define how the result is to be presented. In some embodiments, an example format that may be used may be in the form: <summary number>:<summary>. In other embodiments, the output definition may have other, additional, or different parameters in the prompt. An example of a prompt that the processor may generate for the concatenated string may look like:

```
messages=[
{"role": "system", "content": "You are a helpful assistant trained to generate concise and
accurate summaries from text segments extracted from multiple documents. Your goal is to
identify the key themes, insights, or facts that emerge from the content."},
{"role": "user", "content": "Below is a set of text segments extracted from multiple
documents. Summarize the key points, trends, or recurring themes reflected in these text
segments.
text segments:
[text segments 1]
[text segments 2]
[text segments 3]
...
[text segments N]
Instructions:
1. Group similar ideas.
2. If there's one clear topic, write a single summary (100-200 words).
3. If multiple themes emerge, write short labeled sections (e.g., Theme 1:, Theme 2:).
Output Format:
Summary:
[Y our summary here]
(Optional) Themes:
Theme 1: [Summary]
Theme 2: [Summary]
..."}
]
```

In the prompt above, the portion {"role": "system", "content": "You are a helpful assistant trained to generate concise and accurate summaries from text segments extracted from multiple documents. Your goal is to identify the key themes, insights, or facts that emerge from the content."} and {"role": "user", "content": "Below is a set of text segments extracted from multiple documents. Summarize the key points, trends, or recurring themes reflected in these text segments. text segments: [text segments 1] [text segments 2] [text segments 3] . . . [text segments N]} provides an example of a constraint of a system role and a user role. The system role and the user role provide a guideline to the machine learning model for generating a summary that is appropriate for that system role and user role. The system role provides a more general guideline to the machine learning model. For example, the system role is "You are a helpful assistant" in the example above. This is an instruction to the machine learning model to pretend that it is a helpful assistant and generate the summary that a helpful assistant would generate. The user role provides a more specific guideline to the machine learning model. The user role in the example above is "Below is a set of text segments extracted from multiple documents. Summarize the key points, trends, or recurring themes reflected in these text segments." This guideline specifies what to generate the summary on. The "text segments" includes the concatenated string generated from the third plurality of text segments.

The prompt above also provides a description of what the summary may include. In the example above, the prompt provides "instructions" for what to include in the summary. For example, in the prompt above, the "instructions" include "1. Group similar ideas," "2. If there's one clear topic, write a single summary (100-200 words)," and "3. If multiple themes emerge, write short labeled sections (e.g., Theme 1:, Theme 2:)." The prompt above also provides an "output format" in which the output is to be provided: "Summary: [Your summary here]" "(Optional) Themes: Theme 1: [Summary] Theme 2: [Summary] . . . "

Thus, by varying the information in the prompt, the processor may be configured to give different instructions to the machine learning model and generate different summaries from the same compressed representation of the set of documents. In some embodiments, the prompt may include other, additional, or different information.

At operation 1535, the processor inputs the prompt into a language model. In some embodiments, the language model may be a Large Language Model (LLM).

Additional details about the implementation of an LLM may be found in Brown, Mann, et al. "Language Models are Few-Shot Learners" (2020), the entirety of which is incorporated by reference herein. In some embodiments, any suitable LLM may be used. In some embodiments, the language model may be a Small Language Model (SLM). In some embodiments, the language model may be a Multi-Modal Large Language Model (MLLM). In some embodiments, the language model may be another type of model that is suitable for and configured to perform the operations described herein.

At operation 1540, the processor executes the language model based on the prompt to generate the summary. Examples of summaries generated using the process 1500 are given below.

Figure 16:
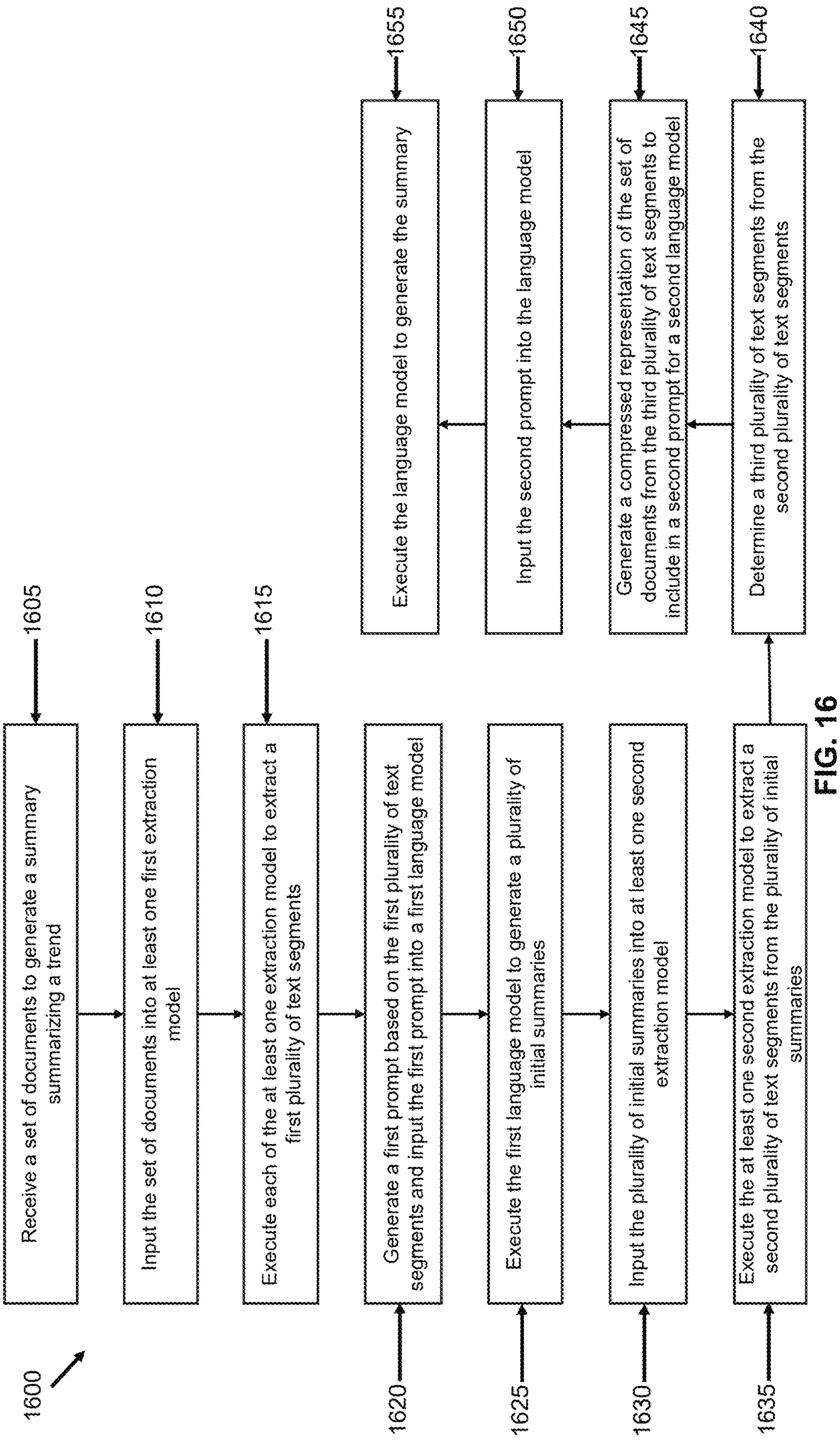
FIG. 16 illustrates a flowchart outlining second example operations for summarizing a trend across a set of documents using the summarization system of FIG. 14, according to embodiments of the present technology.

Referring now to FIG. 16, an example flowchart outlining operations of a process 1600 is shown, in accordance with some embodiments of the present disclosure. The process 1600 may be executed by one or more processors (e.g., the processor 1430) executing computer-readable instructions (e.g., the summarization instructions 1445) associated with the summarization application 1435. The process 1600 may be used for generating a summary across a set of documents. In particular, the process 1600 may be used to generate a single summary summarizing the set of documents. In some embodiments, the single summary may summarize a trend across the set of documents. In some embodiments, the summary may be an answer to a trend related query posed by a user for the set of documents. The process 1600 may include other or additional operations in other embodiments.

At operation 1605, the processor receives a set of documents from which to generate a summary. The operation 1605 is analogous to the operation 1505.

At operation 1610, the processor inputs the set of documents into at least one first IE model. The operation 1610 is analogous to the operation 1510.

At operation 1615, the processor executes each of the at least one first IE model to extract a first plurality of text segments (e.g., a first plurality of snippets) from the set of documents. The operation 1615 is analogous to the operation 1515. Further, similar to the operation 1515, the sum of tokens in each text segment of the first plurality of text segments is less than the sum of tokens in each document of the set of documents.

At operation 1620, the processor generates a first prompt based on the first plurality of text segments and inputs the first prompt into a first language model. The first prompt may be a prompt generated similar to the prompt generated at the 1530 but with the first plurality of text segments. The first language model may be a language model similar to that one described at the operations 1530 and 1535.

At operation 1625, the processor executes the first language model to generate a plurality of initial summaries. In some embodiments, each initial summary of the plurality of initial summaries corresponds to a document of the set of documents and is generated from the first plurality of text segments that belong to the document. In particular, in some embodiments, the first plurality of text segments that are generated from a particular document may generate one initial summary. In some embodiments, more than one initial summary may be generated from each document of the set of documents.

At operation 1630, the processor inputs the plurality of initial summaries into at least one second IE model. The operation 1630 may be similar to the operation 1510. However, in contrast to the operation 1510 in which the set of documents are input into the at least one first IE model, at the operation 1630, the plurality of initial summaries are input into the at least one second IE model.

At operation 1635, the processor executes the at least one second IE model to extract a second plurality of text segments from the plurality of initial summaries. The operation 1635 is similar to the operation 1515. However, in contrast to the operation 1515 in which the first plurality of text segments are generated from the set of documents, at the operation 1635, a second plurality of text segments are generated from the plurality of initial summaries. In some embodiments, the second plurality of text segments may have a token count that is less than the token count of the first plurality of text segments generated at the operation 1615. In some embodiments, the second plurality of text segments may have a token count that is also less than the token count in the plurality of initial summaries.

At operation 1640, the processor determines a third plurality of text segments from the second plurality of text segments. The operation 1640 is analogous to the operation 1525.

At operation 1645, the processor generates a compressed representation of the set of documents from the third plurality of text segments to include in a prompt for a second language model. The operation 1645 is analogous to the operation 1530.

At operation 1650, the processor inputs the prompt into the second language model similar to the operation 1535.

At operation 1655, the processor executes the second language model based on the prompt to generate a summary similar to the operation 1540. Examples of summaries generated from the process 1600 are discussed below.

Figure 17:
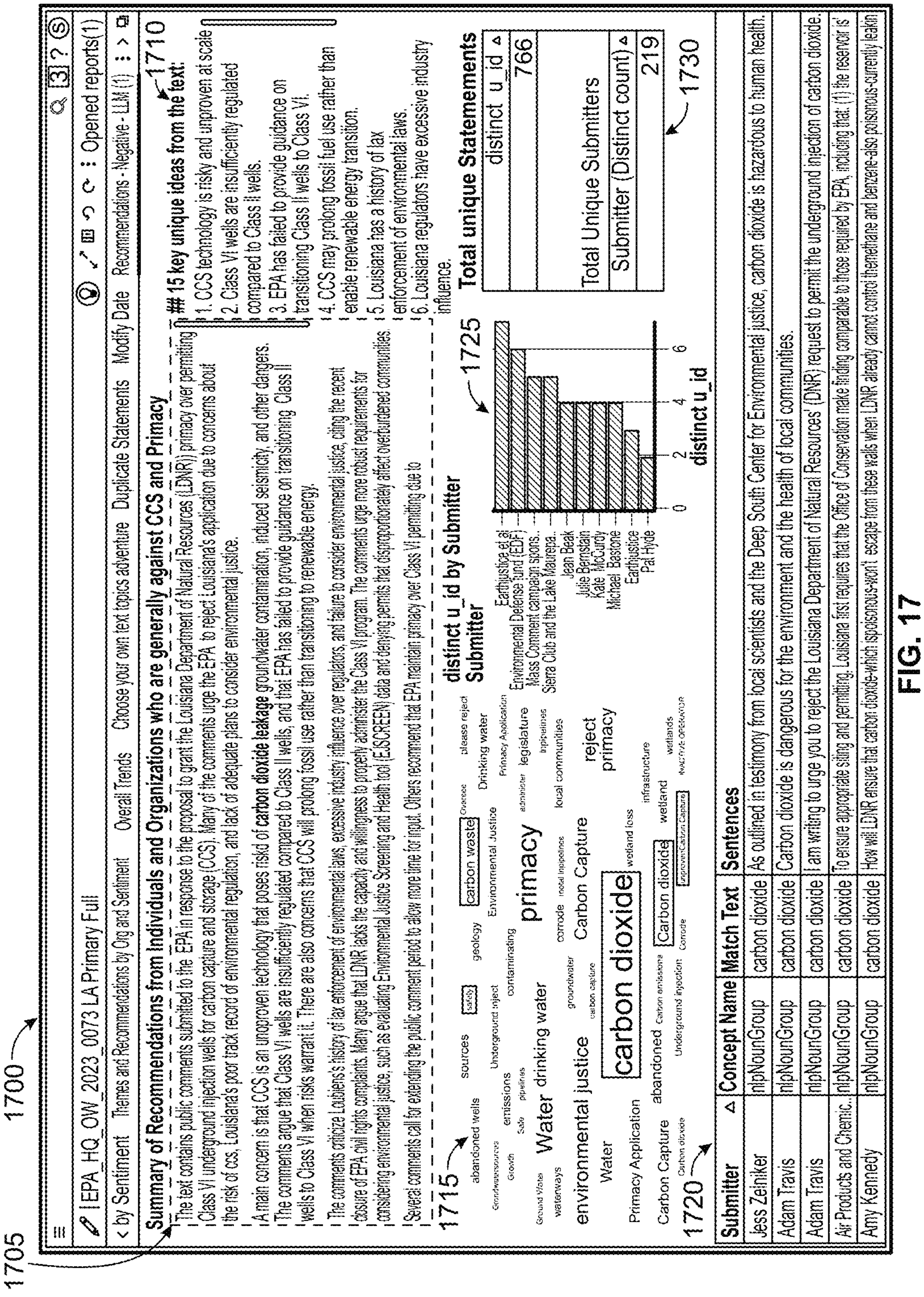
FIG. 17 illustrates an example of a dashboard generated by the summarization system of FIG. 14 in response to the processes of FIGS. 15 and 16, according to embodiments of the present technology.

Referring to FIGS. 17-22C, examples of summaries as well as examples of user interfaces generated based on the summaries and applications of these summaries are shown, in accordance with some embodiments of the present disclosure. Referring specifically to FIG. 17, an example of a dashboard 1700 summarizing a trend identified from public comments on regulations is shown, in accordance with some embodiments of the present disclosure.

Government agencies face a grueling manual process when dealing with thousands of public comments on proposed regulations. Personnel associated with these government agencies have to digest and respond to each issue raised by the public (including corporate stakeholders) in response to a proposed regulation, while mitigating liability. Hence, a rigorous response is necessary every time public comments are provided. Further, accuracy of the response is paramount, as is the need for a timely response. Manually reviewing the public comments to understand the issues is a long and tedious task, as well as prone to errors. By using the proposed approach of combining natural language processing, text analytics, and a large language model (LLM) (as discussed in FIGS. 15 and 16), the review of the public comments may be streamlined.

In particular, through text analytics, linguistic rules encoded in an IE model may be used to identify and refine how each unique statement aligns with a different aspect of the regulation. This may eliminate the need for arduous manual tasks. Given that government agencies often seek feedback on up to 200 different aspects of regulation, this automated matching process may significantly boost efficiency. Using the information from the IE model, the LLM may create summary statements for each regulation aspect based on the identified statements for further review and analysis. Reviewing and analyzing the summary statements may be much less burdensome than reviewing all of the public comments. Moreover, the proposed approach assists in the simultaneous handling of multiple regulations, empowering a team to use their creative expertise more effectively.

FIG. 17 provides an example to a proposed regulation from the US Environmental Protection Agency (EPA) regarding the transfer of oversight of carbon capture wells to the state of Louisiana. FIG. 17 is based on a real-world example. With more than 40,000 comments received for the proposed regulation, more than 10,000 unique statements were identified. From the unique statements, a summary was generated based on a trend containing a concrete recommendation from organizations that were negative toward the regulation overall. The summary generated was then used to develop an interactive dashboard 1700 to help users verify the summary of recommendations from individuals and organizations who generally oppose the regulation or aspects of it.

More particularly, the dashboard 1700 shows an example summary 1705 (generated using the processes 1500 or 1600) summarizing a trend of recommendations from individuals and organizations who are generally against the regulation. The trend for which the summary is to be generated may be provided as a query to the IE model such that the IE model may extract statements related to the trend. The dashboard 1700 also provides a summary 1710 of top key ideas related to the trend. The summary 1710 may be generated using a different prompt as the one used to generate the summary 1705 but using the same underlying data. Thus, by using different prompts on the same underlying data, different summarizes may be generated. Further, multiple summaries may be displayed at the same time on the dashboard 1700 to compare various aspects of the underlying documents. Although the dashboard 1700 shows two summaries, in other embodiments, greater than or less than two summaries may be displayed. The dashboard 1700 provides an accurate and compelling description of how the public negatively perceives the proposed regulation and how it might be concretely improved. While tens of thousands of statements are submitted for this regulation, using NLP and text analytics as a pre-filter allowed feeding only around 5% of the most pertinent statements to the LLM, enabling the LLM to generate an accurate and traceable summarization more efficiently.

In addition to showing the summary 1705 and the summary 1710, the dashboard 1700 allows verification and tracing of the summary aspects by drilling down into the statements that lead to the generation of those summaries. For example, the summary 1705 suggests that carbon dioxide leakage is one of the leading public concerns. The dashboard 1700 may identify key terms associated with carbon dioxide leakage and generate a word cloud 1715. For instance, the text analytics process may identify key terms such as "carbon dioxide," "carbon waste," "safety," and "unproven carbon capture," etc. in the word cloud as terms being associated in the public comments with carbon dioxide leakage. Furthermore, the dashboard 1700 allows an interactive tracing capability. The tracing capability may allow drilling down into statements related to these themes to verify the responses generated by the LLM. Further, the tracing capability may allow tracing certain terms or phrases in the summary 1705 back to the original public comments, as shown in list 1720.

More particularly, to provide the tracing capability, the processor may receive an input identifying a keyword or phrase from the summary 1705. For example, if the user desired to see which public comments mentioned "carbon dioxide leakage," the user may highlight that term in the summary 1705. The dashboard 1700 may then identify all of the public comments that mentioned "carbon dioxide leakage" in the list 1720. To identify which public comments mentioned "carbon dioxide leakage," the processor may identify which of the first plurality of text segments (e.g., the unique statements generated from the IE model) include the keyword or phrase "carbon dioxide leakage" to obtain a fourth plurality of text segments from the first plurality of text segments. In other words, the processor may generate a subset of the first plurality of text segments as the fourth plurality of text segments. The processor may then rank each of the fourth plurality of text segments using a predetermined criterion. The processor may then output a ranked list of the fourth plurality of text segments, shown in the list 1720.

The dashboard 1700 may show additional features based on features that a user may desire to review. In some embodiments, the features that a user may desire to review may be enabled using a settings tab provided on the dashboard. As an example, the dashboard 1700 may provide a bar graph 1725 indicating which organizations made public comments related to "carbon dioxide leakage" (e.g., the term highlighted in the summary 1705). The dashboard 1700 may provide another summary 1730 summarizing how many unique statements were made related to "carbon dioxide leakage". The dashboard 1700 may show other or additional features. Some other features that may be displayed on the dashboard 1700 are discussed below with respect to other examples. The dashboard 1700 may similarly enable exploration of the other desired themes suggested by the LLM, including groundwater contamination, sufficient oversight by Louisiana, and concern over well abandonment, among others.

By using the proposed approach, the overall results may avoid hallucinations. For example, the NLP and text analytics pre-filtering process may assimilate the most relevant source data from various documents, ensuring the outputs are more accurate and reliable, while discarding irrelevant data. Larger prompts may also contribute to more instances of hallucination. By reducing the number of tokens, as discussed above, in the prompt, the proposed approach reduces hallucinations. The proposed approach enhances time to value. In particular, by pre-filtering the public comments using the IE model (e.g., text analytics), a smaller LLM may be used more efficiently, leading to quicker results. The proposed approach may ensure privacy and security. For example, the proposed approach allows using a local vector database for fine-tuning generative models, giving users only relevant embeddings to the LLMs via APIs or localized instances of the LLM, ensuring the privacy and security of sensitive data.

Moreover, the proposed approach reduces costs. Text analytics and NLP significantly reduce the amount of information sent to the LLMs. In some cases, only 1-5% of the overall data is used for generating the summary. This eliminates the need for excessive external API (Application Programming Interface) calls and reduces the computational resources required for localized LLMs. The proposed approach allows end-to-end verification and traceability of results, helping users to verify information and trace it back to the statements from which the summaries were derived, potentially thousands of statements. This interactive traceability feature enhances transparency and trust in the generated outputs. As governments use LLMs to improve productivity and communication, maintaining the accuracy and rigor of generated summaries while managing the costs of new technologies is critical, which may be achieved with the proposed approach. The proposed approach of integrating NLP and text analytics with LLMs allows a government to perform lengthy and complex tasks easier, faster, and less expensively without some of the risks inherent in using LLMs.

Another application for which the proposed approach may be used may include summarizing trends in patent applications. Working with patent documents may be difficult because they are long, filled with legalese, and often very technical. While patent documents are used as an example, the proposed approach may apply similarly for summarizing other bodies of documents such as technical documents, research papers, etc. One way to try to understand this body of information (whether patents documents, research papers, etc.) is through asking for summaries of trends across certain dimensions. For example, to analyze a set of automative patents, a user may be interested in knowing what a trend of innovations in the automotive space between 2020 and 2023 looks like.

To analyze the trends in automative trends based on the automative patents between 2020 and 2023, an IE model may be used as described herein to extract key phrases and obtain their distribution. Subsequently, emerging technology trends over the years may be summarized by utilizing these key phrases and their frequencies to prompt the LLM. Specifically, the IE model may generate a first plurality of text segments that include noun groups without context from the automotive patents. Thus, from the automative patents between 2020 and 2023, a first plurality of text segments (e.g., snippets) was obtained for each year. These snippets appear in their original textual order and may include duplicates, resulting in a long list. From this set of the first plurality of text segments, snippet frequencies were calculated and ranked, and the top 100 were selected to form the second plurality of snippets. An example of the second plurality of text segments that were selected for the year 2022 were as follows:

2022: ('longitudinal direction', 64), ('pneumatic tire', 58), ('decorative radome', 53), ('host vehicle', 53), ('driver airbag apparatus', 48), ('electric vehicle', 44), ('rearview mirror assembly', 44), ('end portion', 43), ('radial direction', 35), ('vehicle seat', 35), ('more processors', 34), ('vehicle body', 34), ('off-road vehicle', 33), ('autonomous vehicle', 31), ('improved wheel cover overlay', 30), ('target vehicle', 30), ('control system', 29), ('processor is configured', 28), ('driver airbag', 27), ('storage system', 27), ('control unit', 27), ('display device', 26), ('mounting system', 26), ('vehicle control system', 25), ('control apparatus', 24), ('circumferential groove', 24), ('vehicle control device', 23), ('control method', 23), ('vehicle width direction', 23), ('display object', 22), ('road surface', 22), ('sensor data', 22), ('roof airbag', 21), ('sensor system', 21), ('closed state', 21), ('non-transitory computer', 21), ('driving mode', 21), ('motor vehicle', 21), ('andat least', 21), ('display device', 21), ('storage medium', 21), ('vehicle system', 21), ('cleaner unit', 21), ('PV D coating', 20), ('pet hammock', 20), ('driving system', 20), ('integrated jack system', 20), ('vehicle step', 20), ('tire pressure', 20), ('roof system', 20), ('seating arrangement', 20), ('mount assembly', 20), ('radiant panel', 20), ('damper assembly', 20), ('main body', 19), ('circumferential direction', 19), ('tread portion', 19), ('drive device', 19), ('bumper reinforcement', 19), ('common centerline', 18), ('vehicle component', 18), ('pickup truck', 18), ('control device', 18), ('equipment platforms', 18), ('radio-transmissive substrate', 18), ('robot control system', 18), ('control unit is configured', 18), ('outer surface', 18), ('sensor apparatus', 18), ('delivery system', 18), ('hybrid vehicle', 18), ('axial direction', 18), ('heating system', 18), ('offset extendable axle', 18), ('controller is configured', 18), ('cowl assembly', 17), ('power system', 17), ('computer-implemented method', 17), ('airbag cushion', 17), ('travel control method', 17), ('motor vehicle', 17), ('run-flat tire', 17), ('neural network', 17), ('time period', 16), ('closed position', 16), ('translocatable hopper', 16), ('electric vehicle', 16), ('interaction element', 16), ('door structure', 16), ('equatorial plane', 16), ('vehicle travel control apparatus', 16), ('vehicle seat', 16), ('computer program product', 16), ('induction signal', 16), ('disengaged state', 16), ('wall portion', 16), ('driverless vehicle', 16), ('transverse direction', 16), ('automobile cover system', 16), ('autonomous electronic bicycle', 16)

Similar noun groups without context were generated from the automotive patents in 2020, 2021, and 2023 for the second plurality of text segments. The second plurality of text segments were then used to generate a prompt for the LLM. For example, the following prompt may be generated from the first plurality of text segments:

```
messages=[
{"role": "system", "content": "You are a data scientist."},
```

{"role": "user", "content": "Based on the top elements and their associated frequency for the years 2020 to 2023 in the patent data category {keyword} provided in below TEXT, please help identify and understand 5 emerging technology trends. And indicate the elements on which each conclusion is based and list the specific technical terms.

```
output format:
  1. xxx (identified trend):
     - Explanation:
     - Techniques: 5 to 10 related emerging techniques
  /// TEXT :}
]
```

In some embodiments, the second plurality of text segments may be further reduced to select a third plurality of text segments and the prompt may be generated based on the third plurality of text segments. In some embodiments, the selection of the second plurality of text segments and/or the third plurality of text segments may not be needed if the first plurality of text segments are already relevant and reduced to a predetermined number of text segments.

The LLM may execute the above prompt to generate a summary having a list of trends as follows:

Trend 1. Autonomous Vehicle Technology Trend:
- Explanation: The frequency of the term "autonomous vehicle" increases from 14 in 2020 to 128 in 2023, indicating a growing trend in this technology.
- Techniques: Self-driving technology, computer vision, artificial intelligence, sensor fusion, machine learning, robotics.

Trend 2. Electric Vehicle Technology Trend:
- Explanation: The term "electric vehicle" appears consistently in the top elements across all years, indicating a sustained trend in electric vehicle technology.
- Techniques: Battery technology, electric motor technology, charging infrastructure, energy management systems.

Trend 3. Vehicle Control System Technology Trend:
- Explanation: The terms "vehicle control device," "control system," and "control unit" appear frequently across all years, suggesting advancements in vehicle control systems.
- Techniques: Advanced driver assistance systems (A DAS), adaptive cruise control, lane keeping assist, collision avoidance, vehicle stability control.

Trend 4. Tire Technology Trend:
- Explanation: The term "pneumatic tire" appears consistently in the top elements across all years, indicating a focus on tire technology.
- Techniques: Tire pressure monitoring systems, tire design and materials, tire performance optimization, tire pressure control.

Trend 5. Sensor Technology Trend:
- Explanation: The terms "sensor data," "sensor assembly," and "sensor system" appear consistently in the top elements across all years, indicating advancements in sensor technology.
- Techniques: LiDAR, radar, cameras, ultrasonic sensors, sensor fusion, object detection and recognition algorithms.

Fewer or greater than 5 trends in the summary may be generated. Thus, in some embodiments, one or more trends may be generated from a set of documents. In some embodiments, the above prompt may be further tuned to get a different type of response. Using the proposed approach, the LLM does not have to be given all the patents in the category for all four years, saving vast amounts of processing time and cost. Also, the occurrence of hallucinations is vastly reduced when directing the LLM to use the information provided when it creates the response.

Another example of the proposed approach may be illustrated without using the category labels already applied to the patent data set. When using an IE model developed for the domain of tobacco and smoking behavior and mechanisms, text segments were extracted for each patent across several years of data. For example, the following example text segments may be generated using the IE model using tobacco patents as a set of documents:

2001 ['bingo card marker', 'marking tip', 'liquid pipe', 'gas pipe', 'cigarette lighter', 'lighter holder']
2002 ['cigarette unit', 'constituent lighter']
2003 ['treatment material', 'cigar holding member', 'cigar storage compartments', 'cigar caddie']
2004 ['electrically heated cigarette', 'tobacco smoke']
2005 ['cigarette filter material']
2006 ['polycationic polymer', 'cigarette wrapper', 'lighter unit']
2007 ['tobacco products']
2009 ['filter unit', 'filter component', 'filter tube']
2010 ['cigar splitter']
2011 ['filter section']
2012 ['smokeless tobacco', 'electronic cigarette', 'tobacco composition']
2014 ['cigarette device', 'cigarette case']
2015 ['electronic cigarettes']
2016 ['user terminal']
2017 ['cigarette body']
2018 ['cigarette filter subassembly', 'smoking pipe', 'tobacco plant', 'vaping device']
2019 ['cigarette holder']
2020 ['vaping article']
2021 ['nicotine pod assembly', 'e-vaping device', 'cigarette atomizer']
2022 ['hookah device', 'nicotine formulation', 'nicotine pre-vapor formulation']
2023 ['hookah bowl', 'storage cavity']

Using at least a subset of text segments from the text segments above with a frequency of at least 20, a compressed prompt below was generated to generate a summary of trends in those tobacco patents:

Prompt: Please try and detect trends from the list of key phrases from patent applications between the years 2001 and 2023: "<list-of-frequent-words-for-each-year>

The prompt was input into an LLM to generate the following response shown in Table 1:

TABLE 1

| |
|---|
| It appears that the trend in patent applications from 2001-2023 is heavily leaning towards developing filter technologies, vaping/e-cigarette devices, heat-not-burn tobacco products, and nicotine delivery systems. There is a clear shift away from traditional tobacco smoking techniques to more advanced, often technology-driven, methods of nicotine delivery. |
| Advanced Filters: Many applications explore filtering techniques for cigarettes, focusing on various materials, multi-component filters, filter assembly, and construction techniques for increasing filtration efficacy. This could signal an effort to construct 'safer' or more efficient cigarettes. |
| Vaping and E-cigarettes: There are numerous applications centered around e-cigarettes and vaping devices, mentioning various components of the devices, heating elements, atomization methods, liquid reservoirs, and specific substances used in vaping (E-liquid and nicotine solution for instance). |
| Heat-not-Burn Tobacco Products: A nother observable trend is the development of devices and methods for heating tobacco rather than burning it, which is considered a less harmful method of nicotine consumption. |
| Nicotine Delivery Systems: It's evident that there is an ongoing trend towards alternative nicotine delivery systems like nicotine pouches, chewable nicotine products, and devices that provide aerosolized nicotine. |
| Smokeless Tobacco: There's an increasing presence of patents related to smokeless tobacco products including snuff products, chewable tobacco, etc. reflecting a trend towards the development of alternative tobacco consumption methods. |
| Product Authentication: There's a noticeable rise in patents related to encryption and identity checks, suggesting an increasing interest in counterfeit protection and product authenticity. |
| By analyzing these trends, it is safe to say that the direction of the invention is moving towards a safer way of nicotine consumption, reflecting a growing consciousness about health risks associated with traditional smoking. |

To compare the summary in Table 1 with a summary generated without using the text segments above, the inventors prompted the same LLM with the following prompt to test whether the training data would be sufficient to generate a good answer:

Prompt: Please try and detect trends in smoking and tobacco related patent applications between the years 2001 and 2023. Table 2 below lists the summary generated without the use of text segments:

TABLE 2

| |
|---|
| From my analysis, the following trends can be noted in smoking and tobacco-related patent applications between 2001 and 2023: |
| Smokeless Tobacco: There has been a significant increase in the number of patent applications related to smokeless tobacco products, especially snus and heated tobacco products. This can be seen as a response to the health concerns associated with smoking and the growing consumer desire for less harmful alternatives. |
| Electronic Cigarettes/Vaping: Patent applications relating to electronic cigarettes and vaping devices have increased dramatically since their introduction in 2003. These applications cover various fields including atomizing technology, portable charging cases, and improvements in nicotine delivery. |
| Harm Reduction Technologies: Given the well-documented health risks of smoking, there has been a considerable surge in the number of patent applications filing for harm reduction inventions. These range from low-nitrosamine tobacco to filter technologies designed to reduce the harmful substances in smoke. |
| Alternative Nicotine Delivery Systems: Another growing trend can be noticed towards alternative nicotine delivery systems like nicotine gums, patches, and inhalers. The idea is to provide a safer way for nicotine addicts to satisfy their cravings. |
| Heat-not-Burn Technology: There is a rise in patent applications concerning heat-not-burn tobacco products. This technology heats the tobacco instead of burning it, aiming to reduce the number of harmful substances released compared to traditional smoking methods. |
| Environmental Impact: As societal awareness towards environment increases, there's a trend for inventions that aim at reducing environmental harm caused by smoking and tobacco-related products, such as biodegradable filters or methods to reduce cigarette butt waste. |
| Smart Smoking Devices: With the advent of the digital age, trend in applications for smart smoking devices or apps has been increasing too. These devices/apps help smokers reduce or quit smoking by tracking their smoking habits and providing real-time feedback. |
| Flavored Tobacco Products: There's also a noticeable rise in patents related to flavored tobacco products or enhancing the smoking experience in other ways. This might be an attempt to attract younger consumers or to keep seasoned smokers interested. |
| Natural Tobacco: A growing focus on health and wellness has led to an increase in patent applications for processing methods designed to preserve the natural qualities of tobacco and to reduce the use of chemical additives. |

Comparing the summary in Table 1 with the summary in Table 2, the following differences are observable:

The summary in Table 1 is shorter and organized better with an introductory section followed by bullets that expand on the introduction. The summary in Table 1 highlights specific types of innovations on filters, including specific materials, multi-component filters, filter assembly, and construction techniques for increasing filtration efficiency. The summary in Table 1 highlights more types of innovations for vaping and e-cigarettes, including heating elements, liquid reservoirs, and specific substances used in vaping (e-liquid and nicotine solution). The summary in Table 1 mentions a series of inventions in the space of product authorization that is missing from the alternate summary. In contrast, the summary in Table 2 mentions additional details related to smokeless tobacco. Thus, the summary in Table 1 is more focused and organized better.

Figure 18:
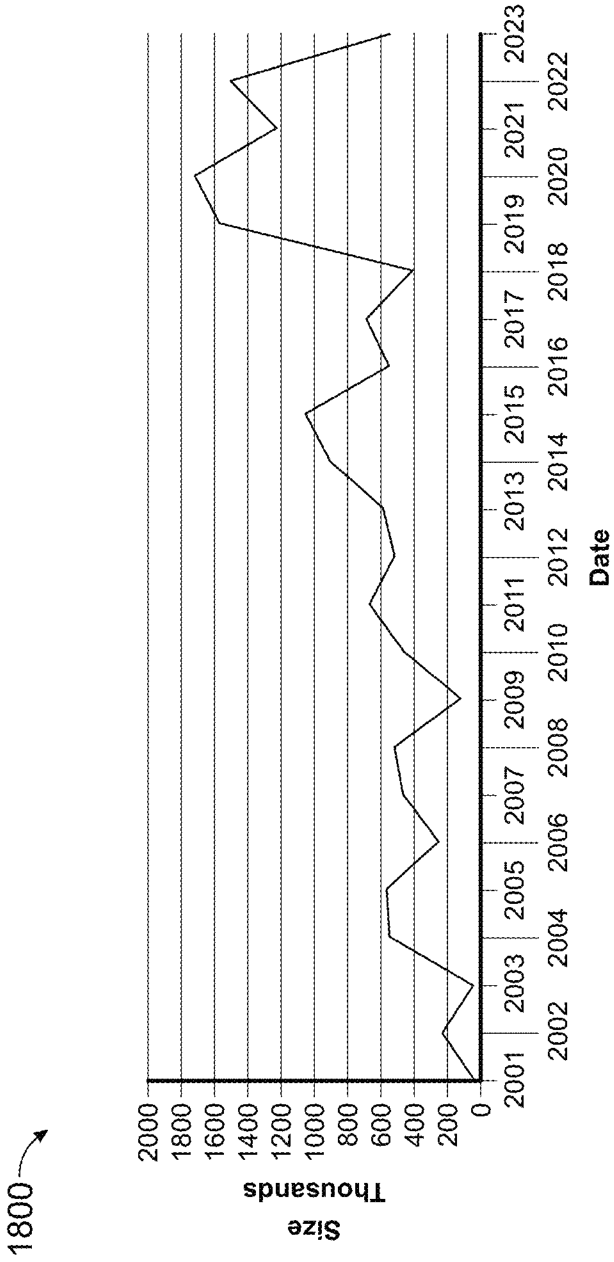
FIG. 18 illustrates an example graph for an experiment conducted on the processes of FIGS. 15 and 16, according to embodiments of the present technology.

Further, as shown in FIG. 18, the text segments may be used to generate trend graphs. For example, FIG. 18 shows an example graph 1800 plotting the year on X-axis against a SIZE on Y-axis. SIZE is the number of (measured in bytes) of text segments found in the data around any matching phrase. Using a list of text segments from each year, it may be seen that there was an increase in tobacco-related inventions which spiked in 2003, when the first e-cigarette product was launched and an even bigger jump in 2019. Several big acquisitions in the space happened around 2016, as well as some key laws and the launch of the Vapor Technology Association (VTA), a national trade association, which may have resulted in consolidation of strategy and intent in this space. In addition, sales of e-cigarettes have been increasing rapidly, increasing by 122.2% between September 2014-May 2020. These patterns may be seen from leveraging the text segment frequencies in the graph 1800.

Figure 19:
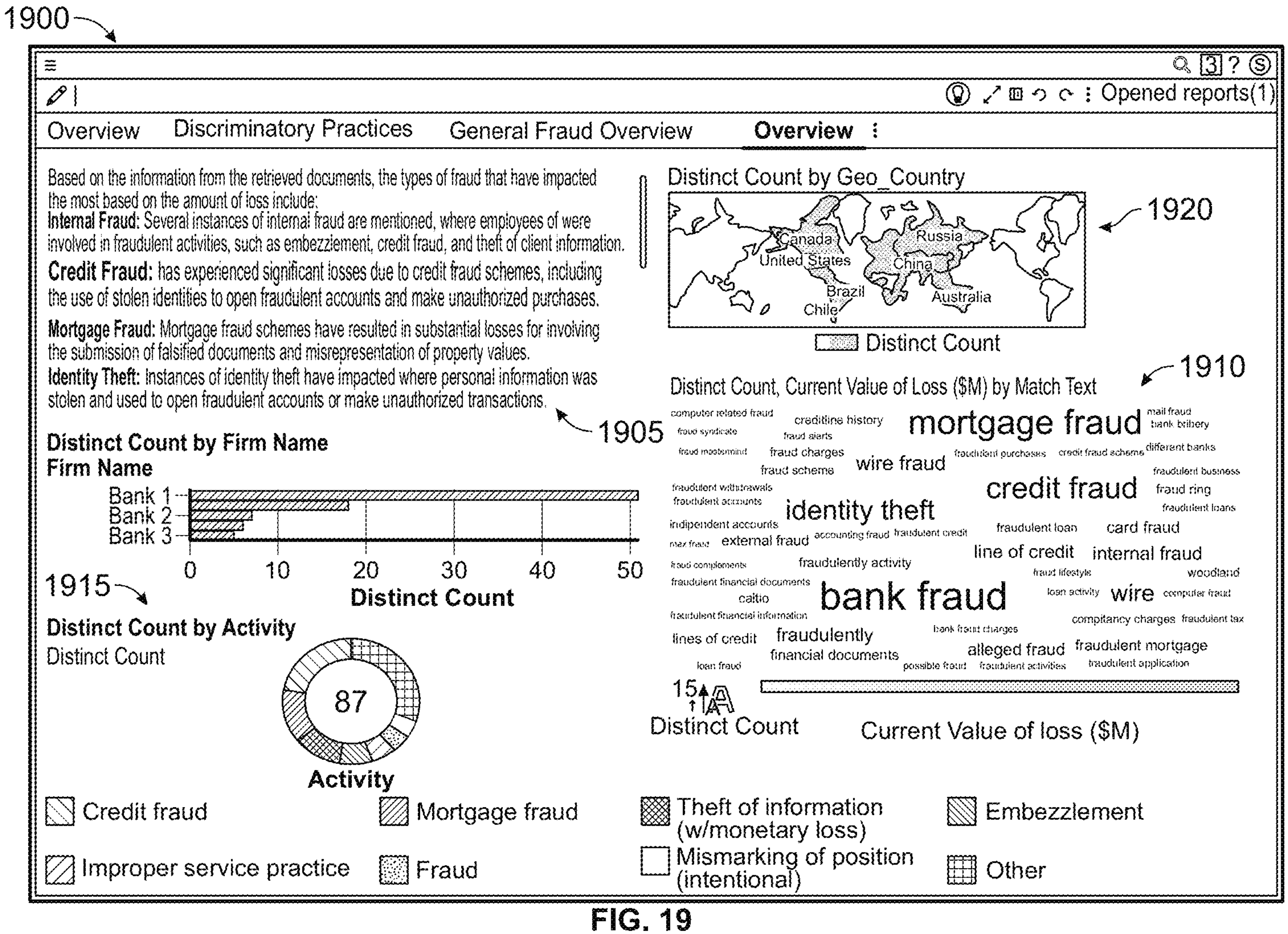
FIG. 19 illustrates another example of a dashboard generated by the summarization system of FIG. 14 in response to the processes of FIGS. 15 and 16, according to embodiments of the present technology.

Referring now to FIG. 19, another example dashboard 1900 is shown, in accordance with some embodiments of the present disclosure. The dashboard 1900 is generated based on a summary generated from financial data. Financial Institutions face numerous challenges related to operational risk and loss including from fraud and discriminatory practices. The proposed approach may be used to better understand operational risk and loss patterns and mitigate these in the future. Understanding patterns of fraud and historical risk may enable companies to implement effective anti-fraud countermeasures and anti-discriminatory practices. For this example, forty thousand events of operational loss data were analyzed to look for two types of patterns: (1) cross-cutting fraud patterns including but not limited to credit card fraud, embezzlement, and identity theft and (2) discriminatory practices and their financial impact due to lawsuits and payment agreements.

For this example (and other examples discussed herein), inventors used the platform for text analytics through Visual Text Analytics (VTA) capabilities provided by SAS Institute Inc. of Cary, North Carolina. By providing a prefilter to LLM using text analytics, it is possible to assimilate source data from a variety of documents to provide a variety of end-user interfaces, including Q& A type interfaces. In particular, the text analytics feature may employ one or more IE models, as discussed above, to generate text segments. This text analytics prefilter approach has shown to: provide more accurate summary descriptions and avoid hallucinations, enhance time to value to leverage smaller LLMs, privacy/security may be improved by leveraging an offline LLM (e.g., when an internet connection may not be available or desired to be used), cost savings may be achieved by reducing the amount of information sent into the LLMs to get accurate answers (or even eliminate external calls), and traceability may be provided as summary descriptions may be traced directly back to the statements that the descriptions were derived from.

More particularly, the inventors used IE models on statements from documents fed to the LLM to extract data of particular relevance. Then, the relevant information was passed into an LLM as opposed to sending in massive amounts of information. In some cases, the amount of data that is used in the LLM is much less than the original data size, often around 1-10% of the original data size.

When applied to operations risk data, the dashboard 1900 shows the results for one institution. In particular, the dashboard 1900 shows a summary 1905 generated using the proposed approach. Various terms considered relevant for the user may be highlighted (e.g., by the user) in the summary 1905 to generate a word cloud 1910. The dashboard 1900 also shows graphs 1915 indicating which institutions most commonly refer to the highlighted terms, as well as a map 1920 to show the location of those institutions. The dashboard 1900 may show additional data similar to the dashboard 1700.

Figure 20:
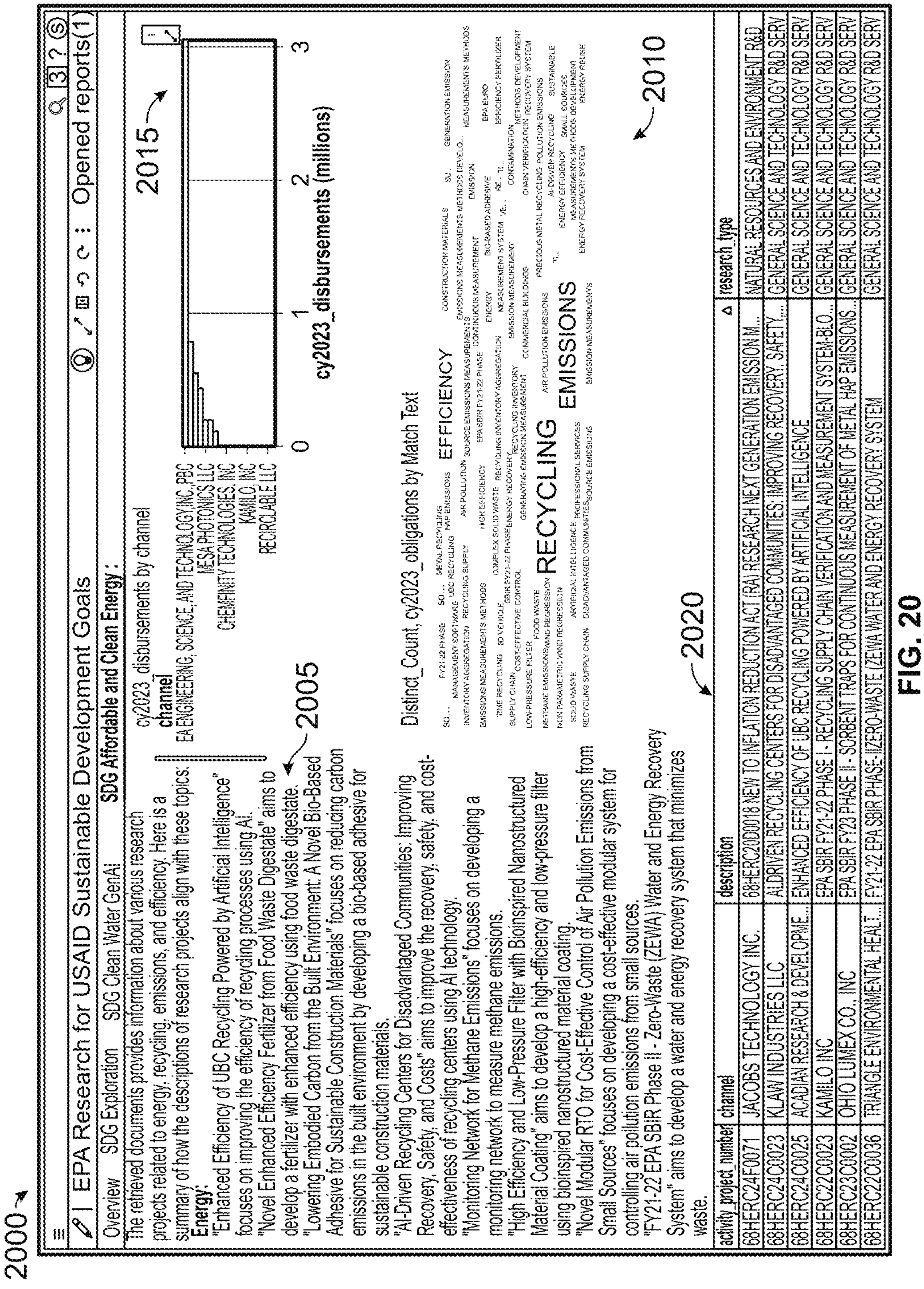
FIG. 20 illustrates another example of a dashboard generated by the summarization system of FIG. 14 in response to the processes of FIGS. 15 and 16, according to embodiments of the present technology.

Turning to FIG. 20, another example dashboard 2000 is shown, in accordance with some embodiments of the present disclosure. The dashboard 2000 may be generated in response to a summary generated for funding research related documents to show trends by categorization goal themes for US Agency for International Development (USAID). USAID is an international development agency and a catalytic actor driving development results. In this example, USAID may use the proposed approach to identify domestic research and development activities in public research and development that align with their Sustainable Development Goals (SDGs). A manual review of public sources of data for SDG alignment is an extremely time consuming and qualitative activity. The proposed approach may use text analytics to categorize research and spending data as aligned with several of the 17 SDGs and then summarize research in each of the categorized goal themes.

The dashboard 2000, which is highly interactive and customizable, demonstrates how USAID may leverage the analysis to identify research that they may want to fund or partner with in some fashion. The dashboard 2000 shows a summary 2005 generated from all input data. The summary 2005 is particularly related to results for Affordable and Clean Energy research. A word cloud 2010 highlights the types of matched text discovered, while a graph 2015 shows numbers of projects in this category by channel and related disbursements. A list 2020 provides a list of statements for tracing back terms from the summary 2005 in the original set of documents. The dashboard 2000 may include other or additional features.

Figure 21A:
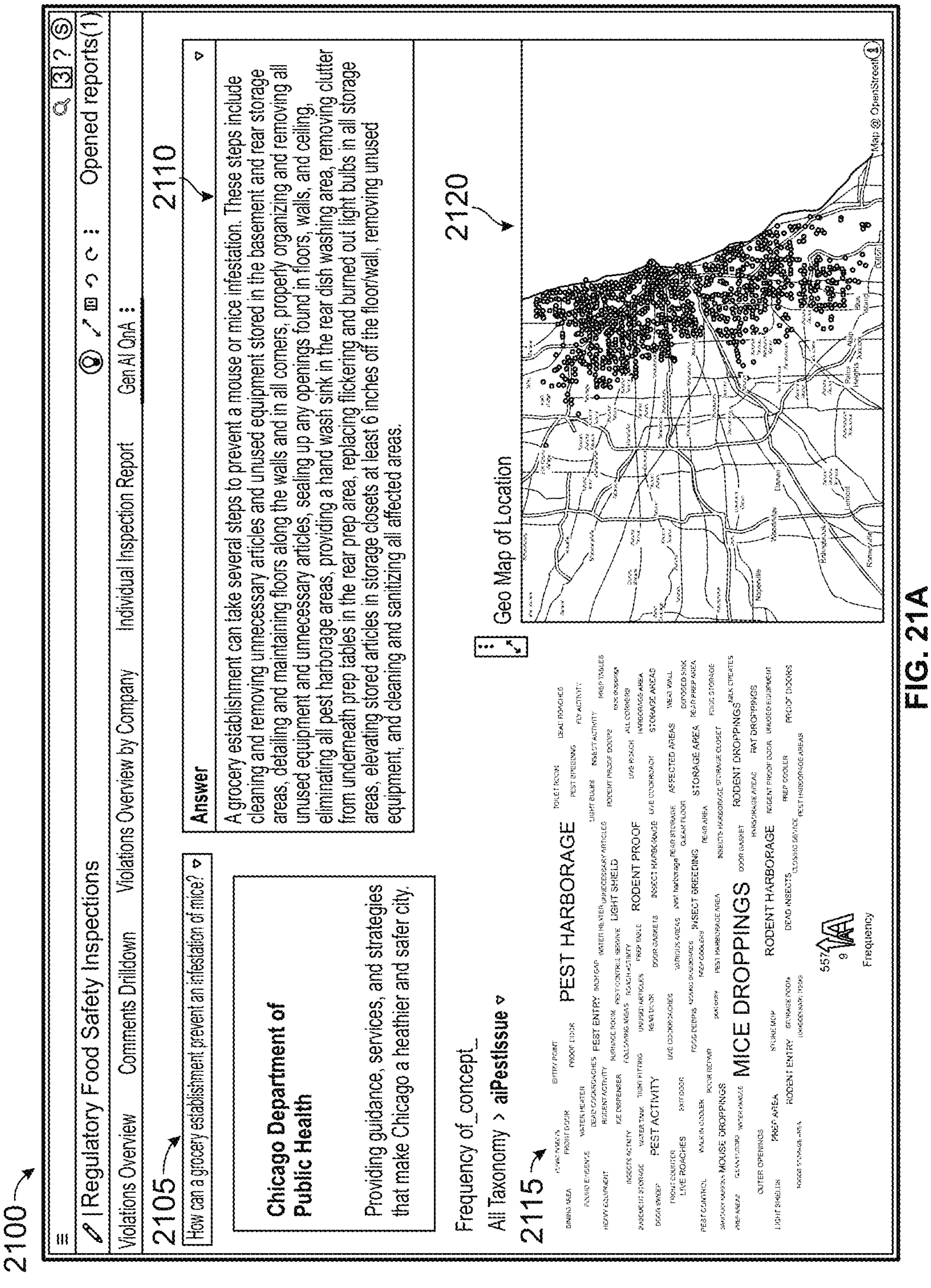
FIGS. 21A-21C illustrate another example of a dashboard generated by the summarization system of FIG. 14 in response to the processes of FIGS. 15 and 16, according to embodiments of the present technology.
Figure 21B:
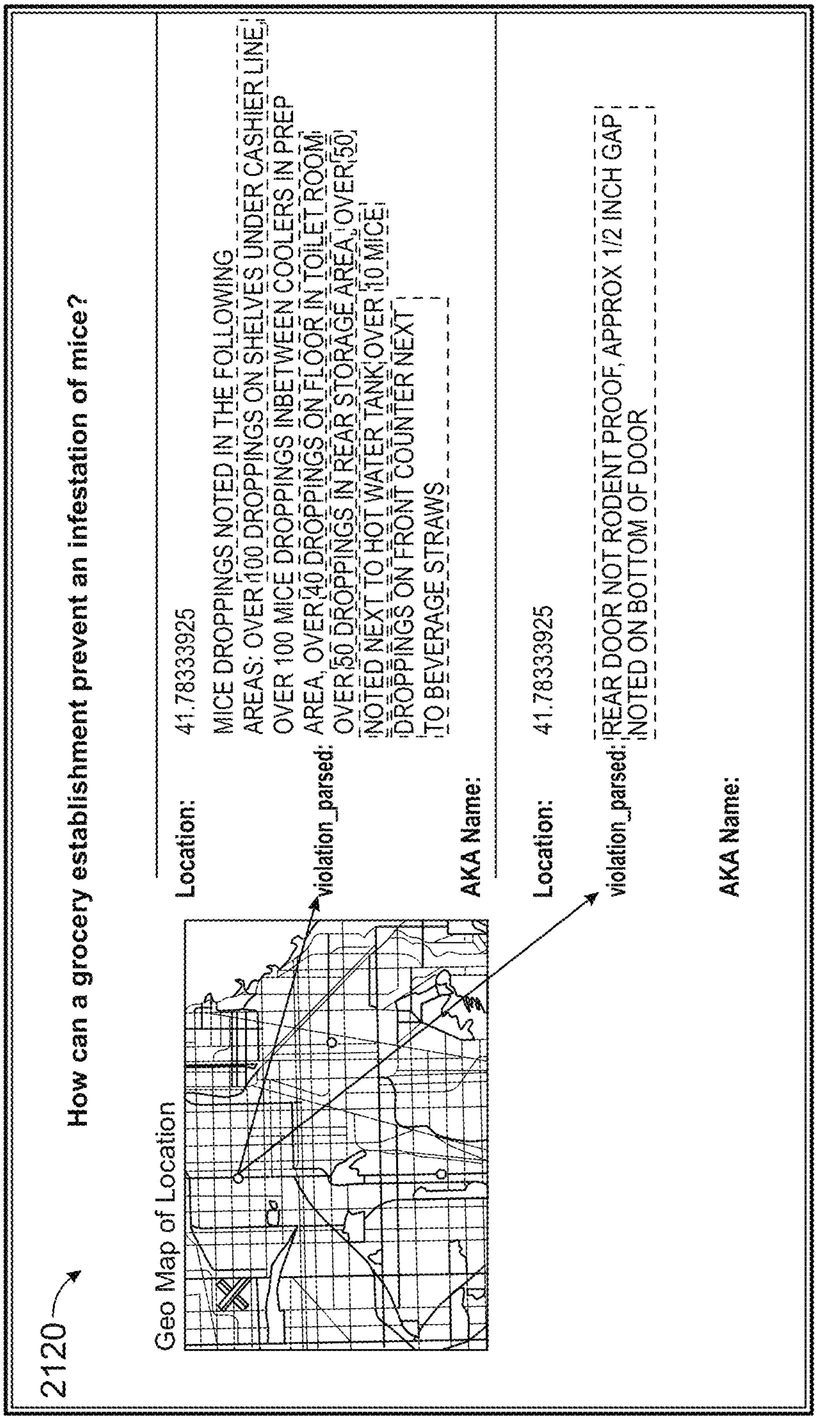
Figure 21C:
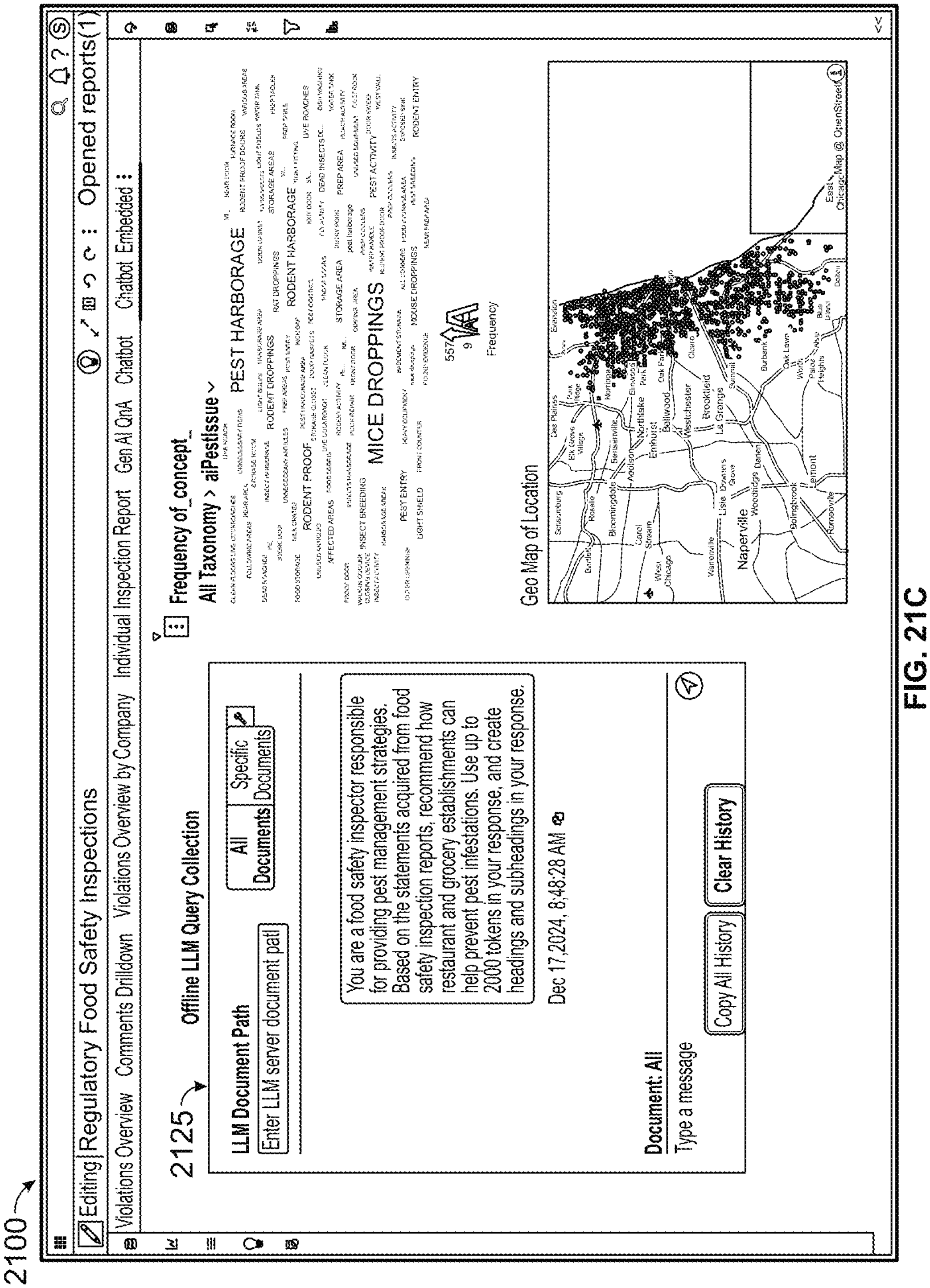

Referring now to FIGS. 21A-21C, another example of the proposed approach is shown, in accordance with some embodiments of the present disclosure. FIG. 21A shows an example dashboard 2100 generated for results answering a user query related to infestation of mice based on Chicago Department of Public Health data. Using the dashboard 2100, a user may enter a query in a query field 2105. For example, in the query field 2105, the user may enter "how can a grocery establishment prevent an infestation of mice." Responsive to receiving the query, the proposed approach may be implemented to generate the other features of the dashboard 2100. For example, the dashboard 2100 provides an answer field 2110 that provides a summarized answer to the query entered in the query field 2105. The answer in the answer field 2110 may be a summary generated by analyzing an input set of documents from the Chicago Department of Public Health using the proposed approach in FIG. 15 or 16.

The dashboard 2100 may also present a word cloud 2115 highlighting the key terms from the answer in the answer field 2110, as well as a map 2120 showing locations of grocery stores whose data was analyzed. In some embodiments, the map 2120 may be interactive, as shown in FIG. 21B. For example, by selecting a grocery store from the map 2120, additional data related to that grocery store may be displayed, as shown in FIG. 21B. Although certain types of information are shown in FIG. 21B, other or additional information may be shown in other embodiments. FIG. 21C shows an additional feature of the dashboard 2100. In particular, FIG. 21C shows an example chat box 2125 using which the user may further interact and explore the original data. The chat box 2125 may allow a user to enter a query, specify what documents (all or specific) to use in answering the query, and see the result of the query. The dashboard 2100 may include other or additional features.

Turning to FIGS. 22A-22C, another example of the proposed approach is shown, in accordance with some embodiments of the present disclosure. The example of FIGS. 22A-22C summarizes key information by leveraging information about document layout and formatting. Documents containing text and related information, such as color, font name, and position (font rectangle/bounding box), may be in formats like Microsoft® Word or Adobe® PDF. Information may be extracted from documents in such formats using, for example, Python libraries such as PyM uPDF and ElementTree. The extracted data may be categorized into titles, main body text, authors, emails, notes, and other types by analyzing text-related information. This step may be guided by rules such as shared color and font characteristics, as well as proximity to the boundaries of other text based on their positions.

For example, for a document portion 2200 shown in FIG. 22A, terms such as "Time-Reversal Provides," "Unsupervised Feedback to LLMs," and "Abstract" share the same font ['NimbusRomNo9L-M edi'], which is not commonly used throughout the document. The data in the document portion 2200 indexed from lines 2 to 13 consists of shorter strings that may be identified as person or company names through verification using, for example, M aned Entity Recognition (NER) models. The data in the document portion 2200 following the subtitle "Abstract" subtitle and preceding the next subtitle share at least one font, ['NimbusRomNo9L-Regu'], and consist of longer strings compared to the others. Their positional information may indicate that each line of text starts at the same horizontal point, supporting their classification as the "main body" for the title "Abstract".

These types of cues and information may help determine the most important part of a document for the purpose at hand. Rules and algorithms may help to leverage these cues to select the key text segments. Examples of text segments that may be extracted from a PDF format of the document portion 2200 are shown in FIG. 22B and examples of text segments extracted from a Word format of the document portion are shown in FIG. 22C. Those text segments may then be placed into the LLM to represent the document or documents. This type of approach may particularly be useful with documents that represent forms.

In some embodiments, labels and content can be associated together and kept as single text segments. Each of these text segments may represent a "fact" encoded in the content of the form. Text segments may be stored with the document portion 2200 to help answer questions. For example, in a set of forms used for insurance, the claim type may be searched and all claims related to that claim type can be brought into view. This may also be applied to a set of contracts, where the legal counsel is in focus, to bring back all contracts overseen by a particular attorney.

In longer documents, sections of the document portion 2200 may easily be identified using this approach. Then the first n sentences in each section may be extracted, or key snippets from each section may be used to generate a summary per section. For example, in a Form 10-K filing, companies report across many topics in required sections. These documents may be very long. For each document, sections may be identified by formatting, and each section may be summarized by an LLM, as described in the proposed approach. Those summaries may be storied with each document and queries about types of companies or issues in the reports can be used to filter a larger set of 10-K forms to a smaller set and then that set can be summarized by the LLM using the summary of sections.

For example, an example query may be: What are the major risks companies in the tech industry are facing this year? The proposed approach may be used to answer the query as follows:

Step 1: Use metadata to identify tech companies.

Step 2: Collect the appropriate section or sections for each company (previously stored using the methodology described above) and ask the LLM to summarize what the risks are for each company.

Step 3: Take all the risk summaries and ask the LLM to create a summary across the companies.

Yet another example of the proposed approach may identify trends by company and year of health insurance complaints. Complaints data may be very difficult for companies to fully understand and to understand quickly enough to take strategic action to address any issues that impact customers. Manually reviewing or categorizing complaints is often very time-consuming and sometimes inaccurate or inconsistent as well. This quality issue happens mainly because humans get fatigued when processing large amounts of data.

Using the proposed approach may overcome these challenges. The example used a data set of 2500 comments for 8 different health insurance companies. The columns included 'Company', 'Date', 'Datetime', 'Author', 'Rating', 'City', 'State', 'Comment', 'URL', 'month', 'dow', 'id', and 'year'. For the documents related to each company, 5 topics for the set of documents were identified (e.g., using topic modeling). The documents were sorted by a relevancy score to select the top documents in each topic. An LLM prompt was created to include snippets from the top documents in each topic and instructions to generate a summary of each topic, resulting in 5 summaries for each company. Next, how many documents were in the topic by year were identified and prompt for the LLM with the topic summary and document distribution by year was generated, asking for a trend summary. For example, the following prompt was used:

prompt_topic_trend=f' "Below text provides each topic summarization and its corresponding distribution across years. Based on this text, indicate the increasing/decreasing trends and any shifts in focus.

output: Based on the topic distribution across years, the trends and shifts in focus are as follows:

/// Text: {text}
'''

Using the above prompt, an example of one of the topic summaries with the statistics that were used to generate the trend summary:

0: Title: Issues with Billing and Customer Service at Humana One

Summary: This text highlights various issues faced by customers with Humana One, including billing errors, unauthorized deductions, lack of communication, denial of claims, and difficulties in canceling policies. Customers express frustration with the company's customer service and their inability to resolve these issues.///statistics: {2007:2, 2008:2, 2009:2, 2010:3, 2011:5, 2012:15, 2013:9}

In this example, topics were used to identify key themes in the document set. However, in other experiments, an alternative approach to group the documents may be used such as a clustering method such as K-Means. An information extraction model may be applied to extract key information across the documents, and that extracted information could be used to help the LLM understand specific issues and how frequently they occurred across all the documents. Alternatively, key sentences may be extracted from every document in the cluster (instead of only the top documents) and used to prompt the LLM. The method detailed in this section has the benefit of surfacing key themes and issues that appear across documents.

To compare the two methods to a baseline, a baseline method was developed by using all 20 documents (truncated to a maximum of 3000 tokens, separated by spaces, which equates to approximately 3500 tokens), providing the LLM the set of truncated documents to summarize the topic, then identifying how many documents were in the topic by year, and prompting the LLM with the topic summary and document distribution by year and asking for a trend summary.

The first method (2-1 in Table 3 below) involved extracting n key snippets (n=50) from the top m documents (m=20) in each topic and prompting the LLM to summarize the topic from the 50 snippets. Next, the LLM was prompted with the topic summaries and information regarding the number of documents for each year within the topic set. The LLM was asked to create a trend summary for the set of documents. The second method (2-2 in Table 3 below) involved extracting n key snippets (n=50) from the top m documents (m=20), leveraging the TextRank algorithm to extract 30 key sentences from the top m documents, and prompting the LLM to summarize each topic from the 50 snippets plus the 30 sentences. The third method is the baseline. Next, the LLM was prompted with the topic summaries and information regarding the number of documents for each year within the topic set. The LLM was asked to create a trend summary for the set of documents. The example prompt above was used for all three methods to create the trend summary.

Because the trend summary approach was the same across all three methods, the measurement efforts evaluated the summaries of each topic. To compare the results, SBERT embeddings and cosine similarity were used. These metrics detect similarity differences. Similarity metrics are best used with a reference summary. However, since a reference summary for these sets of documents was not available, the summary was compared with each document individually and the mean, standard deviation, range, and median scores were calculated.

Two methods for measurement were used: the first method compared the summary with the 20 most relevant documents for that topic (one-by-one) and the second method compared the topic summary with all the documents for that topic (one-by-one). Table 2 shows the results of those two comparison methods (labeled #1 and #2) for the first company:

TABLE 3

| | Company 1 data (263 documentss) | | |
|---|---|---|---|
| | Method | Similarity (SBERT) - #1 | Similarity (SBERT) - #2 |
| Similarity (Summary vs. Original documents) | Baseline top 20 documents (truncated) | Mean: 0.5<br>Std Deviation: 0.08<br>Range: 0.409<br>Median: 0.507 | Mean: 0.488<br>Std Deviation: 0.095<br>Range: 0.472<br>Median: 0.5 |
| | 2-1 snippets | Mean: 0.506<br>Std Deviation: 0.111<br>Range: 0.656<br>Median: 0.516 | Mean: 0.492<br>Std Deviation: 0.113<br>Range: 0.656<br>Median: 0.505 |
| | 2-2 snippets + key sentences | Mean: 0.531<br>Std Deviation: 0.107<br>Range: 0.442<br>Median: 0.549 | Mean: 0.517<br>Std Deviation: 0.109<br>Range: 0.561<br>Median: 0.532 |

1. 20 documents: 5 topic clusters * top 20 documents (100 pairs)
2. All documents: 5 topic clusters * all documents belong to the cluster (166 pairs)

The mean scores for first measurement across all three methods are very close: 0.5, 0.506, and 0.531 respectively. For the second measurement (using much more data) the difference between the scores is greater at 0.488, 0.492, and 0.517 respectively. In both cases, the scores are close enough to further evaluate for statistical significance, but at a glance method 2-2 seems to be the potential winner across all three methods.

Table 4 below shows results of those two comparison methods (labeled #1 and #2) for the second company:

TABLE 4

| | Company 2 data (540 docs) | | |
|---|---|---|---|
| | Method | Similarity (SBERT) - #1 | Similarity (SBERT) - #2 |
| Similarity (Summary vs. Original documents) | Baseline top 20 documents (truncated) | Mean: 0.595<br>Std Deviation: 0.103<br>Range: 0.509<br>Median: 0.599 | Mean: 0.587<br>Std Deviation: 0.091<br>Range: 0.509<br>Median: 0.59 |
| | 2-1 snippets | Mean: 0.597<br>Std Deviation: 0.105<br>Range: 0.67<br>Median: 0.603 | Mean: 0.585<br>Std Deviation: 0.097<br>Range: 0.67<br>Median: 0.595 |
| | 2-2 snippets + key sentences | Mean: 0.607<br>Std Deviation: 0.11<br>Range: 0.448<br>Median: 0.604 | Mean: 0.595<br>Std Deviation: 0.095<br>Range: 0.476<br>Median: 0.6 |

1. 20 documents: 5 topic clusters * top 20 documents (100 pairs)
2. All documents: 5 topic clusters * all documents belong to the cluster (377 pairs)

The mean scores for first measurement across all three methods are even closer: 0.595, 0.597, and 0.607 respectively. For the second measurement (using much more data) the difference between the scores is a bit larger at 0.587, 0.585, and 0.595 respectively. In both cases, the scores are close enough to further evaluate for statistical significance, but at a glance our method 2-2 seems to still maintain a slight edge across all three methods.

Table 5 below shows the token count from each of the methods:

TABLE 5

| Token count | Method | LLM input (mean) | LLM output (mean) | Method | LLM input (mean) | LLM output (mean) |
|---|---|---|---|---|---|---|
| | baseline | 3491.6 | 146.3 | baseline | 3440.4 | 176.8 |
| | 2-1 | 369.4 | 145.8 | 2-1 | 284.4 | 151.7 |
| | 2-2 | 1495.6 | 152.8 | 2-2 | 1527.4 | 164.8 |

Overall, the summaries generated by the methods showed comparable metrics for similarity. Method 2-2 had a slight edge when compared to both the baseline and Method 2-1. The tokens used by Method 2-1 were approximately 8-10% of those used by the baseline method, while Method 2-2 used approximately 40-45% of the tokens used by the baseline method. This illustrates that both methods saved a significant number of tokens without sacrificing quality.

It is to be understood that all examples discussed herein are simply for explanation and not intended to limit the scope of the disclosure in any way. In general, these examples and experiments all show that an LLM may use strategically extracted text segments of text documents to generate useful summaries about the trends and patterns within a set of documents. The LLM may also be used to identify answers to specific questions where the answers are found across documents rather than within one single document. The set of documents may be identified through metadata, topics/clusters, categorization, sentiment analysis, or other methods. Metadata may also be added to any query or prompt to generate summaries within subsets of documents.

The models used to extract the text segments of information may range from rule-based information extraction models that may extract key words or phrases with or without context, sentences extracted from M L ranking models, chunks of text as extracted from formats such as PDFs or Word using structural analysis tools to leverage formatting cues, or a combination of any of these types of models. M any of the examples here demonstrate the effective use of information extraction models to extract snippets at the keyword, key phrase, or sentence level.

This methodology may also be extended to include a step of generating summaries of each document from snippets. The information about each document may be stored as well, including snippets, summaries, or consolidated snippets combined with prompt or query. This stored information tied to the documents or query/prompt may then be reused without as many calls to the LLM or other models. A RAG or conventional database may be used for storage. The value of this approach may include the ability to easily and quickly augment data used to create or tune and LLM in a cost-efficient manner. Being able to augment an LLM with domain-specific data easily may make it easier to use a smaller LLM or a locally-hosted one, increasing the privacy and reducing costs of using LLMs in business.

Figure 23:
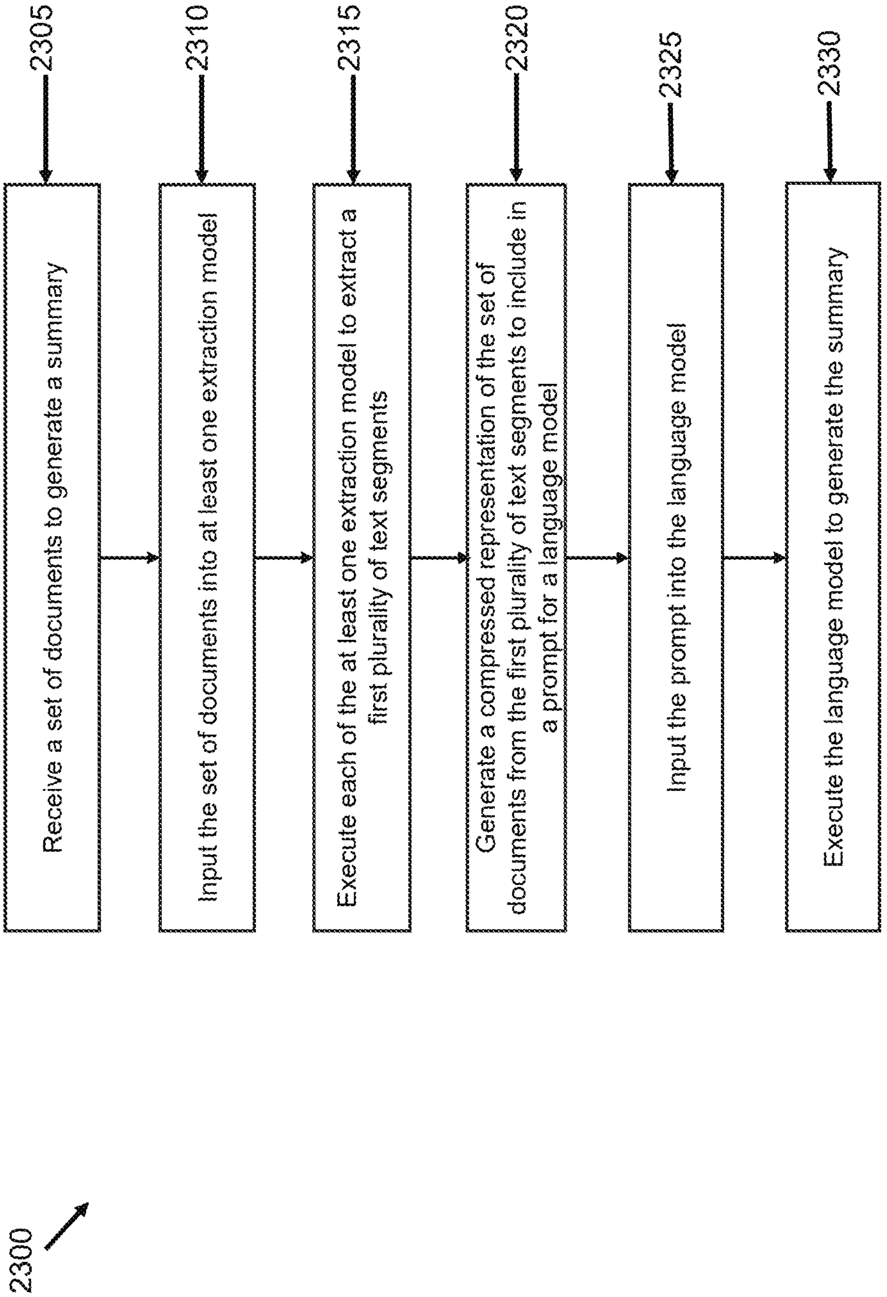
FIG. 23 illustrates a flowchart outlining first example operations for summarizing a set of documents using the summarization system of FIG. 14, according to embodiments of the present technology.

Referring now to FIG. 23, an example flowchart outlining operations of a process 2300 is shown, in accordance with some embodiments of the present disclosure. The process 2300 may be executed by one or more processors (e.g., the processor 1430) executing computer-readable instructions (e.g., the summarization instructions 1445) associated with the summarization application 1435. The process 2300 may be used for generating a summary (e.g., an abstractive summary) for a document (e.g., a medium-to-long document). In some embodiments, a medium document may be document having 50-100 pages. In some embodiments, a long document may be a document having greater than 100 pages. In some embodiments, medium and long documents may have a varying number of pages. In particular, the process 2300 may be used to generate a single summary for each document in a set of documents. More particularly, the process 2300 creates a summary for a document through use of an IE model to create text segments to feed into an LLM to generate the summary. The process 2300 may include other or additional operations in other embodiments.

At operation 2305, the processor receives a set of documents from which to generate a summary. The operation 2305 is analogous to the operation 1505.

At operation 2310, the processor inputs the set of documents into at least one IE model. The operation 2310 is analogous to the operation 1510. The IE model may be one or more of a machine learning model, a rule-based model, or a hybrid model, as discussed above. In some embodiments, the machine learning model may be an extractive summarization model or trained for a specific domain or application. In some embodiments, the machine learning model may be a keyword extraction model. In some embodiments, the keyword extraction model may be a supervised model, a semi-supervised model, or an unsupervised model. In some embodiments, the unsupervised model when used may be further divided into simple statistics, linguistics, or graph based.

At operation 2315, the processor executes each of the at least one IE model to extract a first plurality of text segments (e.g., a first plurality of snippets) from the set of documents. The operation 2315 is analogous to the operation 1515. Further, similar to the operation 1515, the first plurality of text segments reduces a number of tokens from a total number of tokens in each document of the set of documents to a reduced token count. Additionally, as discussed above, each text segment of the first plurality of text segments may include a plurality of key words from the set of documents, a plurality of key phrases from the set of documents, or a combination of key words and key phrases from the set of documents. In some embodiments, each text segment of the first plurality of text segments may further include context around at least one of one or more of the key words or one or more of the key phrases, as discussed above.

Examples of the first plurality of text segments that may be extracted by the IE model from a Patent A and a Patent B may include both the title of the patent and the extracted first plurality of text segments as follows:

Patent A: PASSENGER SAFEGUARDS FOR AUTONOMOUS VEHICLES: claim 8: independent claim; <system>, non-transitory memory containing computer-readable instructions, executed, detecting, autonomous vehicle, object is approaching the autonomous vehicle, determining, exit zone, passenger enters the exit zone, expanding, exit zone based on detection, preventing, passenger from exiting the autonomous vehicle, based claim 9: The system of claim 8; determining, exit zone, passenger enters the exit zone, includes extrapolating kinematics claim 10: The system of claim 8; determining, exit zone, passenger enters, exit zone includes predicting a trajectory, object based on extrapolated kinematics claim 11: The system of claim 8; determining, exit zone, passenger enters the exit zone, includes reasoning claim 12: The system of claim 8; determining, exit zone, passenger enters the exit zone, includes reasoning, surrounding environment claim 13: The system of claim 8; determining, exit zone, passenger enters the exit zone, detecting which door, passenger intends claim 14: The system of claim 8; executed, relocking doors, autonomous vehicle, passenger fails, predetermined period Patent B: VEHICLE OPERATION ALONG PLANNED PATH: claim 1: independent claim; memory storing instructions, blind zone, vehicle sensors, path that avoids the blind zone, moves the vehicle, straight portion having, turning portion starting, straight portion, straight portion is defined, turning portion based, obtaining sensor data, blind zone upon reaching the end claim 4: The system of claim 1; determining the blind zone, based, sensor data, turning portion claim 5: The system of claim 1; detecting an object, blind zone based, sensor data, future location, vehicle has moved, stop based, egress distance, path based claim 6: The system of claim 5; determining the egress distance, location based, specified distance, path based claim 7: The system of claim 6; position based, blind zone claim 8: The system of claim 5; future location is defined in part claim 9: The system of claim 5; claim 10: The system of claim 1; straight portion, path based, blind zone claim 11: The system of claim 1; turning portion, path based, travel route claim 12: The system of claim 1; turning portion, path based, maximum steering angle claim 13: The system of claim 1; determining the path, straight portion, predetermined time At operation 2320, the processor generates a prompt based on the first plurality of text segments and inputs the first prompt into a language model at operation 2325. The prompt may be a prompt generated similar to the prompt generated at the operation 1530. The language model may be a language model similar to that one described at the operations 1530 and 1535. Examples of the prompts that may be generated for summarizing Patent A and Patent B above may be:

Prompt Example 1

You are an expert at summarizing technical content. I want you to summarize a document that contains the following content: <list of text segments>

Your summary should contain no more than 5 sentences.

Prompt Example 2

You are an expert at summarizing patents. I want you to summarize a patent document that contains the following content: <snippets>

Your summary should contain no more than 5 sentences.

Again, it is to be understood that none of the examples used herein are intended to limit the scope of the disclosure. Rather, these examples are used simply for explanation purposes only.

In some embodiments, if the number of the first plurality of text segments is greater than a threshold (e.g., too many text segments are generated from the IE model), the processor may further filter the first plurality of text segments (e.g., as discussed above in FIG. 15) before generating the prompt.

At operation 2330, the processor executes the language model to generate a plurality of summaries. In some embodiments, each summary of the plurality of summaries corresponds to a document of the set of documents and is generated from the first plurality of text segments that belong to the document. In particular, in some embodiments, the first plurality of text segments that are generated from a particular document may generate one summary. In some embodiments, more than one summary may be generated from each document of the set of documents.

Using the examples of Patents A and B above, the language model may generate the following summaries for Patent A and Patent B:

Patent A: The patent describes a system for passenger safeguards in autonomous vehicles. It includes detecting an approaching object, determining an exit zone, expanding the exit zone based on detection, and preventing the passenger from exiting the vehicle. It also involves extrapolating kinematics, predicting a trajectory, reasoning about the surrounding environment, and detecting which door the passenger intends to use.

Patent B: This patent relates to vehicle operation along a planned path. It involves storing instructions in memory, avoiding blind zones using vehicle sensors, and moving the vehicle along a path. The path includes straight portions and turning portions based on sensor data. It also includes detecting objects in the blind zone, determining future locations, and stopping the vehicle based on egress distance and path.

Inventors ran an experiment for the process 2300. Below are the results of the experiment. This experiment was meant to answer the question: if we use a portion of the document vs. all of the document, does the quality of the summary go down? The answer was no. The summaries were substantially similar. The experiment used 43 patents filed by the SAS Institute Inc. of Cary, North Carolina. The claim text section of each patent was input into the LLM through the prompt, using GPT4, to generate a baseline summary for each of the 43 patents. One claim text was too long for GPT4, so only 42 baseline summaries were generated. These summaries were used as a reference. Summaries of the same 43 patents were then generated using the process 2300. In particular, the inventors used an IE model to generate text segments, filtered the text segment matches, using one match per keyword or phrase, to reduce overlap. The model used for filtering was the noun group model with n-word context (n=12). The resulting text segments were then used to generate a prompt, which was then input into GPT4 to generate 43 summaries-one for each of the 43 patents.

The reference summaries were compared with the summaries generated by the process 2300. The comparison was conducted using a BERT score and a BLEU score, as indicated in Table 6 below:

TABLE 6

| | GPT summary from the process 2300 |
|---|---|
| BLEU | 0.10170077947217294 |
| BERT | 0.9682008055753486 |

The scores in Table 6 indicate that the summary produced using the process 2300 is very close semantically to the summary generated using full texts. Inventors also measured the amount of cost savings from using the shorter text segments as input compared to the full text from the claims section of the patent. They found that use of the NLP method combined with the LLM (e.g., process 2300) is 13 times less expensive than using an LLM alone for this task. For example, assuming an input cost per 1,000 tokens: $0.03 and an output cost per 1,000 tokens: $0.06, Table 7 lists the total cost of using the process 2300 or GPT4 only:

TABLE 7

| | GPT 4 | Process 2300 |
|---|---|---|
| input | $237.35 | $15.00 |
| output | $ 4.35 | $ 4.20 |
| total | $247.70 | $19.20 |

This experiment demonstrates that the process 2300 solves two problems when working with LLMs. The first problem is that of the context window. Because the LLMs are limited in the number of tokens they can accept, the prompt size has an upper limit. Some documents are very long and getting a summary of the entire document may be impossible for some models. The second problem is cost. Each token that goes into and comes out of an LLM incurs a cost, either directly (when using a hosted model) or indirectly (processing and hardware costs). The process 2300 addresses both problems. By using an IE model to identify key information in the document and using that key information instead of the entire document to generate a good summary, the context window is not exceeded, which also reduces the total cost. The difference in token usage was 5-10% of the original document (claim text). This difference does save costs but also helps prevent hallucinations, works faster, and may be leveraged for traceability and to enhance security as discussed elsewhere.

Figure 24:
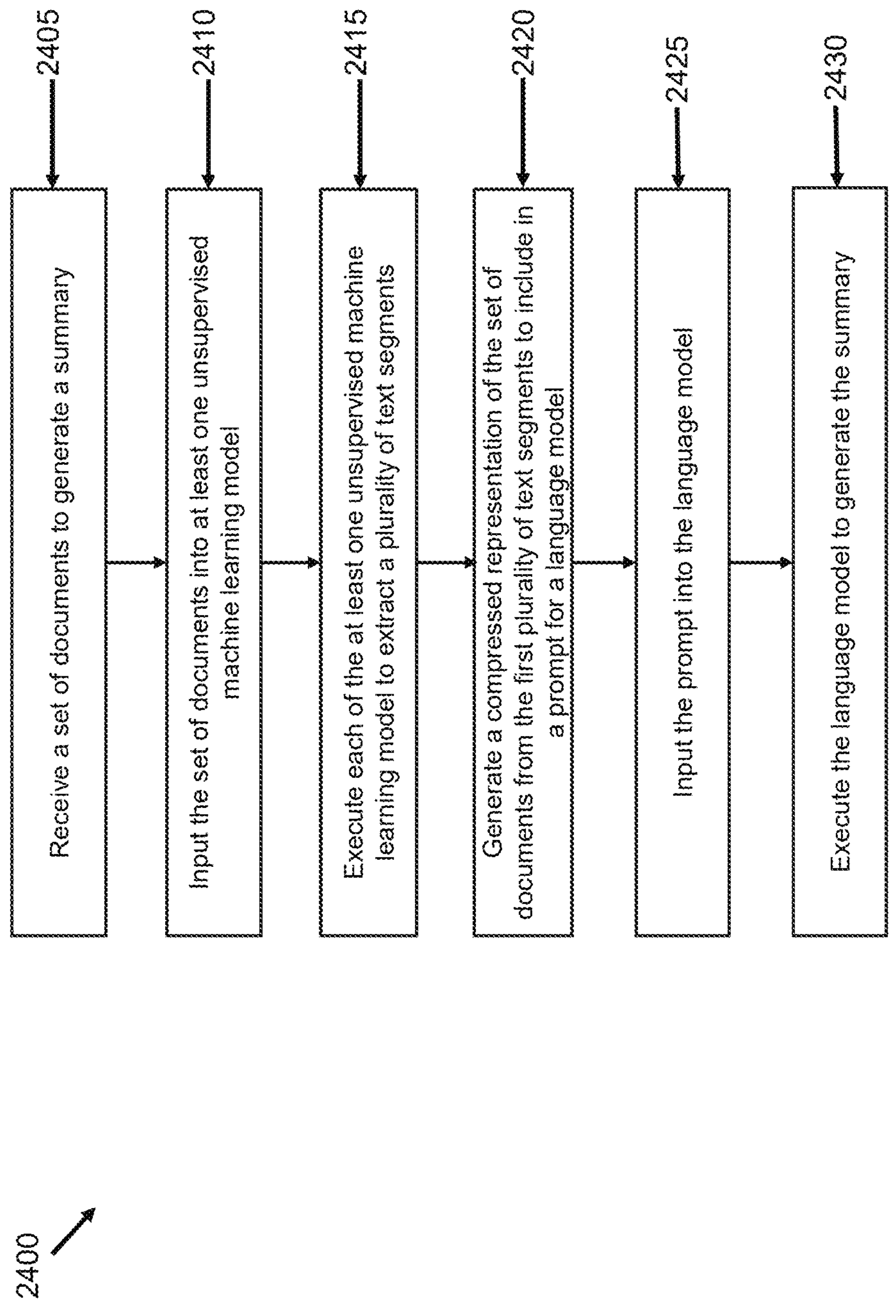
FIG. 24 illustrates a flowchart outlining second example operations for summarizing a set of documents using the summarization system of FIG. 14, according to embodiments of the present technology.

Referring now to FIG. 24, an example flowchart outlining operations of a process 2400 is shown, in accordance with some embodiments of the present disclosure. The process 2400 may be executed by one or more processors (e.g., the processor 1430) executing computer-readable instructions (e.g., the summarization instructions 1445) associated with the summarization application 1435. The process 2400 may be used for generating a summary (e.g., an abstractive summary) for a document (e.g., a medium-to-long document). In particular, the process 2400 may be used to generate a single summary for each document in a set of documents. The process 2400 may include other or additional operations in other embodiments.

In particular, instead of using an IE model to extract the first plurality of text segments as in the process 2300, the process 2400 includes using unsupervised machine learning models for identifying the first plurality of text segments. For example, in some embodiments, the unsupervised machine learning models may be used to identify relevant sentences. In some embodiments, the unsupervised machine learning models may implement an extractive summary algorithm. In some embodiments, the unsupervised machine learning models may be used to identify which sentences or headings are most important to the document by generating a score for each sentence and taking the top n sentences.

In some embodiments, the method of determining the importance of sentences may vary from the use of a basic algorithm such as take every heading (defined by length and surrounding whitespace) and/or the first sentence of every paragraph. The method may also be more sophisticated, for example, taking each sentence containing a word that is relevant to a topic or using an image of the document to identify places in the document that are important based on the document layout. In some embodiments, an algorithm like LexRank may also help to identify important sentences. In some embodiments, extractive summaries that identify a set of sentences from the document may also be used to create a set of sentences that represent the document.

In some embodiments, document type may be a factor in deciding between using the process 2300 or the process 2400. For example, in some embodiments, the process 2300 may be better suited when the set of documents include both short and longer documents or documents in various formats or written for various purposes. On the other hand, if the documents in the set of documents include data that is well-understood to follow certain patterns or be constrained to a single or small number of document types, this knowledge may be leveraged using the process 2400. For example, in some embodiments, depending on the type of document, sentences may be more useful as input to an LLM than snippets.

In some embodiments, the extracted sentences in the process 2400 may be further refined by identifying important sentences, then creating key phrases and key words, by extracting every sequence of tokens that does not contain a stop word or punctuation and (optionally) every token surrounded by stop words or punctuation. In some embodiments, noun groups and entities may be extracted from the key sentences.

At operation 2405, the processor receives a set of documents from which to generate a summary. The operation 2405 is analogous to the operation 1505.

At operation 2410, the processor inputs the set of documents into at least one unsupervised machine learning model. The operation 2410 is analogous to the operation 1510. The unsupervised machine learning model may be one or more of a machine learning model, a rule-based model, or a hybrid model, as discussed above. In some embodiments, the machine learning model may be an extractive summarization model or trained for a specific domain or application. In some embodiments, the machine learning model may be a keyword extraction model. In some embodiments, the keyword extraction model may be a supervised model, a semi-supervised model, or an unsupervised model. In some embodiments, the unsupervised model when used may be further divided into simple statistics, linguistics, or graph based.

At operation 2415, the processor executes each of the at least one unsupervised machine learning model to extract a plurality of text segments (e.g., a plurality of sentences) from the set of documents. For example, in some embodiments, the plurality of text segments may include a plurality of sentences extracted from the set of documents by a LexRank model. The operation 2415 is analogous to the operation 1515. Further, similar to the operation 1515, the first plurality of text segments reduces a number of tokens from a total number of tokens in each document of the set of documents to a reduced token count.

In some embodiments, the processor may further process the plurality of text segments. For example, in some embodiments, the processor generates a relevance score for each of the plurality of sentences generated at the operation 2415 using an extractive summarization algorithm. In some embodiments, the unsupervised machine learning model may include a LexRank model to generate the relevance score. In some embodiments, the processor may extract a predetermined number of sentences from the plurality of sentences having highest relevance scores to obtain a set of extracted sentences. In some embodiments, the processor may generate the compressed representation at operation 2420 based on the set of extracted sentences.

In some embodiments, the processor may input the plurality of sentences generated at the operation 2415 (or the set of extracted sentences) into a second information extraction model. In some embodiments, the processor may execute the second information extraction model to extract a second plurality of text segments from the plurality of sentences (or the set of extracted sentences). In some embodiments, the second plurality of text segments may include a plurality of key phrases. In some embodiments, the processor may generate the compressed representation at operation 2420 based on the third plurality of text segments.

At operation 2420, the processor generates a prompt based on the first plurality of text segments and inputs the prompt into a language model at operation 2425. The prompt may be a prompt generated similar to the prompt generated at the operation 1530. The language model may be a language model similar to that one described at the operations 1530 and 1535.

At operation 2430, the processor executes the language model to generate a plurality of summaries. In some embodiments, each summary of the plurality of summaries corresponds to a document of the set of documents and is generated from the first plurality of text segments that belong to the document. In particular, in some embodiments, the first plurality of text segments that are generated from a particular document may generate one summary. In some embodiments, more than one summary may be generated from each document of the set of documents.

Below are results for an experiment comparing the processes 2300 and 2400. In particular, summaries were generated for a set of 405 patent applications filed by the SAS Institute Inc. of Cary, North Carolina between 2005-2024 using both the processes 2300 and 2400. For the process 2300, the claim text section of each patent was used to generate the first plurality of text segments (e.g., snippets). For the process 2400, extractive summarization was used. The full claim text was used as a first comparison input in the prompt and the title and abstract fields of the patents were used as a second comparison input to the prompt.

Five methods were used to extract text segments from the patent claim text section for the process 2300. The first method used the first n tokens of the claim text (n=500) (referred to as "intro snippet" in Table 8 below). The second method identified the first sentence, using semicolons as potential sentence ending punctuation, given the nature of the document and propensity for very long sentences (referred to as "first sentence" in Table 8 below). The third method identified the last sentence of the document with the same criteria as the first sentence (referred to as "last sentence" in Table 8 below). The fourth method used the IE model, called NG snippet with 12 word context (referred to as "NG snippet" in Table 8 below), and the fifth method used a noun group model with creating context based on verbs near the noun groups to create context (referred to as "NG+ snippet" In Table 8 below).

Table 8 below lists the 5 methods to extract useful text from the patents along with the average token count per document from each method:

TABLE 8

| Text added to prompt | Average token count | Extraction method |
|---|---|---|
| Full claim text | 5634 | N/A |
| Intro snippet (Process 2300) | 500 | Snippets created from the first 500 tokens of the document |
| First sentence (Process 2300) | 57 | Tokens up to first semicolon or sentence break |
| Last sentence (Process 2300) | 103 | Tokens from last semicolon or sentence break |
| NG snippet (Process 2300) | 714 | Noun groups using context of 12 tokens |
| NG + snippet (Process 2300) | 657 | Noun groups with additional context based on key verbs when nearby |
| Process 2400 | 297 | Using an extractive summarization action, which is based on the LexRank algorithm, the same documents used in the previous Experiment 2 section of this document were processed, 405 patent applications filed by the SAS Institute Inc. of Cary, North Carolina between 2005-2024. Initial results indicate that the method is useful on patent documents. In Table 9 below, extractive summaries have been added to the list. One sentence was used as the output of the extractive summarization method |

The following prompt was used in each of the experiments above (with the text indicated in the first column of Table 8):

You are an expert at summarizing US patent applications.
Please summarize in no more than 5 sentences:
<Text>

When comparing the summaries generated by the 5 methods against the summaries generated from the full claim text, small embeddings using the OpenAI-3-were measured and cosine similarity scores were calculated. Those results are listed in Table 9 below:

TABLE 9

| Summary | OpenAI - 3 small | Average Token Count |
|---|---|---|
| Intro snippet | 0.5974 | 500 |
| First Sentence | 0.5478 | 57 |
| Last Sentence | 0.5699 | 103 |
| NG snippets | 0.6401 | 714 |
| NG + snippets | 0.6841 | 657 |
| Process 2400 | 0.7587 | 297 |

From Table 9, it may be seen that the two methods using IE model extracted snippets (NG snippets, NG+ snippets) perform better than the other (e.g., baseline) methods. However, the LexRank method worked best when tuned for a single sentence for this document type. These findings show that the extractive summarization approach may be useful for some types of documents. In this case only a single sentence was used in the summary, but these documents have very long sentences. Other document types may need more sentences to generate similar results. Once more sentences are used, there is a risk of having elements of the sentences imply shared information or use coreferential terms that are not linked to another other sentences in the summary. They also require more tokens on average. This token usage may be tuned by creating a cutoff number of snippets that are ranked in frequency from the documents or by reducing the amount of context used in the snippets.

The same experiments were conducted using the same type of measurement using the title and abstract of the document instead of the full claim text as input to the summary. Those results are listed in Table 10 below:

TABLE 10

| Summary | OpenAI - 3 small | Average Token Count |
|---|---|---|
| Intro snippet | 0.5651 | 500 |
| First Sentence | 0.4859 | 57 |
| Last Sentence | 0.5335 | 103 |
| NG snippets | 0.6217 | 714 |
| NG + snippets | 0.5881 | 657 |
| Process 2400 | 0.7427347232249543 | 297 |

Again, the two methods using IE model extracted snippets (NG snippets, NG+ snippets) perform better than the other (e.g., baseline) methods. The ordering is different between the two IE model methods, but they both consistently produce higher scores than the other methods with the Intro snippet in third place. However, the LexRank method worked best when tuned for a single sentence for this document type. These findings show that the extractive summarization approach may be useful for some types of documents. In this case only a single sentence was used in the summary, but these documents have very long sentences. Other document types may need more sentences to generate similar results. Once more sentences are used, there is a risk of having elements of the sentences imply shared information or use coreferential terms that are not linked to another other sentences in the summary.

First Examples

Example 1.1 A non-transitory computer-readable medium comprising computer-readable instructions stored thereon that when executed by a processor cause the processor to: receive a set of documents to generate a plurality of summaries, wherein one summary is generated for each document in the set of documents; and generate the plurality of summaries by: inputting the set of documents into an information extraction model and executing the information extraction model to extract a first plurality of text segments from the set of documents or inputting the set of documents into an unsupervised machine learning model and executing the unsupervised machine learning model to extract a second plurality of text segments from the set of documents, wherein each of the first plurality of text segments and the second plurality of text segments reduces a number of tokens from a total number of tokens in each document of the set of documents to a reduced token count; generating a compressed representation of the set of documents from the first plurality of text segments or the second plurality of text segments to include in a prompt for a language model, wherein the prompt comprises the reduced token count; inputting the prompt into the language model; and executing the language model to generate the plurality of summaries based on the prompt for the set of documents.

Example 1.2. The non-transitory computer-readable medium of Example 1.1, wherein the information extraction model comprises one or more of a machine learning model, a rule-based model, or a hybrid model.

Example 1.3. The non-transitory computer-readable medium of Example 1.2, wherein the machine learning model is an extractive summarization model or trained for a specific domain or application.

Example 1.4. The non-transitory computer-readable medium of Example 1.1, wherein the first plurality of text segments comprises a plurality of sentences.

Example 1.5. The non-transitory computer-readable medium of Example 1.4, wherein the computer-readable instructions further cause the processor to: generate a relevance score for each of the plurality of sentences using an extractive summarization algorithm; extract a predetermined number of sentences from the plurality of sentences having highest relevance scores to obtain a set of extracted sentences; and generate the compressed representation based on the set of extracted sentences.

Example 1.6. The non-transitory computer-readable medium of Example 1.4, wherein the computer-readable instructions further cause the processor to: input the plurality of sentences into a second information extraction model; execute the second information extraction model to extract a third plurality of text segments from the plurality of sentences; and generate the compressed representation based on the third plurality of text segments.

Example 1.7. The non-transitory computer-readable medium of Example 1.6, wherein the third plurality of text segments comprises a plurality of key phrases.

Example 1.8. The non-transitory computer-readable medium of Example 1.1, wherein the unsupervised machine learning model comprises a LexRank model.

Example 1.9. The non-transitory computer-readable medium of Example 1.8, wherein the second plurality of text segments comprises a plurality of sentences extracted from the set of documents by the LexRank model.

Example 1.10. The non-transitory computer-readable medium of Example 1.1, wherein the first plurality of text segments comprises a plurality of snippets.

Example 1.11. The non-transitory computer-readable medium of Example 1.10, wherein each snippet of the plurality of snippets includes a plurality of key words from the set of documents, a plurality of key phrases from the set of documents, or a combination of key words and key phrases from the set of documents.

Example 1.12. The non-transitory computer-readable medium of Example 1.11, wherein each snippet of the plurality of snippets further includes context around at least one of one or more of the key words or one or more of the key phrases.

Example 1.13. The non-transitory computer-readable medium of Example 1.1, wherein to generate the compressed representation of the set of documents from the first plurality of text segments, the computer-readable instructions further cause the processor to concatenate the first plurality of text segments to generate a first string, and wherein to generate the compressed representation of the set of documents from the second plurality of text segments, the computer-readable instructions further cause the processor to concatenate the second plurality of text segments to generate a second string.

Example 1.14. The non-transitory computer-readable medium of Example 1.13, wherein the prompt comprises the first string or the second string and one or more constraints, wherein the one or more constraints include a system role and a user role to provide a framework for how to generate the summary and a description of what to include in the summary.

Example 1.15. The non-transitory computer-readable medium of Example 1.1, wherein the language model comprises a Large Language Model (LLM).

Example 1.16. The non-transitory computer-readable medium of Example 1.1, wherein the computer-readable instructions further cause the processor to: determine that a document of the set of documents comprises non-textual information; convert the non-textual information into textual information; and add the converted textual information as a new document to the set of documents.

Example 1.17. The non-transitory computer-readable medium of Example 1.16, wherein the non-textual information comprises one or more of audio, video, or image.

Example 1.18. A system comprising: a memory comprising computer-readable instructions stored thereon; and a processor that executes the computer-readable instructions to: receive a set of documents to generate a plurality of summaries, wherein one summary is generated for each document in the set of documents; and generate the plurality of summaries by: inputting the set of documents into an information extraction model and executing the information extraction model to extract a first plurality of text segments from the set of documents or inputting the set of documents into an unsupervised machine learning model and executing the unsupervised machine learning model to extract a second plurality of text segments from the set of documents, wherein each of the first plurality of text segments and the second plurality of text segments reduces a number of tokens from a total number of tokens in each document of the set of documents to a reduced token count; generating a compressed representation of the set of documents from the first plurality of text segments or the second plurality of text segments to include in a prompt for a language model, wherein the prompt comprises the reduced token count; inputting the prompt into the language model; and executing the language model to generate the plurality of summaries based on the prompt for the set of documents.

Example 1.19. The system of Example 1.18, wherein the information extraction model comprises one or more of a machine learning model, a rule-based model, or a hybrid model, and wherein the machine learning model is an extractive summarization model or trained for a specific domain or application.

Example 1.20. The system of Example 1.18, wherein the first plurality of text segments comprises a plurality of sentences, and wherein the computer-readable instructions further cause the processor to: generate a relevance score for each of the plurality of sentences using an extractive summarization algorithm; extract a predetermined number of sentences from the plurality of sentences having highest relevance scores to obtain a set of extracted sentences; and generate the compressed representation based on the set of extracted sentences.

Example 1.21. The system of Example 1.18, wherein the first plurality of text segments comprises a plurality of sentences, and wherein the computer-readable instructions further cause the processor to: input the plurality of sentences into a second information extraction model; execute the second information extraction model to extract a third plurality of text segments from the plurality of sentences; and generate the compressed representation based on the third plurality of text segments, wherein the third plurality of text segments comprises a plurality of key phrases.

Example 1.22. The system of Example 1.18, wherein the unsupervised machine learning model comprises a LexRank model, and wherein the second plurality of text segments comprises a plurality of sentences extracted from the set of documents by the LexRank model.

Example 1.23. The system of Example 1.18, wherein the first plurality of text segments comprises a plurality of snippets, and wherein each snippet of the plurality of snippets includes a plurality of key words from the set of documents, a plurality of key phrases from the set of documents, a combination of key words and key phrases from the set of documents, or context around at least one of one or more of the key words or one or more of the key phrases.

Example 1.24. The system of Example 1.18, wherein to generate the compressed representation of the set of documents from the first plurality of text segments, the computer-readable instructions further cause the processor to concatenate the first plurality of text segments to generate a first string, and wherein to generate the compressed representation of the set of documents from the second plurality of text segments, the computer-readable instructions further cause the processor to concatenate the second plurality of text segments to generate a second string, wherein the prompt comprises the first string or the second string and one or more constraints, wherein the one or more constraints include a system role and a user role to provide a framework for how to generate the summary and a description of what to include in the summary.

Example 1.25. The system of Example 1.18, wherein the language model comprises a Large Language Model (LLM).

Example 1.26. The system of Example 1.18, wherein the computer-readable instructions further cause the processor to: determine that a document of the set of documents comprises non-textual information; convert the non-textual information into textual information; and add the converted textual information as a new document to the set of documents, wherein the non-textual information comprises one or more of audio, video, or image.

Example 1.27. A method comprising; receiving, by a processor executing computer-readable instructions stored on a memory, a set of documents to generate a plurality of summaries, wherein one summary is generated for each document in the set of documents; and generating, by the processor, the plurality of summaries by: inputting, by the processor, the set of documents into an information extraction model and executing the information extraction model to extract a first plurality of text segments from the set of documents or inputting the set of documents into an unsupervised machine learning model and executing the unsupervised machine learning model to extract a second plurality of text segments from the set of documents, wherein each of the first plurality of text segments and the second plurality of text segments reduces a number of tokens from a total number of tokens in each document of the set of documents to a reduced token count; generating, by the processor, a compressed representation of the set of documents from the first plurality of text segments or the second plurality of text segments to include in a prompt for a language model, wherein the prompt comprises the reduced token count; inputting, by the processor, the prompt into the language model; and executing, by the processor, the language model to generate the plurality of summaries based on the prompt for the set of documents.

Example 1.28. The method of Example 1.27, wherein the information extraction model comprises one or more of a machine learning model, a rule-based model, or a hybrid model, and wherein the machine learning model is an extractive summarization model or trained for a specific domain or application.

Example 1.29. The method of Example 1.27, wherein the first plurality of text segments comprises a plurality of sentences, and wherein the method further comprises: generating, by the processor, a relevance score for each of the plurality of sentences using an extractive summarization algorithm; extracting, by the processor, a predetermined number of sentences from the plurality of sentences having highest relevance scores to obtain a set of extracted sentences; and generating, by the processor, the compressed representation based on the set of extracted sentences.

Example 1.30. The method of Example 1.27, wherein the first plurality of text segments comprises a plurality of sentences, and wherein the method further comprises: inputting, by the processor, the plurality of sentences into a second information extraction model; executing, by the processor, the second information extraction model to extract a third plurality of text segments from the plurality of sentences; and generating, by the processor, the compressed representation based on the third plurality of text segments, wherein the third plurality of text segments comprises a plurality of key phrases.

Second Examples

Example 2.1. A non-transitory computer-readable medium comprising computer-readable instructions stored thereon that when executed by a processor cause the processor to: receive a request to summarize data associated with a sentiment about a target from a set of documents; input the set of documents into a sentiment model and an information extraction model; execute the sentiment model to generate a first plurality of snippets, each of the first plurality of snippets including data associated with the sentiment; execute the information extraction model to generate a second plurality of snippets, each of the second plurality of snippets including data associated with the target; extract a subset of the first plurality of snippets and the second plurality of snippets based on a first input to create a third plurality of snippets; rank each of the third plurality of snippets based on a frequency of occurrence of a second input; generate a compressed representation of the set of documents from at least a subset of the third plurality of snippets based on the rank of each of the third plurality of snippets to include in a prompt for a language model; input the prompt into the language model; and execute the language model to generate a summary for the set of documents, wherein the summary comprises the data associated with the sentiment about the target.

Example 2.2. The non-transitory computer-readable medium of Example 2.1, wherein the computer-readable instructions further cause the processor to: create a data structure based on the first plurality of snippets and the second plurality of snippets, wherein the data structure comprises a plurality of rows and a plurality of columns, wherein each row of the plurality of rows is associated with one snippet of the first plurality of snippets or the second plurality of snippets, and wherein each column of the plurality of columns is associated with a sentiment marker associated with the sentiment or a target marker associated with the target for the snippet; and store the data structure in a Retrieval Augmented Generation (RAG) server.

Example 2.3. The non-transitory computer-readable medium of Example 2.2, wherein the computer-readable instructions further cause the processor to: execute a query on the data structure stored in the RAG server to obtain a fourth plurality of snippets that satisfy the query; and extract the third plurality of snippets from the fourth plurality of snippets.

Example 2.4. The non-transitory computer-readable medium of Example 2.1, wherein to consolidate the at least a subset of the third plurality of snippets, the computer-readable instructions further cause the processor to concatenate each snippet in the at least a subset of the third plurality of snippets.

Example 2.5. The non-transitory computer-readable medium of Example 2.1, wherein to generate the prompt, the computer-readable instructions further cause the processor to: receive a third input indicating a number of snippets to include in the new dataset; extract the number of highest ranked snippets from the third plurality of snippets to obtain a fourth plurality of snippets; and concatenate the fourth plurality of snippets to include in the prompt.

Example 2.6. The non-transitory computer-readable medium of Example 2.1, wherein the sentiment is a positive sentiment or a negative sentiment.

Example 2.7. The non-transitory computer-readable medium of Example 2.1, wherein the summary comprises a plurality of phrases of text from the set of documents that have the sentiment for the target, a starting offset and an ending offset for each phrase of text of the plurality of phrases of text to indicate a location of where each phrase of text is found in the set of documents, a document identifier indicating a document of the set of documents containing each of the plurality of phrases of text, and a sentiment label associated with the sentiment for each of the plurality of phrases of text.

Example 2.8. The non-transitory computer-readable medium of Example 2.1, wherein each of the first plurality of snippets and each of the second plurality of snippets comprises metadata, and wherein the first input to extract the subset of the first plurality of snippets and the second plurality of snippets comprises one or more keywords from the metadata.

Example 2.9. The non-transitory computer-readable medium of Example 2.1, wherein the first input to extract the subset of the first plurality of snippets and the second plurality of snippets comprises one or more keywords or one or more phrases associated with at least one of the sentiment or the target.

Example 2.10. The non-transitory computer-readable medium of Example 2.1, wherein the language model is a Large Language Model (LLM).

Example 2.11. A system comprising: a memory comprising computer-readable instructions stored thereon; and a processor that executes the computer-readable instructions to: receive a request to summarize data associated with a sentiment about a target from a set of documents; input the set of documents into a sentiment model and an information extraction model; execute the sentiment model to generate a first plurality of snippets, each of the first plurality of snippets including data associated with the sentiment; execute the information extraction model to generate a second plurality of snippets, each of the second plurality of snippets including data associated with the target; extract a subset of the first plurality of snippets and the second plurality of snippets based on a first input to create a third plurality of snippets; rank each of the third plurality of snippets based on a frequency of occurrence of a second input; generate a compressed representation of the set of documents from at least a subset of the third plurality of snippets based on the rank of each of the third plurality of snippets to include in a prompt for a language model; input the prompt into the language model; and execute the language model to generate a summary for the set of documents, wherein the summary comprises the data associated with the sentiment about the target.

Example 2.12. The system of Example 2.11, wherein the computer-readable instructions further cause the processor to: create a data structure based on the first plurality of snippets and the second plurality of snippets, wherein the data structure comprises a plurality of rows and a plurality of columns, wherein each row of the plurality of rows is associated with one snippet of the first plurality of snippets or the second plurality of snippets, and wherein each column of the plurality of columns is associated with a sentiment marker associated with the sentiment or a target marker associated with the target for the snippet; and store the data structure in a Retrieval Augmented Generation (RAG) server.

Example 2.13. The system of Example 2.12, wherein the computer-readable instructions further cause the processor to: execute a query on the data structure stored in the RAG server to obtain a fourth plurality of snippets that satisfy the query; and extract the third plurality of snippets from the fourth plurality of snippets.

Example 2.14. The system of Example 2.11, wherein to consolidate the at least a subset of the third plurality of snippets, the computer-readable instructions further cause the processor to concatenate each snippet in the at least a subset of the third plurality of snippets.

Example 2.15. The system of Example 2.11, wherein to generate the prompt, the computer-readable instructions further cause the processor to: receive a third input indicating a number of snippets to include in the new dataset; extract the number of highest ranked snippets from the third plurality of snippets to obtain a fourth plurality of snippets; and concatenate the fourth plurality of snippets to include in the prompt.

Example 2.16. The system of Example 2.11, wherein the sentiment is a positive sentiment or a negative sentiment.

Example 2.17. The system of Example 2.11, wherein the summary comprises a plurality of phrases of text from the set of documents that have the sentiment for the target, a starting offset and an ending offset for each phrase of text of the plurality of phrases of text to indicate a location of where each phrase of text is found in the set of documents, a document identifier indicating a document of the set of documents containing each of the plurality of phrases of text, and a sentiment label associated with the sentiment for each of the plurality of phrases of text.

Example 2.18. The system of Example 2.11, wherein each of the first plurality of snippets and each of the second plurality of snippets comprises metadata, and wherein the first input to extract the subset of the first plurality of snippets and the second plurality of snippets comprises one or more keywords from the metadata.

Example 2.19. The system of Example 2.11, wherein the first input to extract the subset of the first plurality of snippets and the second plurality of snippets comprises one or more keywords or one or more phrases associated with at least one of the sentiment or the target.

Example 2.20. The system of Example 2.11, wherein the language model is a Large Language Model (LLM).

Example 2.21. A method comprising: receiving, by a processor executing computer-readable instructions stored on a memory, a request to summarize data associated with a sentiment about a target from a set of documents; inputting, by the processor, the set of documents into a sentiment model and an information extraction model; executing, by the processor, the sentiment model to generate a first plurality of snippets, each of the first plurality of snippets including data associated with the sentiment; executing, by the processor, the information extraction model to generate a second plurality of snippets, each of the second plurality of snippets including data associated with the target; extracting, by the processor, a subset of the first plurality of snippets and the second plurality of snippets based on a first input to create a third plurality of snippets; ranking, by the processor, each of the third plurality of snippets based on a frequency of occurrence of a second input; generating, by the processor, a compressed representation of the set of documents from at least a subset of the third plurality of snippets based on the rank of each of the third plurality of snippets to include in a prompt for a language model; inputting, by the processor, the prompt into the language model; and executing, by the processor, the language model to generate a summary for the set of documents, wherein the summary comprises the data associated with the sentiment about the target.

Example 2.22. The method of Example 2.21, further comprising: creating, by the processor, a data structure based on the first plurality of snippets and the second plurality of snippets, wherein the data structure comprises a plurality of rows and a plurality of columns, wherein each row of the plurality of rows is associated with one snippet of the first plurality of snippets or the second plurality of snippets, and wherein each column of the plurality of columns is associated with a sentiment marker associated with the sentiment or a target marker associated with the target for the snippet; and storing, by the processor, the data structure in a Retrieval Augmented Generation (RAG) server.

Example 2.23. The method of Example 2.22, further comprising: executing, by the processor, a query on the data structure stored in the RAG server to obtain a fourth plurality of snippets that satisfy the query; and extracting, by the processor, the third plurality of snippets from the fourth plurality of snippets.

Example 2.24. The method of Example 2.21, wherein to consolidate the at least a subset of the third plurality of snippets, the method further comprises concatenating, by the processor, each snippet in the at least a subset of the third plurality of snippets.

Example 2.25. The method of Example 2.21, wherein to generate the prompt, the method further comprises: receiving, by the processor, a third input indicating a number of snippets to include in the new dataset; extracting, by the processor, the number of highest ranked snippets from the third plurality of snippets to obtain a fourth plurality of snippets; and concatenating, by the processor, the fourth plurality of snippets to include in the prompt.

Example 2.26. The method of Example 2.21, wherein the sentiment is a positive sentiment or a negative sentiment.

Example 2.27. The method of Example 2.21, wherein the summary comprises a plurality of phrases of text from the set of documents that have the sentiment for the target, a starting offset and an ending offset for each phrase of text of the plurality of phrases of text to indicate a location of where each phrase of text is found in the set of documents, a document identifier indicating a document of the set of documents containing each of the plurality of phrases of text, and a sentiment label associated with the sentiment for each of the plurality of phrases of text.

Example 2.28. The method of Example 2.21, wherein each of the first plurality of snippets and each of the second plurality of snippets comprises metadata, and wherein the first input to extract the subset of the first plurality of snippets and the second plurality of snippets comprises one or more keywords from the metadata.

Example 2.29. The method of Example 2.21, wherein the first input to extract the subset of the first plurality of snippets and the second plurality of snippets comprises one or more keywords or one or more phrases associated with at least one of the sentiment or the target.

Example 2.30. The method of Example 2.21, wherein the language model is a Large Language Model (LLM).

The herein described subject matter illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the Convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents. The word "illustrative" is used herein to mean serving as an example, instance, or illustration. Any aspect or design described herein as "illustrative" is not necessarily to be construed as preferred or advantageous over other aspects or designs.

What is claimed is:

1. A non-transitory computer-readable medium comprising computer-readable instructions stored thereon that when executed by a processor cause the processor to:

receive a set of documents for a prompt being input to a language model having a context window having a token limit, wherein a token count of the set of documents requires a first amount of computer memory;

reducing the token count of the set of documents to fit within the context window of the language model by:

input the set of documents into at least one information extraction model;

execute each of the at least one information extraction model to extract a first plurality of text segments from the set of documents, wherein the first plurality of text segments reduces a number of tokens from a total number of tokens in each document of the set of documents to a first token count, and wherein the first plurality of text segments are usable as inputs to determine a trend across the set of documents;

determine a second plurality of text segments based on the first plurality of text segments, wherein the second plurality of text segments correspond to documents selected from the set of documents based on one or more of at least one keyword, metadata, or a topic of interest, and wherein a number of the second plurality of text segments is less than or equal to a number of the first plurality of text segments;

determine a third plurality of text segments from the second plurality of text segments based on at least one of a frequency of occurrence, a priority score, or a location of a text segment in a document of the set of documents, wherein a number of the third plurality of text segments is less than or equal to the number of the second plurality of text segments, and wherein the third plurality of text segments reduces the number of tokens to a second token count that is less than the first token count;

in response to reducing the token count, generate a compressed representation of the set of documents from the third plurality of text segments to include in a compressed prompt for the language model, wherein the compressed prompt comprises the second token count stored in a second amount of computer memory that is less than the first amount of computer memory associated with the token count of the set of documents, and wherein the compressed representation being generated by concatenating the third plurality of text segments from the second plurality of text second and excluding unselected text segments from the set of documents that are associated with the trend;

input the prompt into the language model; and execute the language model to generate the summary based on the compressed prompt for the set of documents.

2. The non-transitory computer-readable medium of claim 1, wherein the at least one information extraction model comprises at least one of a Machine Learning (ML) model, a rule-based model, or a hybrid model.

3. The non-transitory computer-readable medium of claim 1, wherein the language model comprises a Large Language Model (LLM).

4. The non-transitory computer-readable medium of claim 1, wherein the computer-readable instructions further cause the processor to:

for each text segment of the first plurality of text segments, identify which documents from the set of documents the text segment belongs to; and store the text segment together with the identified documents in a database.

5. The non-transitory computer-readable medium of claim 1, wherein the computer-readable instructions further cause the processor to:

determine that a document of the set of documents comprises non-textual information;

convert the non-textual information into textual information; and add the converted textual information as a new document to the set of documents.

6. The non-transitory computer-readable medium of claim 5, wherein the non-textual information comprises one or more of audio, video, or image.

7. The non-transitory computer-readable medium of claim 1, wherein the computer-readable instructions further cause the processor to:

identify a subset of the set of documents based on one or more of the at least one keyword, the metadata, or the topic of interest to obtain a set of relevant documents; and determine a subset of the first plurality of text segments that belong to the set of relevant documents to obtain the second plurality of text segments.

8. The non-transitory computer-readable medium of claim 7, wherein the computer-readable instructions further cause the processor to:

subdivide the set of documents based on a user defined parameter to obtain a plurality of documents; and identify the subset of the set of documents from the plurality of documents.

9. The non-transitory computer-readable medium of claim 7, wherein to identify the subset of the set of documents based on one or more of the at least one keyword, the metadata, or the topic of interest, the computer-readable instructions further cause the processor to:

receive the at least one keyword, the metadata, or the topic of interest as user input; and identify each document from the set of documents that matches the at least one keyword, the metadata, or the topic of interest.

10. The non-transitory computer-readable medium of claim 1, wherein to extract the third plurality of text segments from the second plurality of text segments based on the priority score, the computer-readable instructions further cause the processor to:

compute the priority score for each of the second plurality of text segments; and select at least a subset of the text segments from the second plurality of text segments whose priority score is greater than a predetermined threshold.

11. The non-transitory computer-readable medium of claim 10, wherein the computer-readable instructions further cause the processor to compute the priority score of a text segment using: Priority Score=Frequency×Term Frequency-Inverse Document Frequency Score, where Priority Score is the computed priority score for the text segment, Frequency is a number of times the text segment occurs across the second plurality of text segments, and Term Frequency-Inverse Document Frequency Score is a score indicating a relevance of the text segment in the set of documents.

12. The non-transitory computer-readable medium of claim 10, wherein the computer-readable instructions further cause the processor to compute the priority score of a text segment using: Priority Score=Frequency×Domain-Specific Term Count, where Priority Score is the computed priority score for the text segment, Frequency is a number of times the text segment occurs across the second plurality of text segments, and Domain-Specific term Count is a number of domain-specific terms in the text segment.

13. The non-transitory computer-readable medium of claim 1, wherein to extract the third plurality of text segments from the second plurality of text segments based on the frequency of occurrence, the computer-readable instructions further cause the processor to:

rank each text segment in the second plurality of text segments based on the frequency of occurrence; and select a predetermined number of highest ranked text segments.

14. The non-transitory computer-readable medium of claim 1, wherein the compressed prompt is a second prompt, the language model is a second language model, and the at least one information extraction model is a first information extraction model, and wherein the computer-readable instructions further cause the processor to:

generate a first prompt based on the first plurality of text segments and input the first prompt into a first language model;

execute the first language model to generate a plurality of initial summaries, wherein each initial summary of the plurality of initial summaries corresponds to a document of the set of documents and is generated from the first plurality of text segments that belong to the document;

input the plurality of initial summaries into a second information extraction model; and execute the second information extraction model to extract the second plurality of text segments from the plurality of initial summaries.

15. The non-transitory computer-readable medium of claim 14, wherein the second information extraction model comprises at least one of an Information Extraction (IE) model, a Machine Learning (ML) model, a rule-based model, or a hybrid model, and wherein the first language model comprises a Large Language Model (LLM).

16. The non-transitory computer-readable medium of claim 1, wherein the computer-readable instructions further cause the processor to:

receive an input identifying a keyword or phrase from the summary;

identify which of the first plurality of text segments comprise the keyword or phrase to obtain a fourth plurality of text segments;

rank each of the fourth plurality of text segments; and output a ranked list of the fourth plurality of text segments.

17. The non-transitory computer-readable medium of claim 1, wherein to generate the compressed representation of the set of documents from the third plurality of text segments, the computer-readable instructions further cause the processor to concatenate the third plurality of text segments to generate a string.

18. The non-transitory computer-readable medium of claim 17, wherein the compressed prompt further comprises the string and one or more constraints, wherein the one or more constraints include a system role and a user role to provide a framework for how to generate the summary and a description of what to include in the summary.

19. The non-transitory computer-readable medium of claim 1, wherein multiple text segments are extracted from each document of the set of documents to extract the first plurality of text segments.

20. A system comprising:

a memory having computer-readable instructions stored thereon; and a processor that executes the computer-readable instructions to:

receive a set of documents for a prompt being input to a language model having a context window having a token limit, wherein a token count of the set of documents requires a first amount of computer memory;

reduce the token count of the set of documents to fit within the context window of the language model by:

inputting the set of documents into at least one information extraction model;

executing each of the at least one information extraction model to extract a first plurality of text segments from the set of documents, wherein the first plurality of text segments reduces a number of tokens from a total number of tokens in each document of the set of documents to a first token count, and wherein the first plurality of text segments are usable as inputs to determine a trend across the set of documents;

determining a second plurality of text segments based on the first plurality of text segments, wherein the second plurality of text segments correspond to documents selected from the set of documents based on one or more of at least one keyword, metadata, or a topic of interest, and wherein a number of the second plurality of text segments is less than or equal to a number of the first plurality of text segments;

determining a third plurality of text segments from the second plurality of text segments based on at least one of a frequency of occurrence, a priority score, or a location of a text segment in a document of the set of documents, wherein a number of the third plurality of text segments is less than or equal to the number of the second plurality of text segments, and wherein the third plurality of text segments reduces the number of tokens to a second token count that is less than the first token count;

in response to reducing the token count, generate a compressed representation of the set of documents from the third plurality of text segments to include in a compressed prompt for the language model, wherein the compressed prompt comprises the second token count stored in a second amount of computer memory that is less than the first amount of computer memory associated with the token count of the set of documents, and wherein the compressed representation being generated by concatenating the third plurality of text segments from the second plurality of text second and excluding unselected text segments from the set of documents that are associated with the trend;

input the compressed prompt into the language model; and execute the language model to generate the summary based on the compressed prompt for the set of documents.

21. The system of claim 20, wherein the at least one information extraction model comprises at least one of a Machine Learning (ML) model, a rule-based model, or a hybrid model, and wherein the language model comprises a Large Language Model (LLM).

22. The system of claim 20, wherein the computer-readable instructions further cause the processor to:

determine that a document of the set of documents comprises non-textual information;

convert the non-textual information into textual information; and add the converted textual information as a new document to the set of documents, wherein the non-textual information comprises one or more of audio, video, or image.

23. The system of claim 20, wherein to extract the third plurality of text segments from the second plurality of text segments based on the priority score, the computer-readable instructions further cause the processor to:

compute the priority score for each of the second plurality of text segments using:

(a) Priority Score=Frequency×Term Frequency-Inverse Document Frequency Score, where Priority Score is the computed priority score for the text segment, Frequency is a number of times the text segment occurs across the second plurality of text segments, and Term Frequency-Inverse Document Frequency Score is a score indicating a relevance of the text segment in the set of documents; or (b) Priority Score=Frequency×Domain-Specific Term Count, where Priority Score is the computed priority score for the text segment, Frequency is the number of times the text segment occurs across the second plurality of text segments, and Domain-Specific term Count is a number of domain-specific terms in the text segment; and select at least a subset of the text segments from the second plurality of text segments whose priority score is greater than a predetermined threshold.

24. The system of claim 20, wherein the compressed prompt is a second prompt, the language model is a second language model, and the at least one information extraction model is a first information extraction model, and wherein the computer-readable instructions further cause the processor to:

generate a first prompt based on the first plurality of text segments and input the first prompt into a first language model;

execute the first language model to generate a plurality of initial summaries, wherein each initial summary of the plurality of initial summaries corresponds to a document of the set of documents and is generated from the first plurality of text segments that belong to the document;

input the plurality of initial summaries into a second information extraction model; and execute the second information extraction model to extract the second plurality of text segments from the plurality of initial summaries, wherein the second information extraction model comprises at least one of a Machine Learning (ML) model, a rule-based model, or a hybrid model, and wherein the first language model comprises a Large Language Model (LLM).

25. The system of claim 20, wherein to generate the compressed representation of the set of documents from the third plurality of text segments, the computer-readable instructions further cause the processor to concatenate the third plurality of text segments to generate a string, wherein the compressed prompt further comprises the string and one or more constraints, and wherein the one or more constraints include a system role and a user role to provide a framework for how to generate the summary and a description of what to include in the summary.

26. A method comprising:

receiving, by a processor executing computer-readable instructions stored on a memory, a set of documents for a prompt being input to a language model having a context window having a token limit, wherein a token count of the set of documents requires a first amount of computer memory;

reducing the token count of the set of documents to fit within the context window of the language model by:

inputting, by the processor, the set of documents into at least one information extraction model;

executing, by the processor, each of the at least one information extraction model to extract a first plurality of text segments from the set of documents, wherein the first plurality of text segments reduces a number of tokens from a total number of tokens in each document of the set of documents to a first token count, and wherein the first plurality of text segments are usable as inputs to determine a trend across the set of documents;

determining, by the processor, a second plurality of text segments based on the first plurality of text segments, wherein the second plurality of text segments correspond to documents selected from the set of documents based on one or more of at least one keyword, metadata, or a topic of interest, and wherein a number of the second plurality of text segments is less than or equal to a number of the first plurality of text segments;

determining, by the processor, a third plurality of text segments from the second plurality of text segments based on at least one of a frequency of occurrence, a priority score, or a location of a text segment in a document of the set of documents, wherein a number of the third plurality of text segments is less than or equal to the number of the second plurality of text segments, and wherein the third plurality of text segments reduces the number of tokens to a second token count that is less than the first token count;

in response to reducing the token count, generating, by the processor, a compressed representation of the set of documents from the third plurality of text segments to include in a compressed prompt for the language model, wherein the compressed prompt comprises the second token count stored in a second amount of computer memory that is less than the first amount of computer memory associated with the token count of the set of documents, and wherein the compressed representation being generated by concatenating the third plurality of text segments from the second plurality of text second and excluding unselected text segments from the set of documents that are associated with the trend;

inputting, by the processor, the compressed prompt into the language model; and executing, by the processor, the language model to generate the summary based on the compressed prompt for the set of documents.

27. The method of claim 26, wherein the at least one information extraction model comprises at least one of a Machine Learning (ML) model, a rule-based model, or a hybrid model, wherein the language model comprises a Large Language Model (LLM), wherein to generate the compressed representation of the set of documents from the third plurality of text segments, the computer-readable instructions further cause the processor to concatenate the third plurality of text segments to generate a string, wherein the compressed further comprises the string and one or more constraints, and wherein the one or more constraints include a system role and a user role to provide a framework for how to generate the summary and a description of what to include in the summary.

28. The method of claim 26, further comprising:

determining, by the processor, that a document of the set of documents comprises non-textual information;

converting, by the processor, the non-textual information into textual information; and adding, by the processor, the converted textual information as a new document to the set of documents, wherein the non-textual information comprises one or more of audio, video, or image.

29. The method of claim 26, wherein to extract the third plurality of text segments from the second plurality of text segments based on the priority score, the method further comprises:

computing, by the processor, the priority score for each of the second plurality of text segments using:

(a) Priority Score=Frequency×Term Frequency-Inverse Document Frequency Score, where Priority Score is the computed priority score for the text segment, Frequency is a number of times the text segment occurs across the second plurality of text segments, and Term Frequency-Inverse Document Frequency Score is a score indicating a relevance of the text segment in the set of documents; or (b) Priority Score=Frequency×Domain-Specific Term Count, where Priority Score is the computed priority score for the text segment, Frequency is the number of times the text segment occurs across the second plurality of text segments, and Domain-Specific term Count is a number of domain-specific terms in the text segment; and selecting, by the processor, at least a subset of the text segments from the second plurality of text segments whose priority score is greater than a predetermined threshold.

30. The method of claim 26, wherein the compressed prompt is a second prompt, the language model is a second language model, and the at least one information extraction model is a first information extraction model, and wherein the method further comprises:

generating, by the processor, a first prompt based on the first plurality of text segments and input the first prompt into a first language model;

executing, by the processor, the first language model to generate a plurality of initial summaries, wherein each initial summary of the plurality of initial summaries corresponds to a document of the set of documents and is generated from the first plurality of text segments that belong to the document;

inputting, by the processor, the plurality of initial summaries into a second information extraction model; and executing, by the processor, the second information extraction model to extract the second plurality of text segments from the plurality of initial summaries, wherein the second information extraction model comprises at least one of a Machine Learning (ML) model, a rule-based model, or a hybrid model, and wherein the first language model comprises a Large Language Model (LLM).

31. A non-transitory computer-readable medium comprising computer-readable instructions stored thereon that when executed by a processor cause the processor to:

receive a set of documents to generate a summary summarizing a trend across the set of documents;

input the set of documents into at least one information extraction model;

execute each of the at least one information extraction model to extract a first plurality of text segments from the set of documents, wherein the first plurality of text segments reduces a number of tokens from a total number of tokens in each document of the set of documents to a first token count, and wherein the first plurality of text segments are usable as inputs to determine a trend across the set of documents;

determine a second plurality of text segments based on the first plurality of text segments, wherein the second plurality of text segments correspond to documents selected from the set of documents based on one or more of at least one keyword, metadata, or a topic of interest, and wherein a number of the second plurality of text segments is less than or equal to a number of the first plurality of text segments;

determine a third plurality of text segments from the second plurality of text segments based on at least one of a frequency of occurrence, a priority score, or a location of a text segment in a document of the set of documents, wherein a number of the third plurality of text segments is less than or equal to the number of the second plurality of text segments, and wherein the third plurality of text segments reduces the number of tokens to a second token count that is less than the first token count;

compute the priority score for each of the second plurality of text segments, wherein computing the priority score includes using Priority Score=Frequency×Term Frequency-Inverse Document Frequency Score, where Priority Score is the computed priority score for the text segment, Frequency is a number of times the text segment occurs across the second plurality of text segments, and Term Frequency-Inverse Document Frequency Score is a score indicating a relevance of the text segment in the set of documents;

select at least a subset of the text segments from the second plurality of text segments whose priority score is greater than a predetermined threshold;

generate a compressed representation of the set of documents from the third plurality of text segments to include in a prompt for a language model, wherein the prompt comprises the second token count;

input the prompt into the language model; and execute the language model to generate the summary based on the compressed prompt for the set of documents.

32. A non-transitory computer-readable medium comprising computer-readable instructions stored thereon that when executed by a processor cause the processor to:

receive a set of documents to generate a summary summarizing a trend across the set of documents;

input the set of documents into at least one information extraction model;

execute each of the at least one information extraction model to extract a first plurality of text segments from the set of documents, wherein the first plurality of text segments reduces a number of tokens from a total number of tokens in each document of the set of documents to a first token count, and wherein the first plurality of text segments are usable as inputs to determine a trend across the set of documents;

determine a second plurality of text segments based on the first plurality of text segments, wherein the second plurality of text segments correspond to documents selected from the set of documents based on one or more of at least one keyword, metadata, or a topic of interest, and wherein a number of the second plurality of text segments is less than or equal to a number of the first plurality of text segments;

determine a third plurality of text segments from the second plurality of text segments based on at least one of a frequency of occurrence, a priority score, or a location of a text segment in a document of the set of documents, wherein a number of the third plurality of text segments is less than or equal to the number of the second plurality of text segments, and wherein the third plurality of text segments reduces the number of tokens to a second token count that is less than the first token count;

compute the priority score for each of the second plurality of text segments, wherein computing the priority score includes using Priority Score=Frequency×Domain-Specific Term Count, where Priority Score is the computed priority score for the text segment, Frequency is a number of times the text segment occurs across the second plurality of text segments, and Domain-Specific term Count is a number of domain-specific terms in the text segment;

select at least a subset of the text segments from the second plurality of text segments whose priority score is greater than a predetermined threshold;

generate a compressed representation of the set of documents from the third plurality of text segments to include in a prompt for a language model, wherein the prompt comprises the second token count;

input the prompt into the language model; and execute the language model to generate the summary based on the compressed prompt for the set of documents.

* * * * *